United States Patent [19]
Yano

[11] Patent Number: 4,965,792
[45] Date of Patent: Oct. 23, 1990

[54] COLLISION/DETECTION SINGLE NODE CONTROLLED LOCAL AREA NETWORK

[75] Inventor: Takashi Yano, Tokyo, Japan

[73] Assignee: Ricoh Company, Ltd., Tokyo, Japan

[21] Appl. No.: 477,130

[22] Filed: Feb. 7, 1990

Related U.S. Application Data

[63] Continuation of Ser. No. 947,525, Dec. 29, 1986, abandoned.

[30] Foreign Application Priority Data

| | | | |
|---|---|---|---|
| Jan. 9, 1986 | [JP] | Japan | 61-2774 |
| Mar. 12, 1986 | [JP] | Japan | 61-53992 |
| Mar. 12, 1986 | [JP] | Japan | 61-53993 |

[51] Int. Cl.$^5$ .............................................. H04L 5/22
[52] U.S. Cl. .................................... 370/85.2; 370/94.3
[58] Field of Search ................ 370/1, 4, 60, 85.1, 370/94.1, 94.3, 85.2; 455/607; 340/825.5

[56] References Cited

U.S. PATENT DOCUMENTS

| | | | |
|---|---|---|---|
| 4,516,272 | 5/1985 | Yano | 455/607 |
| 4,531,239 | 7/1985 | Usui | 455/607 |
| 4,584,678 | 4/1986 | Ozeki et al. | 340/825.5 |
| 4,644,587 | 2/1987 | Takahashi et al. | 455/607 |
| 4,794,590 | 12/1988 | Yano | 370/94 |

FOREIGN PATENT DOCUMENTS

| | | | |
|---|---|---|---|
| 0204645 | 11/1983 | Japan | 455/607 |
| 0051342 | 3/1985 | Japan | 370/1 |
| 2166626 | 5/1986 | United Kingdom | 370/1 |

Primary Examiner—Douglas W. Olms
Assistant Examiner—Melvin Marcelo
Attorney, Agent, or Firm—Oblon, Spivak, McClelland, Maier & Neustadt

[57] ABSTRACT

A single node communication network control system which uses a plurality of transmit/receive terminals connected to the node, are controlled by the single node. A connection control device is installed in the node for controlling the connection of plurality of input channels and output channels which correspond to the input channels. This control means connects only the input channel on which first forward information has arrived the earliest. The connection control means then disconnects the output channels from the input channels except for the connected input channel which has not been used for other communication.

42 Claims, 60 Drawing Sheets

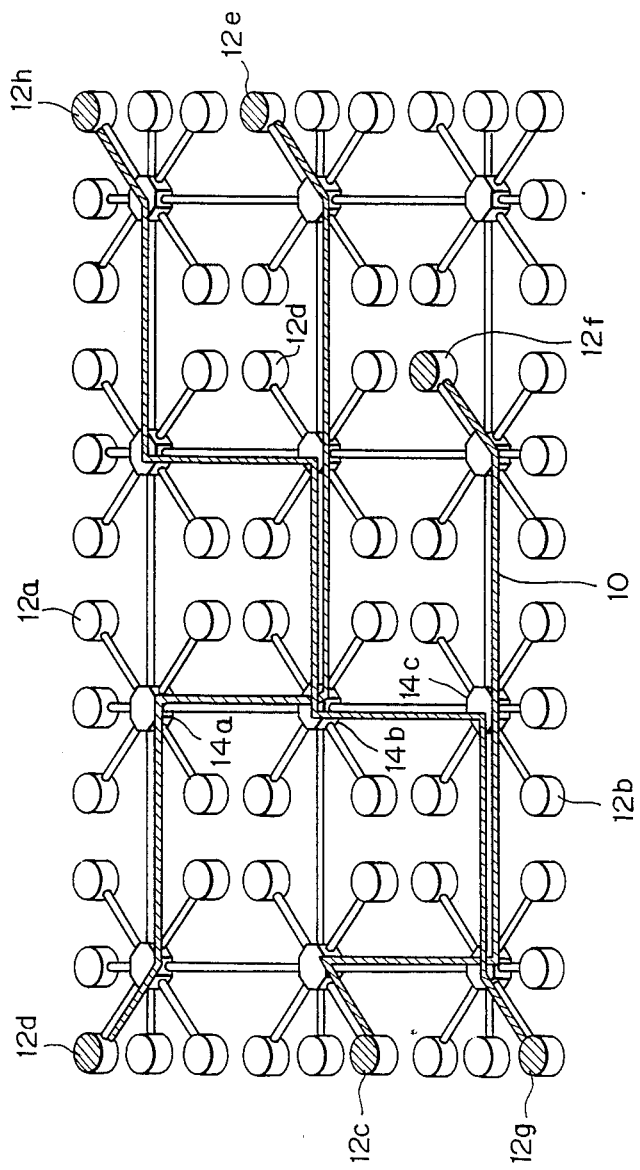

(STEP-1)

(STEP-2)

(STEP-3)

(STEP-4)

(STEP-5)

$$Td = 2(Tn+T\ell) \cdots (1)$$
EXAMPLE: $Tn = 50\,nsec$
$T\ell = 500\,nsec\,(100m)$
∴ $Td = 1.1\,\mu sec$ $$TD \geq Td \quad \cdots\cdots\cdots\cdots (3)$$
$$Ts \geq TD + Td \quad \cdots\cdots (4)$$

EXAMPLE: $Ts \geq 2.2 \mu sec$ $T_s \geq (TD + Td)/2 \cdots \cdots (5)$

EXAMPLE: $T_s \geq 1.1 \mu sec$

Fig. 30 (1)
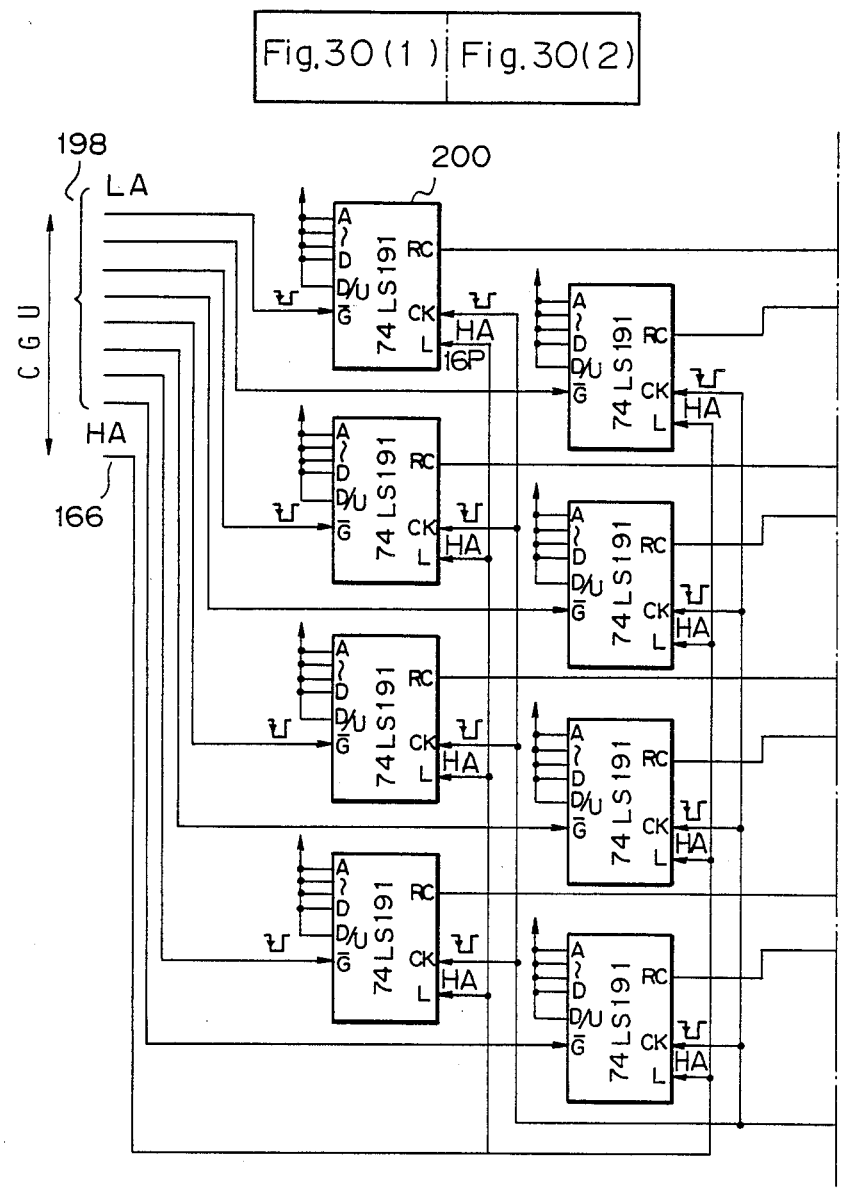

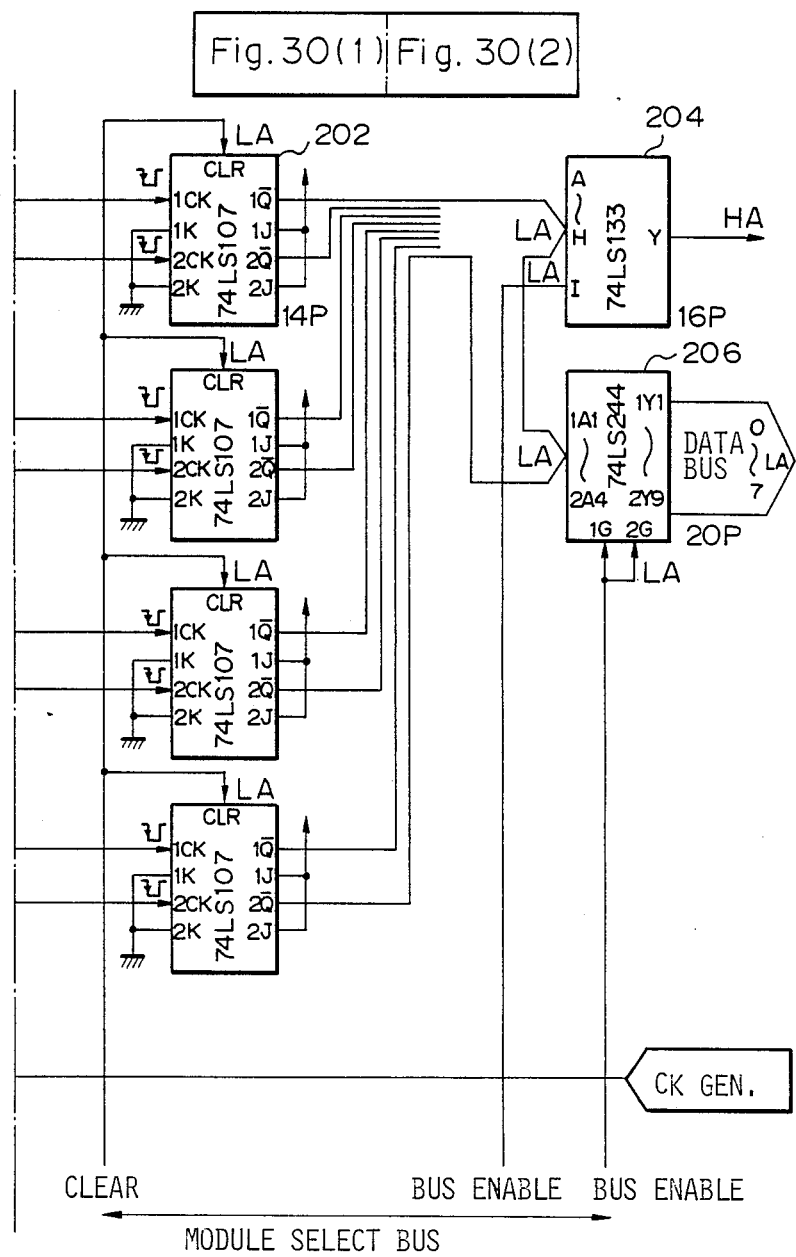
Fig. 30 (2)

COLLISION/DETECTION SINGLE NODE CONTROLLED LOCAL AREA NETWORK

This application is a continuation of application Ser. No. 06/947,525, filed on Dec. 29, 1986, now abandoned.

BACKGROUND OF THE INVENTION

The present invention relates to a communication network control system and, more particularly, to a control system for a local area network (LAN).

Communication network control systems know in the art include (a) a carrier sense multiple access (CSMA) baseband LAN, (b) a broadband LAN, (c) time division multiple access (TDMA) baseband LAN and digital PBX, (d) a system disclosed in Japanese Laid-Open Patent Publication (Kokai) No. 57-104339, (e) a system disclosed in Jpanese Laid-Open Patent Pubication (Kokai) No. 58-139543, (f) a system disclosed in Japanese Patent Application No. 60-170428, (g) a system disclosed in Japanese Patent Application No. 60-170429, and (h) a system disclosed in Japanese Patent Application No. 60-170427.

The system (a) proves effective when packets are short and occur in bursts like data information and text information. However, a problem with the system (a) is that when packets are potentially infinite in length and are generated continuously and real time processings of the packets are required, such as in multi-media communications, signals conflict very frequently to limit the throughput attainable. The words "multi-media communications" as used in the art of LANs covers not only the traditional data and text communications but also the interchange of image information, audio information and video information. The system (b) is rather short in capacity when applied to multi-media communications and, in addition, it is not fully acceptable in the aspect of cost performance and expansibility. As regards the system (c), although it has superior applicability to multi-media communications to any of the others, it also has problems left unsolved with regard to costs and expansibility; especially the costs are prohibitive when the system is applied to multi-media communications.

The systems (d) and (e), on which the present invention is based, are the most feasible with respect to multi-media communications. Nevertheless, because both of the systems (d) and (e) are operated with a first-come-first-served logic and on a multiple-input one-output basis, i.e., a node which has received call requests from a plurality of terminals accepts only the first request to transfer a call from a single terminal which has originated the request, connection control means which is installed in the node cannot allow a plurality of different communications to be effected in parallel.

The system (f) is a solution to the problems particular to the systems (d) and (e) as stated above. Specifically, in accordance with the system (f), a single node is capable of dealing with a plurality of communications at the same time, that is, a path with a particular pattern is fixed to prevent one communication from interfering with others. While such a scheme successfully promotes effective use of links and, thereby, interchange of massive data which is desirable for a large-scale LAN having a plurality of nodes, the system (f) is not applicable to a small-scale LAN in which the number of terminals is small.

Meanwhile, it is usually necessary for a call packet to be propagated through a plurality of nodes before reaching a terminal called. A preamble which heads a packet is cut little by little at each of the nodes to bring about a propagation delay, which in turn correspondingly increases the period of time during which a path is fixed to thereby increase the probability of conflict of the packet with others. The system (g) is elaborated to elminate the propagation delay so that the period of time during which a path is fixed may be shortened. Further, the system (h) sets up semi-duplex communication to allow a single node to perform communications over a plurality of channels, while the system (g) sets up semi-duplex communication which is directed to the increase of communication capacity. However, a drawback with such systems on which the present invention is based is that they are incapable of detecting conflicts or collisions of packets. Although the probability and the influence of collisions are less in such systems than in the others, it is desirable that even the faults with least frequency be eliminated when it comes to highly reliable systems.

As regards the reliability of communication systems, countermeasures have been proposed against (a) disconnection of a link, (b) down of a terminal or that of a node, and (c) collision, as will be described hereinafter.

To begin with, in a carrier sense multiple access with collision detection (CSMA/CD) coaxial cable baseband LAN as typified by the Ethernet system (Xerox), upon disconnection of a link a communication with a station on the other side of the point of disconnection is disable, and event a communication with a station on this side of the same point cannot be effected normally since a signal is reflected at that point. Concerning a failure of a terminal (tap, transmitter/receiver, NTU, etc.), it would not affect communications so long as only the functions of the terminal were disabled. However, if the failure was of the kind transmitting unexpected signals, it would destruct signals of all the communications. Further, this system is apt to cause collision frequently since it is based on a contention-for-single-bus principle; every time a collision occurs, information has to be retransmitted at the sacrifice of traffic.

In a TDMA optical fiber loop LAN, all the communications are shut off when a link is disconnected. To avoid this, such a LAN is usually provided a double-link configuration so that a communication may be returned over a new loop before it reaches a point of disconnection. Also, all the communications are disabled when a node which does not join in a communication under way has failed (functions disabled). Usually, such an occurence is handled with by doubling the link so that a communication may be returned over a new loop before it reaches the node in failure. Furthermore, when a node which is not taking part in a communication has failed and sent an unexpected signal, signals of all the communications are destroyed. Various controls adapted to settle the above sitations increase the total cost of the network. While a single supervisor node is installed in the network for the control of the entire network, it brings about another problem that if the supervising node fails, all the communcations are shut off. As regards collisions, because the capacity is substantially distributed to the nodes, there is no chance of a collision to occur although the capacity is limited.

As stated above, in the prior art LAN systems, the contention for a common bus type scheme cannot avoid frequent collisions and, due to retransmission which is required at each time of collision, lowers the traffic. In addition, in the case of a system which cannot detect a collision, a fault would occur to down the entire system.

SUMMARY OF THE INVENTION

It is therefore a first object of the present invention to provide a communication network control system which is capable of handling a plurality of communications at the same time, effectively applicable to a small-scale network which is implemented with a single node, and expansible to a large-scale LAN by use of the same protocol.

It is a second object of the present invention to provide a high throughput communication network control system which is capable of detecting a collision of packets so that communications may be effected efficiently despite congestion of communications.

It is a third object of the present invention to provide a communication network control system which is capable of detecting a collision of packets and supplying a transmit terminal with collision information to allow it to perform retransmission.

It is another object of the present invention to provide a generally improved communication network control system.

A communication network control system to which the present invention pertains has a single node, a plurality of transmit/receive terminals connected to the node, and a connection control device installed in the node to control connection of a plurality of input channels and output channels which correspond to the input channels, the connection control device connecting only one of the input channels on which first forward information has arrived earliest to all of the output channels which have not been used for other communications or to all of the output channels except for the output channel, which corresponds to the input channel, which have not been used for other communications, and disconnecting all of the input channels except for the input channel which have not been used for other communications from the output channels, and, when transmission of the first forward information is completed, connecting to one of the output channels corresponding to the input channel any of the input channels which corresponds to any of the output channels over which the first forward information has been outputted, thereby passing first return information through the control device, and upon completion of the first return information, connecting any of the input channels corresponding to the output channel, over which the first return information has been outputted, to any of the output channels corresponding to any of the input channels on which the first return information has been received, and repeating the above sequence of steps. In accordance with the present invention, the connection control device repeats a procedure of detecting any of the input channels on which a first input signal has appeared earliest and storing the input channel first; when a second input signal is present on any of the input channels corresponding to any of the output channels over which the first input signal has been outputted, detecting the input channel and storing the input channel second; outputting the input signal over any of the output channels corresponding to the input channel which has been stored first and, when third input signals are present on any of the input channels other than the input channels which have been stored first and second, connecting any of the input channels on which the third input signal has appeared earliest to all of the output channels except for any of the output channels which correspond to the input channels stored first and second or which corresponds to the input channels, and storing the input channel on which the earliest one of the third input signals has appeared third; when a fourth input signal has appeared on any of the input channels corresponding to any of the output channels over which the third input signal has been outputted, detecting the input channel and storing the input channel fourth; and outputting the fourth input signal over any of the output channels which corresponds to the input channel stored third.

A communication network control system to which the present invention also pertains has a single node, a plurality of transmit/receive terminals connected to the node, and a connection control device installed in the node for controlling connection of a plurality of input channels and output channels which correspond to the input channels, the connection control device connecting only one of the input channels on which first forward information has arrived earliest to all of the output channels which have not been used for other communications or to all of the output channels except for any of the output channels, which corresponds to the input channel, which have not been used for other communications, and disconnecting from the output channels the input channels except for the input channel which have not been used for other communications, and upon completion of transmission of the first forward information, connecting to any of the output channels corresponding to the input channel any of the input channels which corresponds to any of the output channels over which the first forward information has been outputted, and connecting any of the input channels corresponding to the output channel over which the first return information has been outputted to any of the output channels corresponding to the input channel on which the first return information has appeared, and repeating the above sequence of operations. In accordance with the present invention, the connection control device connects all of the input channels which have not been used for other communications, or are in a fixed path condition, to all of the output channels which are not in a fixed path condition or all of the output channels in the condition except for any of the output channels which corresponds to the input channel; when input signals have appeared on a plurality of the input channels, once outputs the input signals over the output channels and, then, detects and stores first any of the input channels on which first forward information of a first communication appeared earliest, and disconnects from the output channels the input channels except for the input channel stored first; and upon completion of the forward information, connects any of the input channels corresponding to any of the output channels over which the forward information has been outputted to any of the output channels corresponding to the input channel stored first and, then, stores second any of the input channels on which the return information of the first communication has arrived, thereby fixing a path.

A communication network control system to which the present invention also pertains has a single node, a plurality of transmit/receive terminals connected to the node, and a connection control device installed in the node for controlling connection of a plurality of input channels and output channels which correspond to the input channels, the connection control device connection only one of the input channels on which first forward information has arrived earliest to all of the output channels which have not been used for other communications or to all of the output channels except for any of the output channels, which corresponds to the input channel, which have not been used for other communications, and disconnecting from the output channels the input channels except for the input channel which have not been used for the other communications, and upon completion of transmission of the first forward information, connecting to any of the output channels corresponding to the input channel any of the input channels which corresponds to any of the output channels over which the first forward information has been outputted, thereby passing the first return information through the connection control device, and upon completion of the first return information, connecting any of the input channels corresponding to any of the output channels over which the return information has been outputted to any of the output channels corresponding to any of the input channels on which the first return information has appeared, and repeating the above sequence of operations. In accordance with the present invention, the connection control device comprises a switching matrix unit constituted by switching elements for connecting any of the input channels to any of the output channels simultaneously in a plurality of combinations, a first input signal detecting unit for detecting any of the input channels on which an input signal has appeared first, an input signal monitoring unit for, when information on presence/absence of an input signal on any of the input channels has been changed, producing an output which is indicative of the change to the outside, a control gate unit constituted by switching elements for connecting any of a plurality of input channels to the first input signal detecting unit, and a switching control unit for controlling the switching elements of the switching matrix unit and the switching elements of the control gate unit by reading information on an input signal out of the first input signal detecting unit and input signal monitoring unit.

In a communication network control system to which the present invention also pertains has a plurality of node connected by links, a plurality of transmit/receive terminals connected to the nodes, and a connection control device installed in each of the nodes for controlling connection of a plurality of input channels and output channels which correspond to the input channels, the connection control device connecting any one of the input channels on which first forward information has arrived earliest to all of the output channels which have not been used for other communications or to all of the input channels except for any of the output channels corresponding to the input channel, and disconnecting the input channels except for the input channels which have not been used for other communications from the output channels. In accordance with the present invention, each of the nodes compares a phase of an input signal arrived first on any of the input channels and a phase of an input signal arrived on another of the input channels later than the signal arrived first so as to detect any of the input channels on which a differential resulting from the comparison is greater than a predetermined value, thereby detecting that a collision has occurred between the node and another node or any of the terminals to which the input channel detected is connected.

In a communication network control system to which the present invention also pertains has a plurality of nodes which are interconnected by links, a plurality of transmit/receive terminals connected to the nodes, and a connection control device installed in each of the nodes for controlling connection of a plurality of input channels and output channels which correspond to the input channels, the connecition control device controlling connection of any of the input channels on which first forward information has arrived earliest and all of the output channels which have not been used for other communications, connecting only the input channel on which the first forward information has arrived earliest to all of the output channels which have not been used for other communications or to all of the output channels except for any of the output channels which corresponds to the input channel, and disconnecting from the output channels the input channels except for the input channel which have not been used for other communications. In accordance with the present invention, each of the nodes compares and input signal appeared first on any of the input channels and an input signal appeared on another of the input channels later than the input signal and, assuming that a maximum delay time between input and output of a signal to and from the node is Tn and a maximum link propagation delay time at a maximum node-to-node distance is T1, determines that a collision has occurred between the node and another node or any of the terminals to which the input channel, on which the input signal has appeared later, is connected when a signal representative of a differential between the first signal and the later signal remains at a high level more than a predetermined period of time Td of 2 (Tn+T1).

In a communication network control system to which the present invention also pertains has a plurality of nodes interconnected by links, a plurality of transmit/receive terminals connected to the nodes, and a connection control device installed in each of the nodes for controlling connection of a plurality of input channels and output channels which correspond to the input channels, the connection control device connecting only one of the input channels on which first forward information has arrived earliest to all of the output channels which have not been used for other communications or to all of the output channels except for any of the output channels which corresponds to the input channel, and disconnecting the input channels except for any of the input channels which have not been used for other communications from the output channels. In accordance with the present invention, each of at least a part of the terminals compares an output signal which the terminal has sent and an input signal which has been sent by any of the nodes to which the terminal is connected and, when detected that a differential resulting from the comparison is greater than a predetermined value, decides that a collision has occurred between the terminal and the node.

In a communication network control system to which the present invention also pertains has a plurality of nodes interconnected by links, a plurality of transmit/receive terminals connected to the nodes, and a connection control device installed in each of the nodes for controlling connection of a plurality of input channels and output channels which correspond to the input channels, the connection control device connecting only one of the input channels on which first forward information has arrived earliest to all of the output channels which have not been used for other communications or to all of the output channels except for any of the output channels which corresponds to the input channel, and disconnecting the input channels except for any of the input channels which have not been used for other communications from the output channels. In accordance with the present invention, each of the terminals compares an output signal thereof and an input signal thereto and, when a signal has been outputted over any of the output channels of the terminal, compares the output signal on the output channel and an input signal on any of the input channels which corresponds to the output channel and, if a differential signal resulting from the comparison remains at a high level more than a predetermined period of time T'd which is equal to $Tn+2T'1$, where Tn is a maximum delay time between input and output of a signal to and from a node and T'1 is a maximum link propagation delay time at a maximum node-to-terminal distance, decides that a collision has occurred between the terminal and any of the nodes to which the terminal is connected.

In a communication network control system to which the present invention also pertains has a plurality of nodes interconnected by links, a plurality of transmit/receive terminals connected to the nodes, and a connection control device installed in each of the nodes for controlling connection of a plurality of input channels and output channels which correspond to the input channels, the connection control device connecting any one of the input channels on which first forward information has arrived earliest to all of the output channels which have not been used for other communications or any of the output channels corresponding to the one input channel, and disconnecting from the output channels the input channels except for the input channel which have not been used for other communications. In accordance with the present invention, each of the nodes compares in phase an input signal which has arrived on any of the input channels first and an input signal which has arrived on another of the input channels later than the input signal and, if a differential resulting from the comparison is greater than a predetermined value, produces the difference as a differential signal and sends the differential signal as a collision detection signal over any of the output channels corresponding to the input channel on which the input signal arrived first.

The above and other objects, features and advantages of the present invention will become more apparent from the following detailed description taken with the accompanying drawings.

BRIEF DESCRIPTION OF THE DRAWINGS

FIG. 3 is a view similar to FIG. 1, showing another prior art network;

FIG. 30 is a diagram showing a comparing circuit which is representative of another embodiment of the present invention.

DESCRIPTION OF THE PREFERRED EMBODIMENTS

To better understand the present invention, a a brief reference will be made to prior art network control systems.

Figure 1:
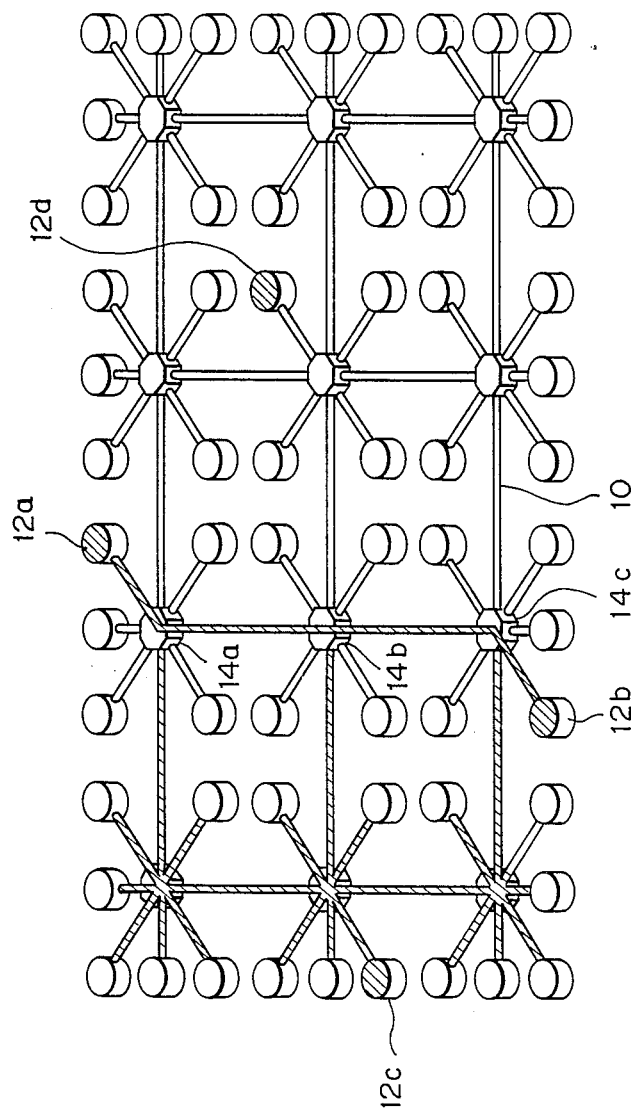
FIG. 1 is a diagram showing a prior art network.
Figure 2:
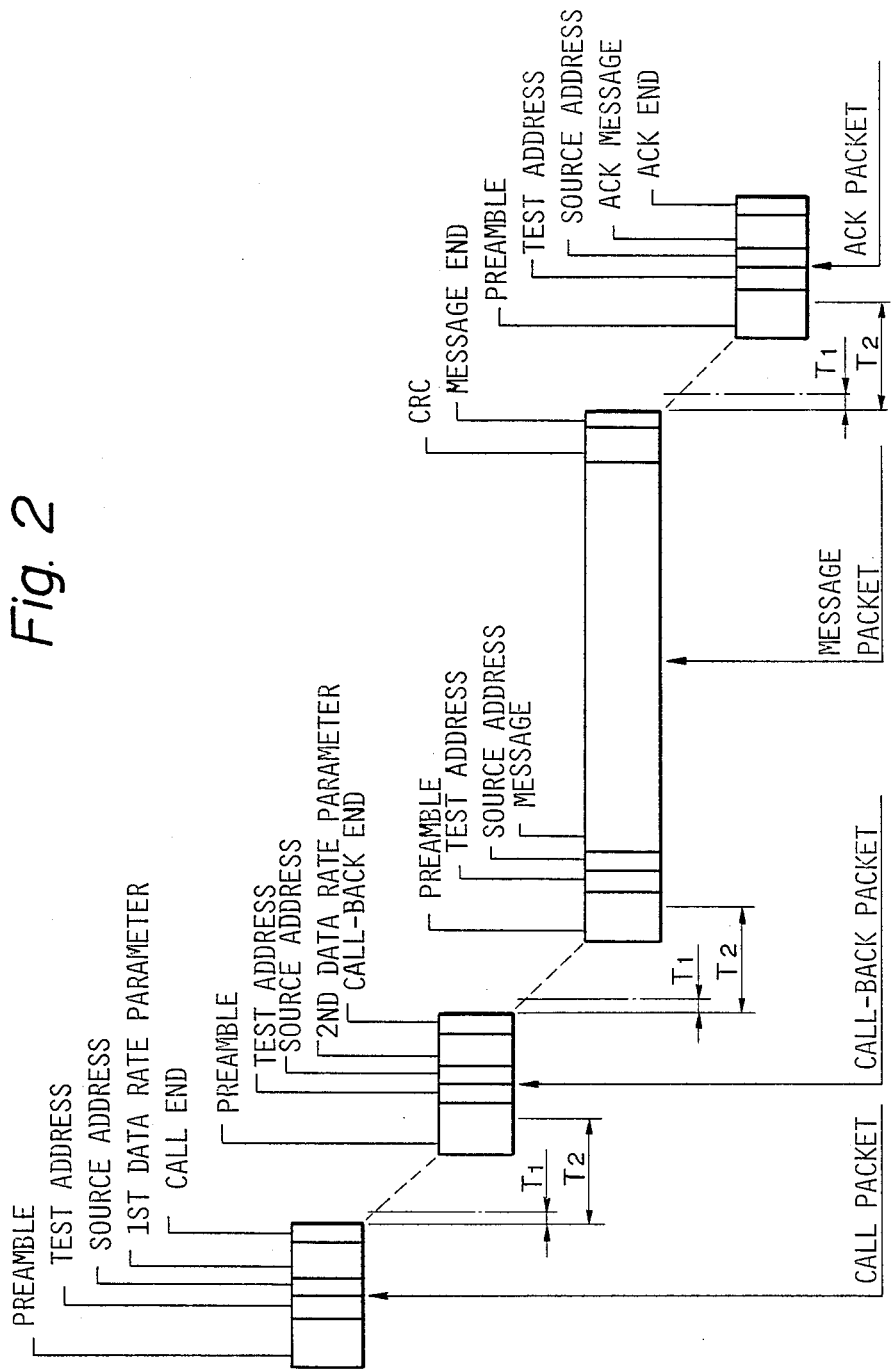
FIG. 2 is a view showing shows arrangements of packets.

Referring to FIG. 1, the construction of the network (d) as previously discussed and disclosed in Japanese Laid-Open Patent Publication No. 57-104339 is shown. The system of FIG. 1 is characterized by a first-come-first-served logic, multi-connection structure, and fixing of a path by a multi-input single-output element. As shown, a number of terminals 12a, 12b, 12c and so on are interconnected by communication paths 10 to complete a network. Terminals which are to hold a communication interchange four basic packets, i.e., a call packet, a call-back packet, a message packet and an acknowledge or ack packet as shown in FIG. 2, which are adapted to control nodes 14a, 14b, 14c and so on. Having a multi-connection structure, each of the nodes gates only one communication according to the order of arrival of packets while causing the others to wait, whereby a multi-input single-output operation is accomplished. The node fixes a single communication path by changing the direction of transmission such that the sequence of packets of FIG. 2 are sequentially reversed in the direction of transfer. Further, the node has a function of identifying a destination address so that it may detect a destination address which is added to a packet and, if it is that of any terminal which is connected to itself, delivers the packet to the terminal. If the packet is not meant for a teminal connected to the node, the destination address is not used for any control.

As shown in FIG. 2, the call packet is made up of a preamble, an address which follows the preamble, and a message which follows the address. Usually, the message fragment of a call packet has no content since the function of a call packet is not more than calling a destination. Added to the call-back packet is only a preamable. A terminal called, or call-back end, sends the call-back packet to a terminal calling or call end, when the destination address is coincident with its own address. Because any of the nodes through which the call packet has been passed reverses the direction of transfer upon the lapse of a predetermined period of time, the call-back packet is allowed to safely reach the call end along the route through which the call packet had been propagated, but in the opposite direction. The message packet which is sent from the call end to the call-back end includes a preamble and a message. Because any of the nodes through which the call-back packet has been propagated reverses the direction of transfer upon the lapse of a predetermined period of time, the message packet is surely delivered to the call-back end even if it lacks an address. The ack packet is returned from the call-back end to the call end when the former has successfully received the message. Again, the ack packet can surely reach the call end even if it lacks an address. In this manner, a path is fixed simply by adding an address to the first packet, whereby a packet is interchanged by two full rounds.

The system (e) disclosed in Japanese Laid-Open Patent Publication No. 58-139543 is essentially the same as the above-described system except that it causes all the addresses to be identified by terminals and not by nodes so as to cut down the system cost.

Any of the two prior art systems as discussed above is operated such that when received call requests from a plurality of terminals, a node accepts only the first request to transfer a call from a single terminal. It follows that connection control means installed in each node cannot accommodate a plurality of communications simultaneously, and this is quite inconvenient. Specifically, assume that a path is fixed in a particular pattern between the terminals 12a and 12b, as indicated by hatching in FIG. 1. Then, despite that each of the three nodes 14a, 14b and 14c through which the path extends has other available links, the links except for the one which has been occupied are disconnected with the result that the network is cut in halves. Under this condition, the terminals 12c and 12d, for example, cannot hold a communication with each other until the communication between the terminals 12a and 12d is completed.

The system (f) disclosed in Japanese Patent Application No. 60-170428 as previously stated is a solution to the above problem. In accodance with this system (f), a plurality of communications may be handled simultaneously so as to prevent a path set up in a particular pattern from interfering with other communications. Specifically, as shown in FIG. 3, because each node is capable of dealing with a plurality of communications at the same time, there can be held a communication between, for example, the terminals 12d and 12e, a communication between the terminals 12c and 12f, and a communication between the terminals 12g and 12h without being effected by the fixed path pattern. As soon as the first forward information and the first return information are fully interchanged through any of the nodes, all the other channels assigned to the node are brought into connection to output only that channel on which an input signal arrived earliest is present. As previously discussed above, this kind of system is limited in applicable range concerning the scale.

Hereinafter will be described preferred embodiments of the present invention which are free from the drawbacks inherent in the prior art systems as described above.

First embodiment

This embodiment is directed to the first object as previously stated. First, the principle of this embodiment and that of a prior art system will be described to compare them.

Figure 4A:
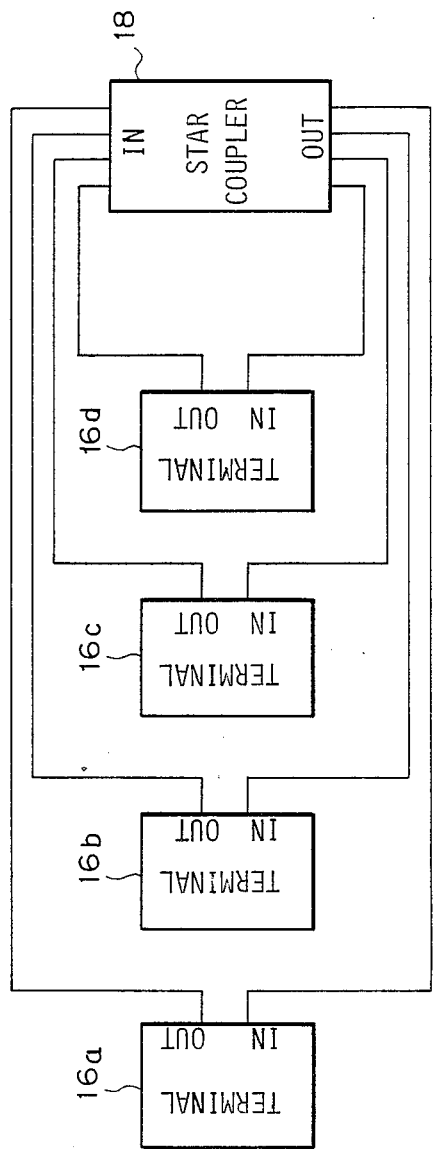
FIGS. 4A and 4B are block diagrams showing the construction and operation of an optical star network for comparison with the present invention.
Figure 4B:
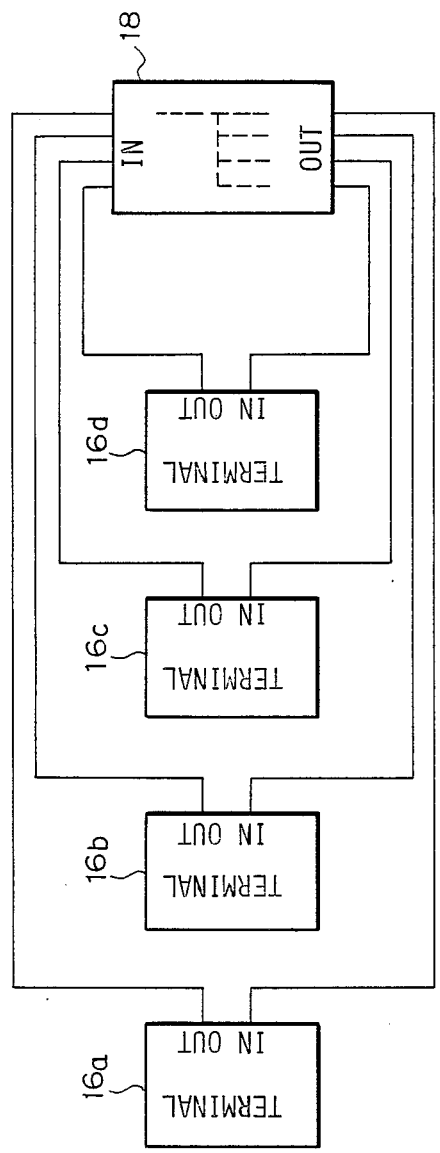

Referring to FIG. 4A, a prior art optical star network is shown which includes terminals 16a to 16d and a star coupler 18. Because a network in accordance with this embodiment has a star type physical topology, it will be described in conjunction with a prior art optical star type network for comparison purpose. While the physical configuration of an optical star network is of a star type, its connection will be understood more easily when represented in a side view, as shown in FIG. 4A. An input port IN and an output port OUT of each of the terminals 16a to 16d are respectively connected to an output port OUT and an input port IN of the star coupler 18. FIG. 4A shows an access method which is used with the network of FIG. 4A. As shown, a packet which is sent from the transmit terminal 16a is propagated to the input port IN of the star coupler 18 and, then, fed from the output port OUT of the start coupler 18 to the channels which are connected to the terminals 16a to 16d. It will be seen from FIG. 4B that the logical topology is of a bus type. Because contention usually occurs for the single bus, the CSMA/CD system is used to implement accesses.

Figure 5:
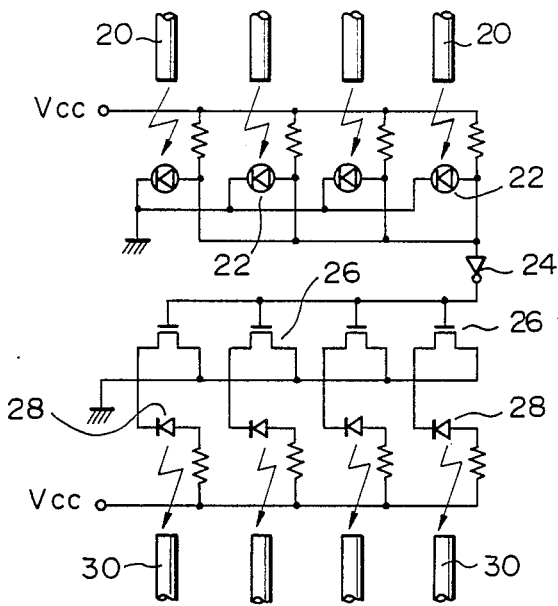
FIG. 5 and 6 are diagrams showing different constructions of a star coupler as shown in FIG. 4A.
Figure 6:
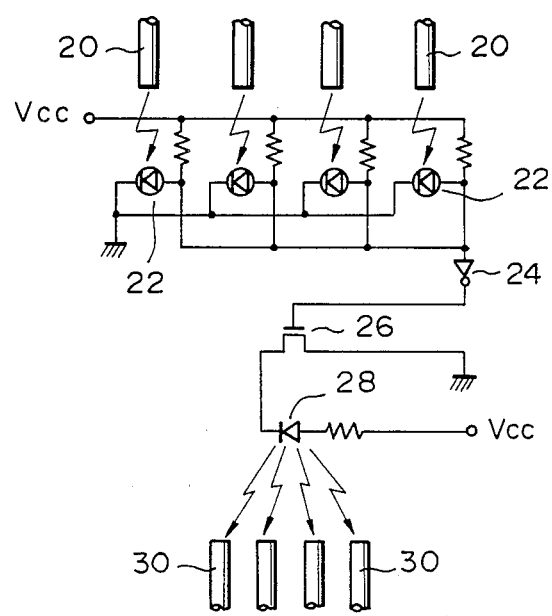

Referring to FIGS. 5 and 6, there are shown different specific constructions of the star coupler of FIG. 4A. The node shown in FIG. 5 is provided with the same number of optical-to-electronic converting sections (O/Es) and electronic-to-optical converting section (E/Os) as the input and output channels. The node of FIG. 6, on the other hand, is provided with the same number of O/Es as the input and output channels, and a single E/O which has great output energy. Alternatively, use may be made of an O/E having high sensitivity or a directional coupler which bundles up optical fibers at the input channels in order to reduce the number of O/Es to one. In FIGS. 5 and 6, the reference numeral 20 designates optical fibers, 22 designates photodiodes/transistors, 24 designates an inverter, 26 designates metal oxide semiconductor (MOS) transistors, 28 designates light-emitting diodes (LEDs), and 30 designates optical fibers. Packets from four terminals, for example, are propagated through the optical fibers 20 to the input port of the star coupler 18. The packets are converted by the four diodes 22 associated therewith into electric signals which are directed toward a common line. At the output port as shown in FIG. 5, the electric signals cause the inverter 24 to drive the transistors 26 which are adapted to drive the LEDs 28, whereby light issuing from each LED 28 is sent to all the terminals 16a to 16d over their associated optical fibers 30. At the output port as shown in FIG. 6, on the other hand, the inverter 24 operates a single transistor 26 so that light issuing from a single LED 28 is propagated through the four optical fibers 30 to the respective terminals 16a to 16d.

Figure 7:
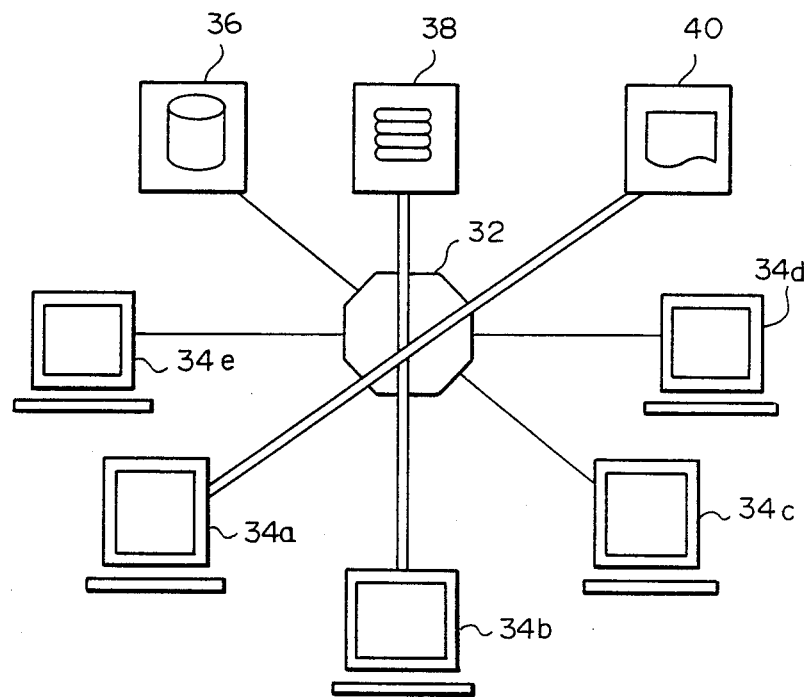
FIG. 7 is a schematic view of a system embodying the present invention.

Referring to FIG. 7, the functions of this particular embodiment are schematically shown. In this embodiment, a single node 32 is installed in the network in order to control a plurality of communications. In FIG. 7, a first to a fifth terminals are labeled 34a to 34e, respectively, and may be implemented with a keyboard display, a word processor with a communication function, a personal computer, etc. Designated by the reference numeral 36 is a disk server, 38 an optical disk server, and 40 a print server. In this embodiment, the first terminal 34a outputs data to the printer server 40, and the second terminal 34b reads file data out of the optical disk server 38. In this manner, the single node 32 is capable of controlling a plurality of communications at the same time and in a parallel relationship.

Figure 8A:
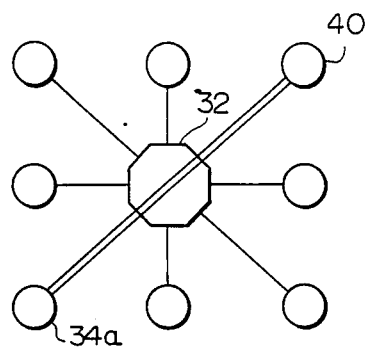
FIGS. 8A to 8E are schematic diagrams representative of a sequence of connecting operations as performed in the system of FIG. 7.
Figure 8B:
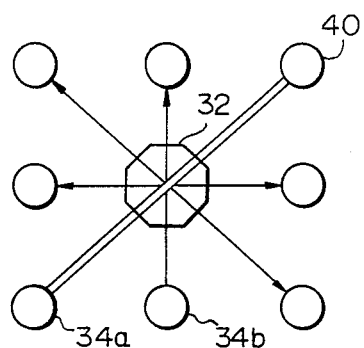
Figure 8C:
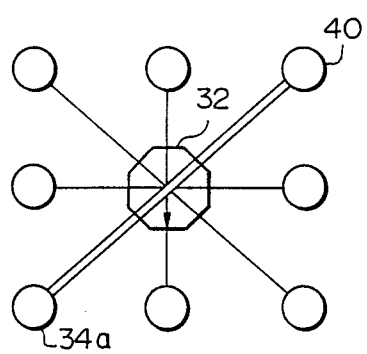
Figure 8D:
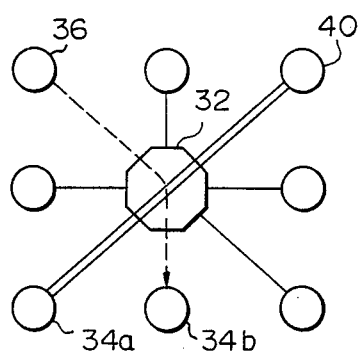
Figure 8E:
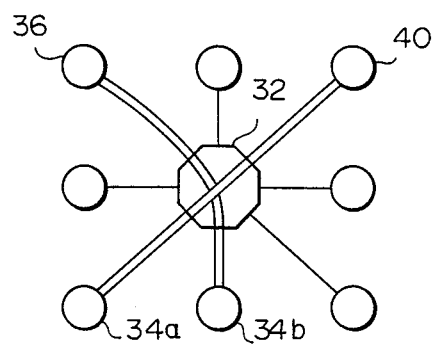

Referring to FIGS. 8A to 8E, a sequence of controlling the connection of the node as shown in FIG. 7 is demonstrated. In FIGS. 8A to 8E, the same devices as those shown in FIG. 7 are designated by like reference numerals. The node 32 does not discriminate a node-to-node connection and a node-to-terminal connection from each other, while allowing the number of nodes to be increased without any restriction. Further, even when the system is expanded by increasing the number of nodes, it is needless for the protocol to be modified. FIG. 8A shows a condition wherein a fixed link is set up between the first terminal 34a and the print server 40 by the interchange of information via the node 32. In this condition, assume that a call packet from the second terminal 34b has arrived at the node 32 for the first time. Then, the node 32 delivers the call packet from the terminal 34b to the other terminals 34c to 34e, disk server 104, and optical disk server 38, as shown in FIG. 8B. Then, as shown in FIG. 8C, the node 32 reverses the direction of communication upon the lapse of a predetermined period of time after the passage of the first forward information (call packet). In FIG. 8D, the node 32 is shown as passing therethrough only one first return information (call-back packet from the destination terminal 36). This return information surely reaches the terminal 34b even if no destination address is added thereto. Finally, as shown in FIG. 8E, a fixed link is set up for the second communication (between the terminal 34b and the disk server 36) in addition to the fixed link for the first communication (between the terminal 34a and the print server 40). That is, two independent communications are held via the single node 32.

Figure 9:
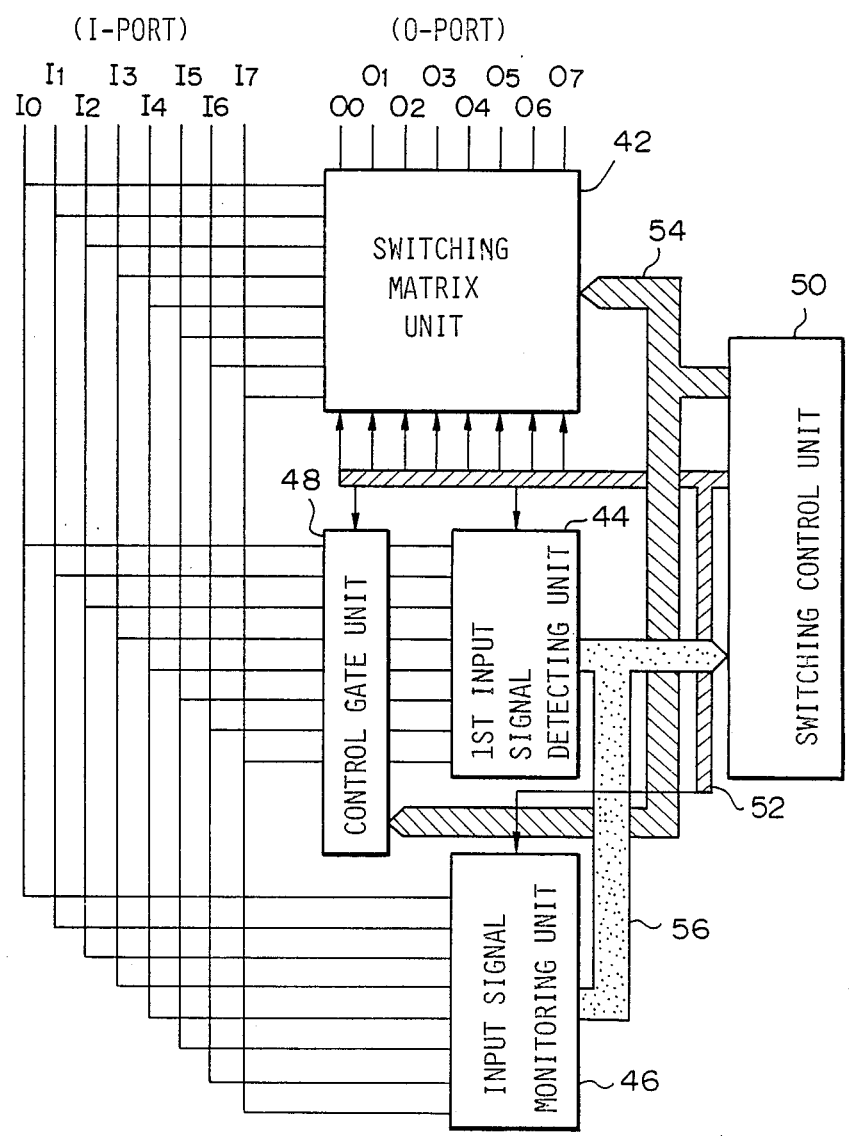
FIG. 9 is a block diagram showing an internal arrangement of a node as shown in FIG. 7.

Referring to FIG. 9, a specific internal arrangement of the node 32 of FIG. 7 is shown. As shown, the node 32 comprises input ports $I_1$ to $I_7$, output ports $O_0$ to $O_7$, a switching matrix unit 42 adapted to interconnect input channels and output channels which are associated with the ports $I_0$ to $I_7$ and $O_0$ to $O_7$, a first input signal detecting unit 44 for detecting a particular input channel on which an input signal arrived earliest has appeard, an input signal monitoring unit 46 for constantly monitoring input signals, a control gate unit 48 for selectively connecting the input channels to the unit 44, and a switching control unit 50 for controlling the entire node. Assuming that the node 32 has eight intput channels, the switching matrix unit 42 comprises eight modules which are assigned one-to-one to the output channels, while each of the units 44, 46 and 48 comprises a single module. These modules are connected to the switching control unit 50 by a select bus 52, a gate set bus 54, and a data bus (output signal lines of the modules) 56. Receiving outputs of the units 44 and 46 over the data bus 56, the switching control unit 50 controls the selection of a module of the switching matrix unit 42 via the module select bus 52 as well as the operation of the units 44 and 46 while, at the same time, controlling the units 42 and 48.

Figure 10A:
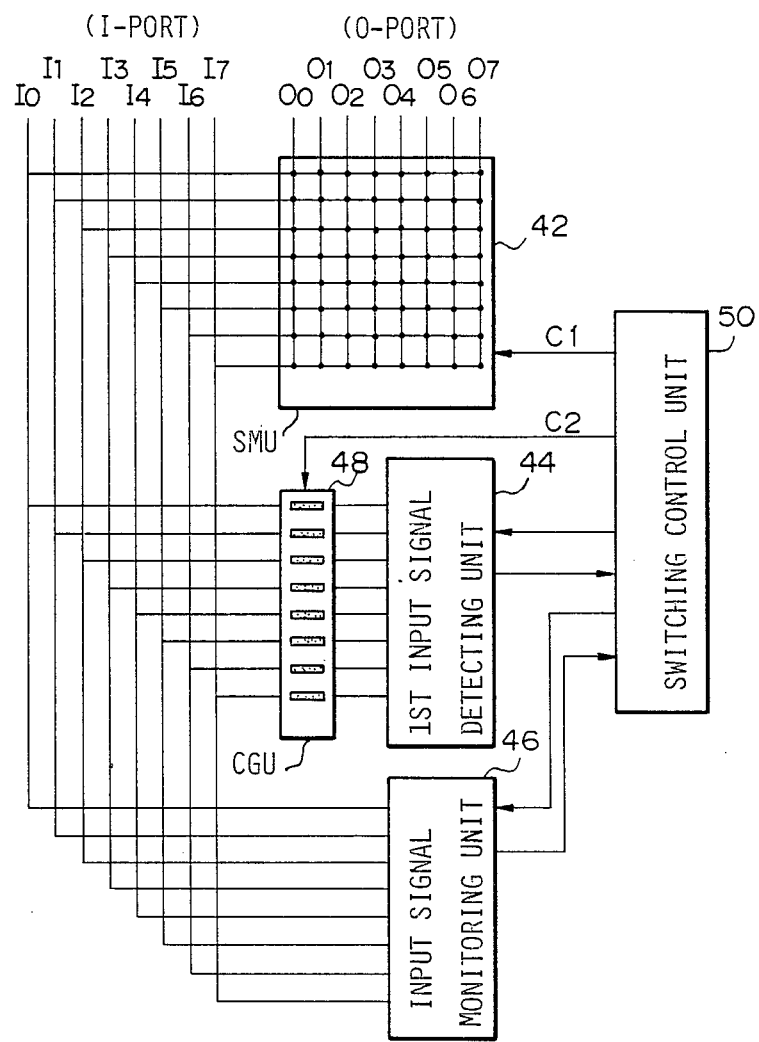
FIGS. 10A to 10H are diagrams showing an operating sequence of the node as shown in FIG. 9.
Figure 10B:
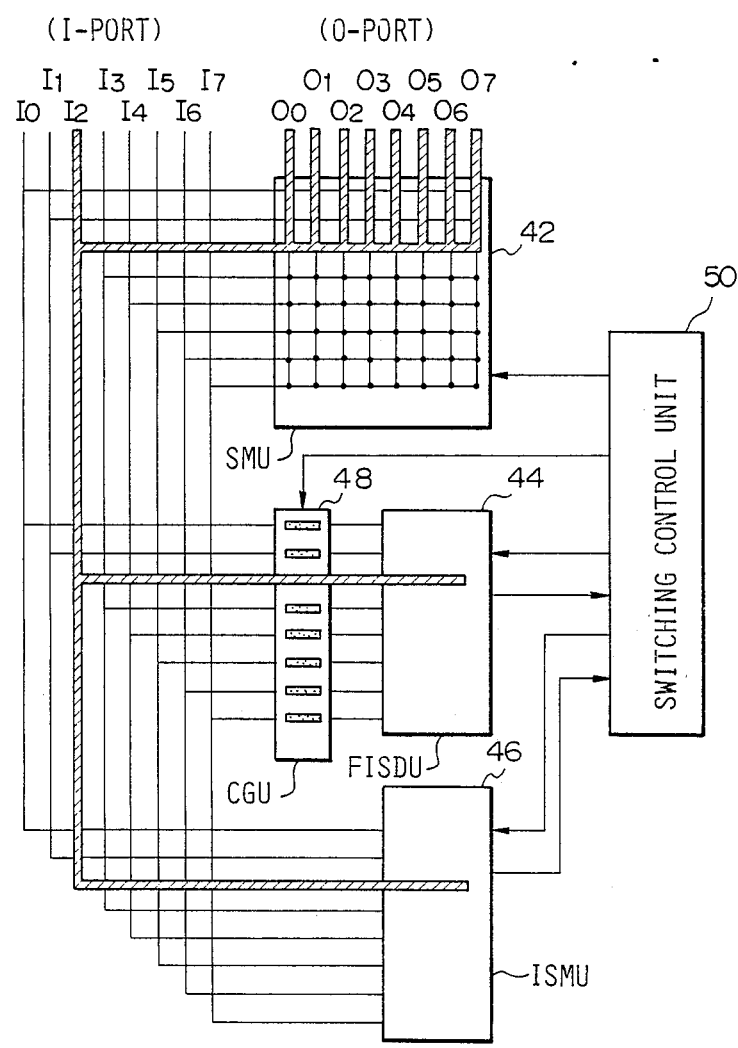

Referring to FIGS. 10A to 10H, the operating sequence of each of the units as shown in FIG. 9 is shown. As shown in FIG. 10A, in the initial condition of the node 32, the switching control unit 50 connects all the input channels of the control gate unit 48 to the first input signal detecting unit 44 by a control signal $C_1$ and, at the same time, connects the input channels $I_0$ to $I_7$ of the switching matrix unit 42 to the output channels $O_0$ to $O_7$ by a control signal $C_2$. When an input signal has appeared on, for example, the input channel $I_2$, as shown in FIG. 10B, the input signal is sent out over all the output channels $O_0$ to $O_7$. The input signal on the input channel $I_2$ which is applied to the control gate unit 48 is transferred to the first input signal detecting unit 44. Further, the input signal is routed to the input signal monitoring unit 46.

Figure 10C:
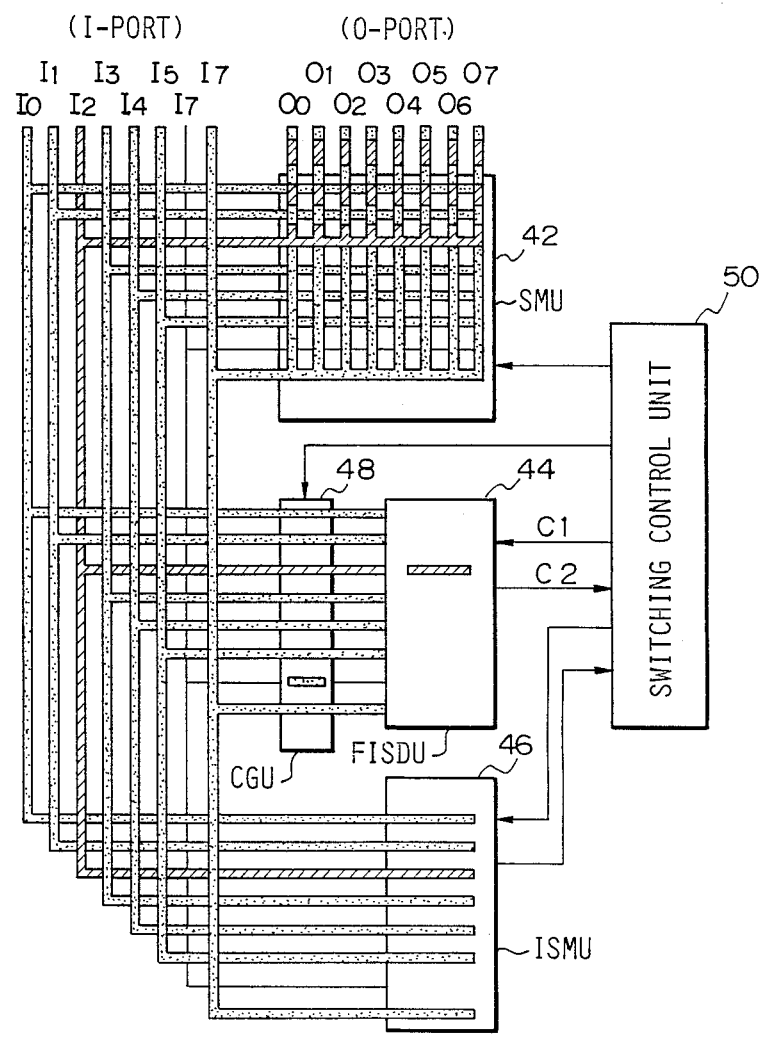
Figure 10D:
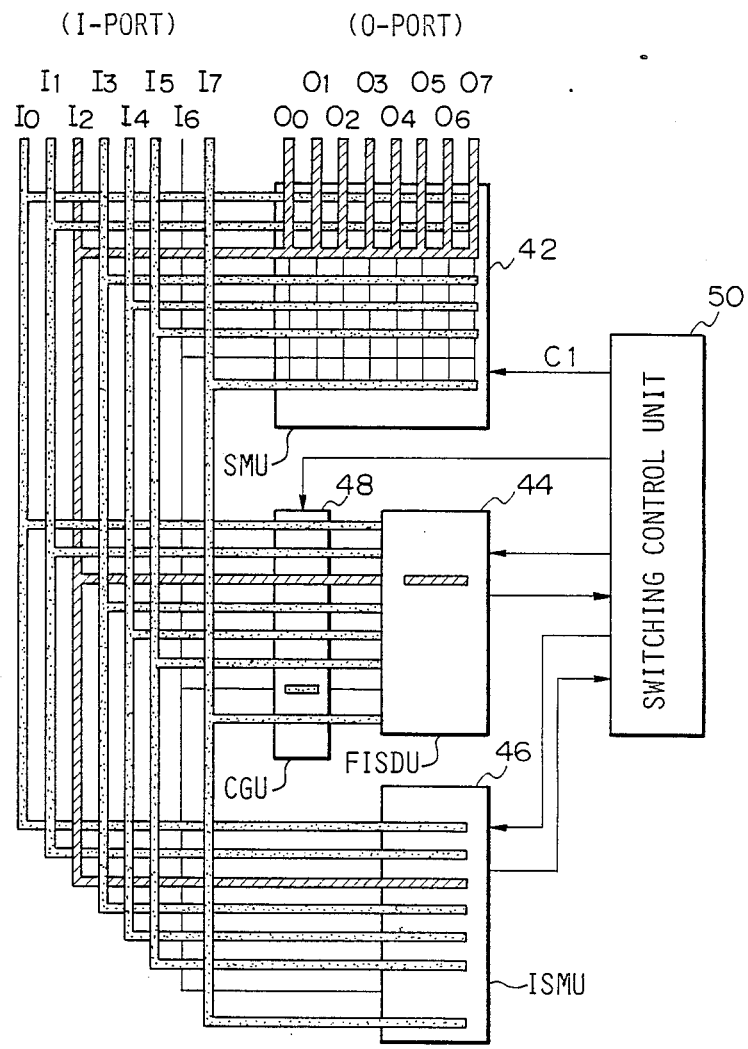

FIG. 10C shows a condition, wherein input signals have arrived over the input channels other than the channel $I_2$, too. The unit 44 detects that an input signal has appeared on the input channel $I_2$ first, while the switching control unit 50 reads it out by the control signals, $C_1$ and $C_2$ to perform first storage. Subsequently, when input signals have appeared on other channel, they are also outputted over the output channels $O_0$ to $O_7$. At this instant, an interference occurs in the outupt signals. FIG. 10D shows a condition wherein the input channels other than a one on which an input signal has arrived earlies are disconnected from the output channels. Specifically, the unit 50 cuts off the connection of the input channels of the unit 42 other than $I_2$, i.e., the input channels $I_0$, $I_1$ and $I_3$ to $I_7$ to the output channels $O_0$ to $O_7$ by the control signal $C_1$.

Figure 10E:
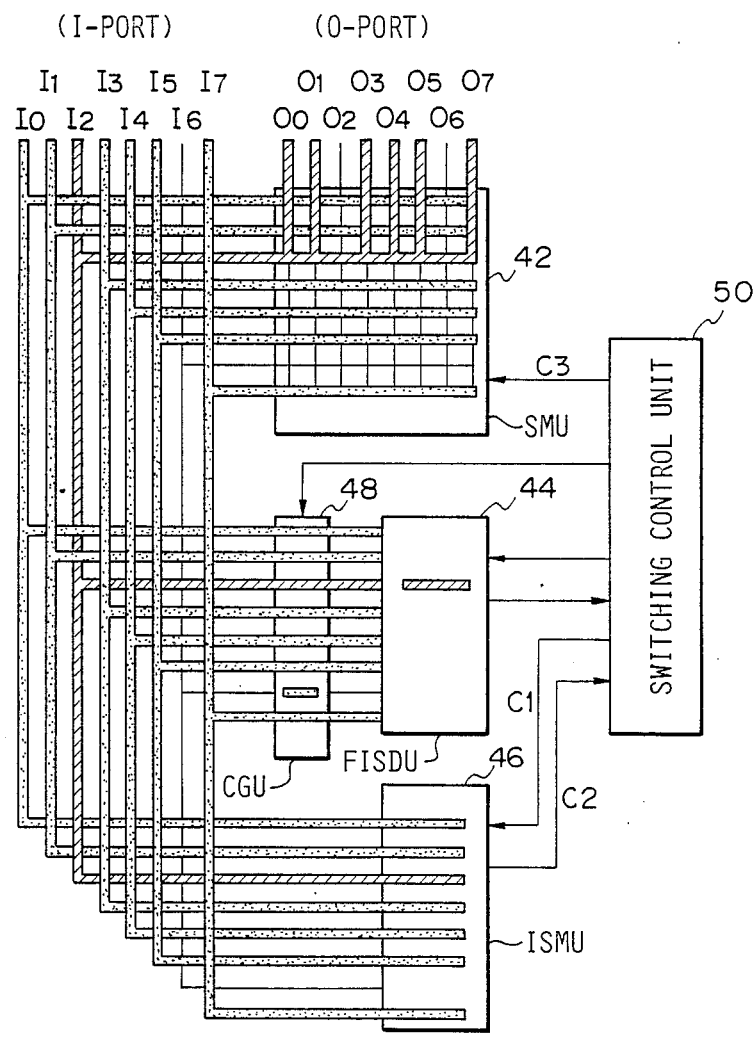

FIG. 10E shows a modification to the operation as shown in FIG. 10D. The modified sequence of FIG. 10E makes it possible to disconnect an input channel with an input signal arrived first from a particular one of the output channels which corresponds to the input channel or any other output channel which is associated with a link which has failed. For this purpose, the terminal, like the node, is constructed such that when it has received the first forward information on an input channel thereof, it sends out the information from its channel. Specifically, although the input channel $I_2$ of the unit 42 is connected to all the output channels to transmit the input signal, the signal applied to the output channel $O_2$ associated with the input channel $I_2$ will simply be returned to the call and to serve no purpose but confirmation and, for this reason, the particular input channel is disconnected from the output channel associated therewith. Meanwhile, assume that a signal sent from this node to an adjacent node or the first forward information sent to a terminal having the special construction as described above is not returned to any of the input channels on which the signal is expected to appear immediately, e.g. input channel $I_6$. In this condition, it is possible to inhibit the connection to the output channel $O_6$ which corresponds to the input channel $I_6$, considering that the a fault has occurred in that link or that the adjacent node or the terminal is not powered. This is effected by a control signal $C_3$ which is generated by the switching control unit 50.

Figure 10F:
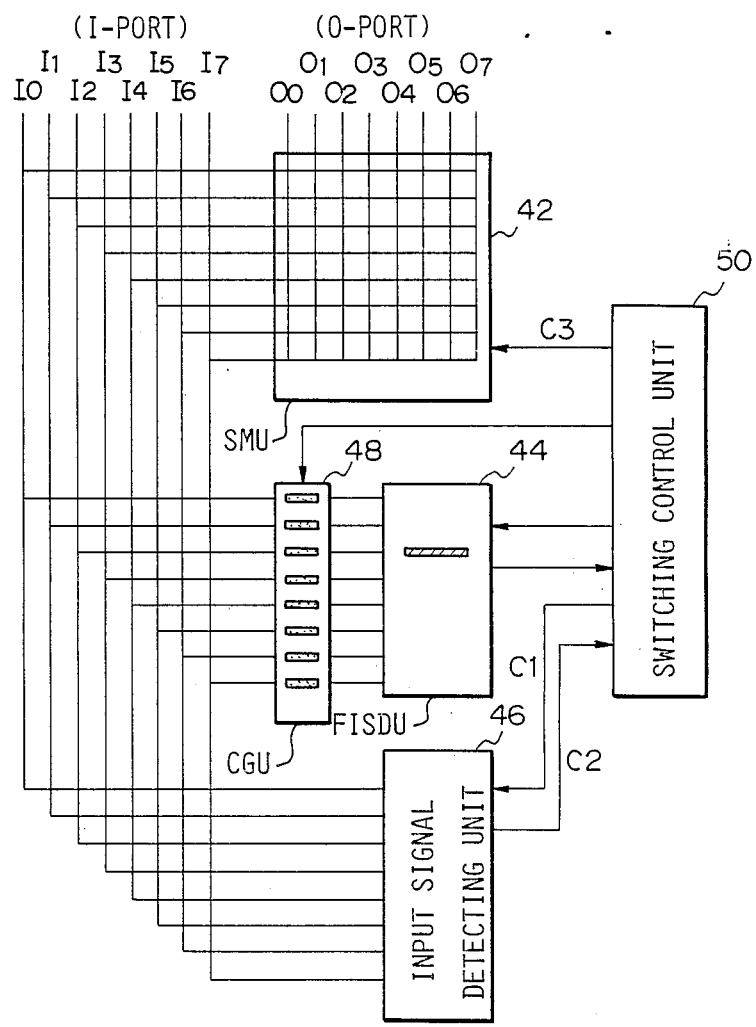
Figure 10G:
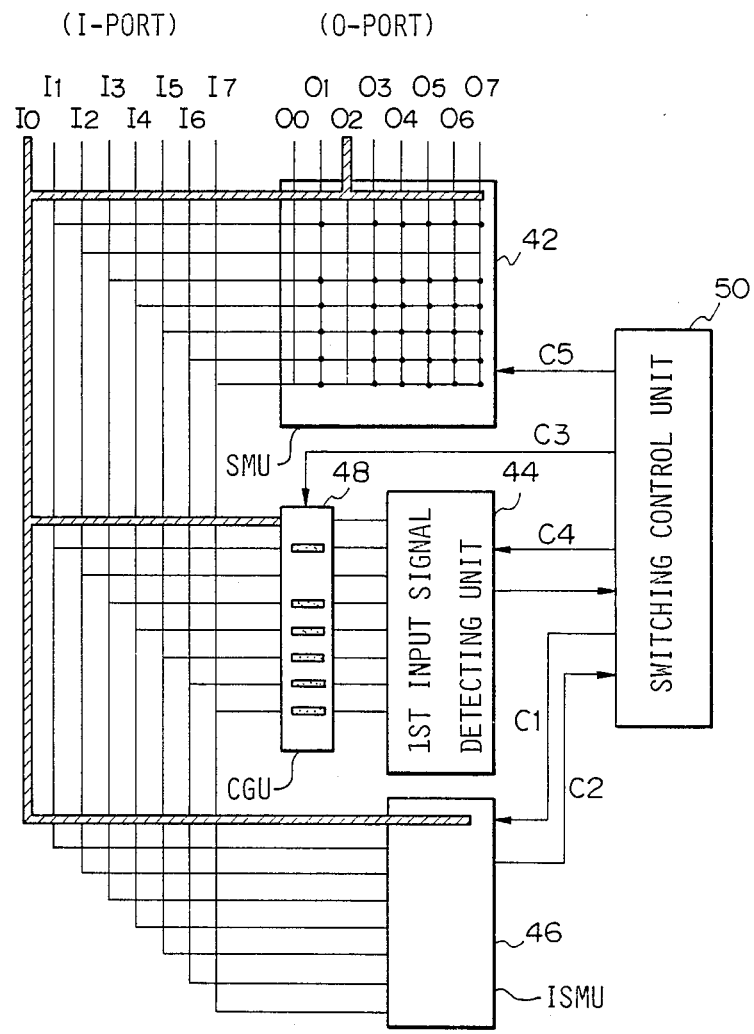

FIG. 10F shows a condition wherein after the completion of the forward information the direction of transfer is to be switched to prepare for return information. Specifically, when the input signal monitoring unit 46 has detected the end of the input signal, the switching control unit 50 senses it with the control signals $C_1$ and $C_2$ and, then, controls the switching matrix unit 42 by the control signal $C_3$ to thereby connect the input channels $I_0$ to $I_7$, the input channels $I_0$, $I_1$ and $I_3$ to $I_7$, or the input channels $I_0$, ($I_2$), $I_3$ to $I_5$ and $I_7$ to the output channel $O_2$. This allows return information to be surely delivered to the sender of the forward information with no regard to the input channel. FIG. 10G shows a condition whrerein return information has arrived at the node. Specifically, as return information which is a response to the previously delivered forward information arrives over a certain input channel, e.g., input channel $I_0$ within a predetermined period of time, it is routed to the output channel $O_2$ which has already been connected to the input channel $I_0$. Where the first communication is constituted by the previously delivered forward information and the return information to be delivered this time, the monitoring unit 46 detects the arrival of the first return information of the first communication on the input channel $I_0$, while the control unit 50 reads it out with the control signals $C_1$ and $C_2$ to perform second storage. The unit 50 connects the input channels $I_1$ and $I_3$ to $I_7$ of the control gate unit 48 to the signal detecting unit 44 by the control signal $C_3$, resets the unit 44 by a control signal $C_4$, and connects the input channels $I_1$ and $I_3$ to $I_7$ to the outut channels $O_1$, $O_3$ to $O_7$. Under this condition, the node waits for input signals over all the channels except for the input channels $I_0$ and $I_2$ and output channels $O_0$ and $O_2$ which are being occupied.

Figure 10H:
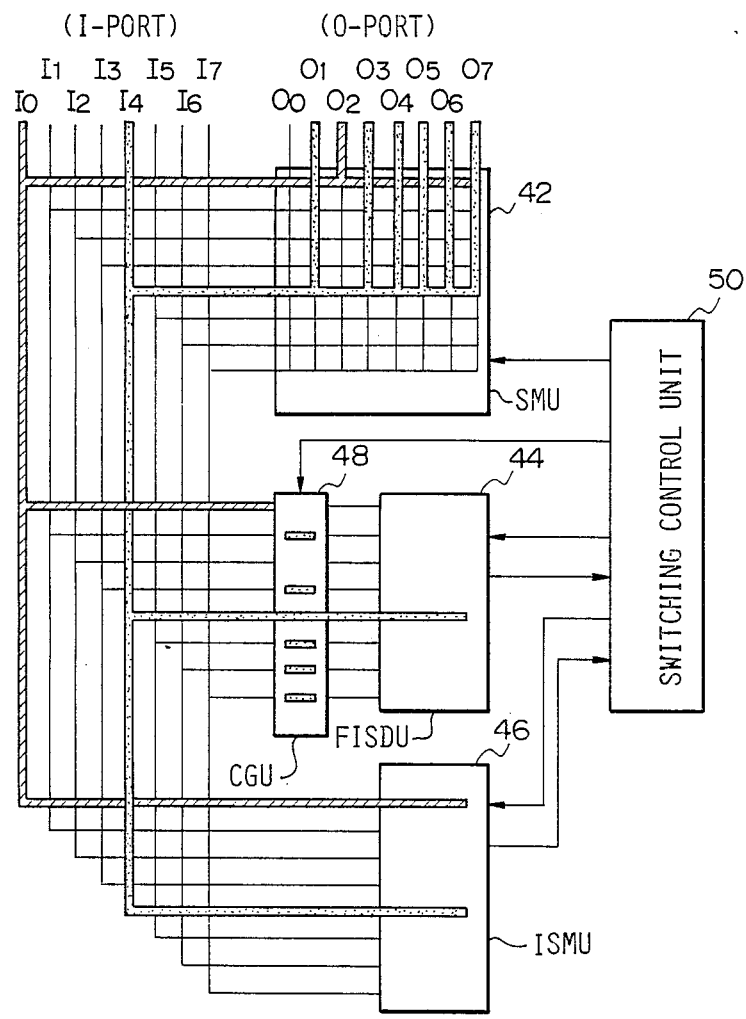

Further, FIG. 10H shows a condition wherein a plurality of different communications are handled at the same time. Assume that while an input signal on the input channel $I_0$ is coupled to the output channel $O_2$, an input signal appears on another input channel, e.g. input channel $I_4$. Then, the input signal on the input channel $I_4$ is outputted over all the output channels except for the channels $O_0$ and $O_2$ being occupied, as previously stated. Naturally, the input signal may be coupled to all the output channels other than the output channels in communication and the output channel which is associated with the input channel on which the input signal is inputted. Thereafter, when the first forward information of the second communication has ended, the input channel corresponding to the particular output channel is coupled to the output channel ($O_4$) corresponding to the input channel ($I_4$) on which the input signal has appearded, the node then waiting for an input signal. If the signal of the first communication has completed before, the node switches the direction of transfer of the input and output channels.

Figure 11:
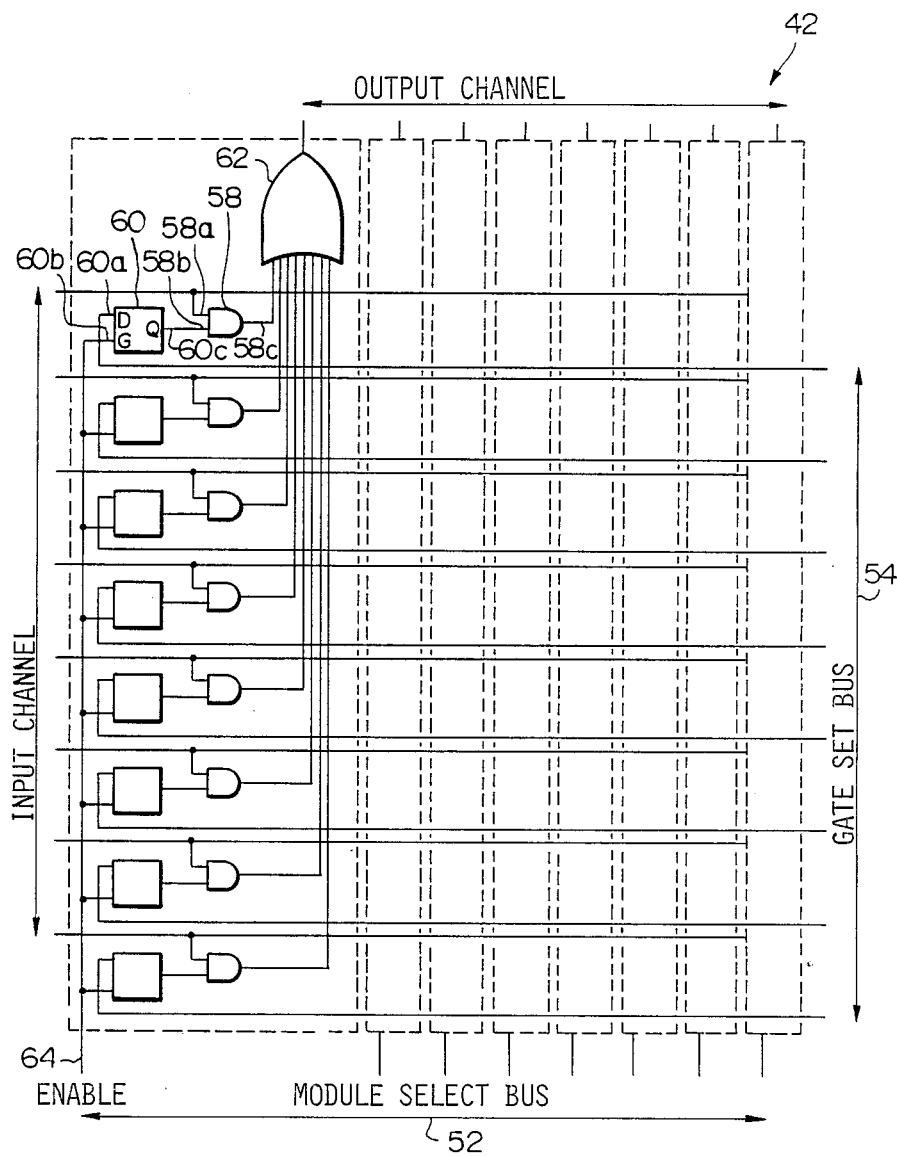
FIG. 11 is a diagram showing a specific construction of a switching matrix device as shown in FIG. 9.

Referring to FIG. 11, a specific construction of the switching matrix unit 42 of FIG. 9 is shown. Assuming that eight input channels and eight output channels are provided, the unit 42 is made up of eight modules which are assigned one-to-one to the output channels. Each of the modules comprises eight switching gates 58, eight latches 60 connected one-to-one to the gates 58, and a single eight-input OR gate 62 to which outputs 58c of the gates 58 are coupled. The modules share eight input signal lines which extend from an input port, and the gate set bus 54. A D terminal 60a of each latch 60 is connected to the gate set bus 54, a Q terminal to an input terminal of the switching gate 58, and a G terminal to the module select bus 52 by a common enable line 64. An input terminal 58a of the switching gate 58 is connected to the input signal line, and the output terminal 58c to the input of the OR gate 62.

Figure 12:
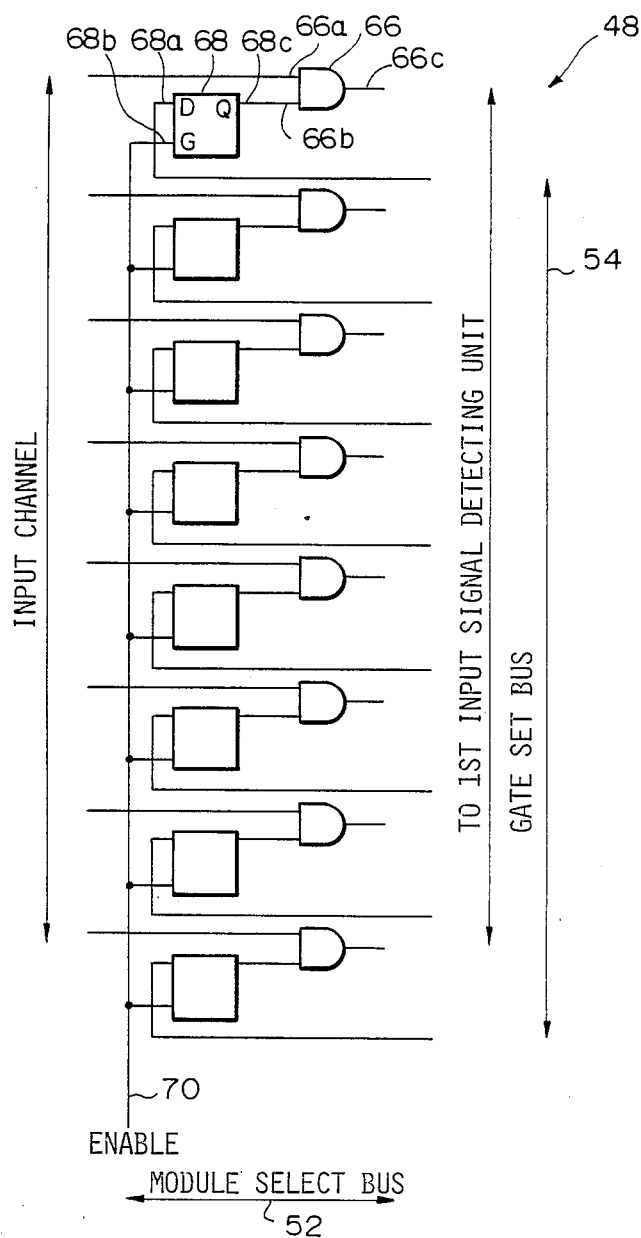
FIG. 12 is a diagram showing a specific construction of a control gate device as shown in FIG. 9.

Referring to FIG. 12, a specific construction of the control gate unit 48 of FIG. 9 is shown. Again, assuming that eight input channels are provided, the unit 48 is made up of eight gates 66 and eight latches 68 which are connected one-to-one to the gates 66. The unit 48 is constructed to control the connection of eight input signal lines which extend from the input port and eight output signal lines which are associated with the input signal lines and led to the first input signal detecting unit 44. A D terminal 68a of each latch 68 is connected to the gate set bus 54, a Q terminal 68c to an input terminal 66a of the gate 66, and a G terminal 66b to the module select bus 52 by a common enable line 70. The input terminal 66a of the gate 66 is connected to the input signal line, and an output terminal 66c to the input of the unit 44.

Figure 13:
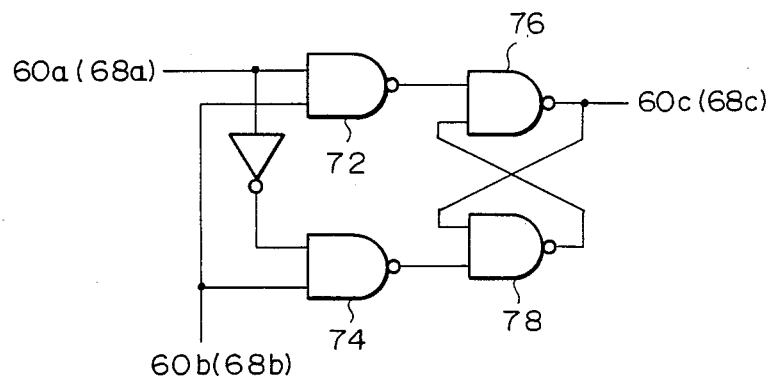
FIG. 13 is a diagram showing latches as shown in FIGS. 9 and 10.

Referring to FIG. 13, there is shown a logic structure of the latches which are installed in the switching matrix unit 42 of FIG. 11 and the control gate unit 48 of FIG. 12. As shown, the structure includes two preceding NAND gates 72 and 74 having a switching function and two following NAND gates 76 and 78 having a storing function.

It is to be noted that the arrangements shown in FIGS. 11 to 13 are not restrictive and may be modified in various manners. The modification will mainly depend upon the ratio of softwares and hardwares which implement the controls as previously described.

In this particular embodiment, because the switching control unit 50 is implemented with a microprocessor, a control over this section relies on hardware and, accordingly, the switching matrix unit 42 and the control gate unit 48 are independent of each other with regard to function. Should the control mentioned above be implemented with hardware only, such units would be constructed inseparably with respect to function.

Figure 14:
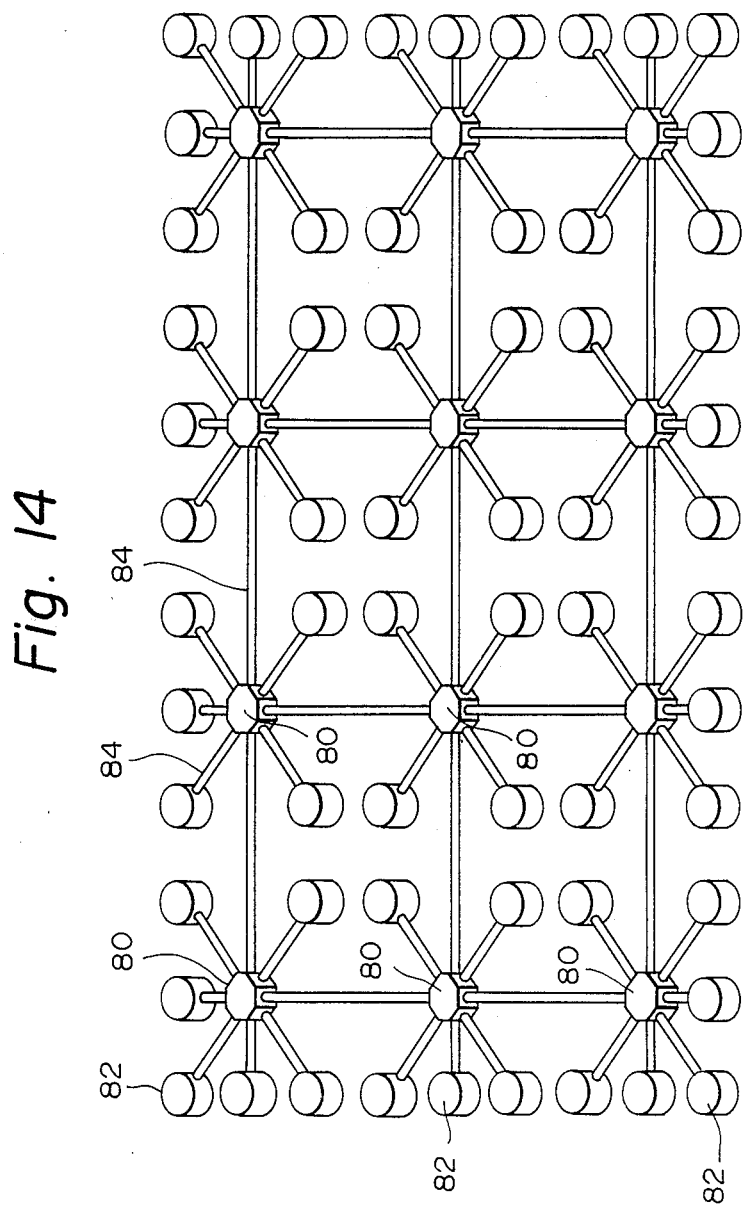
FIG. 14 is a diagram showing a network which is an expanded version of the present invention.

Referring to FIG. 14, a network which is an expanded version of this embodiment is shown. Specifically although the network of this embodiment is in principle a small-scale LAN which includes only one node 32, the number of nodes may be increased to construct a large-scale network as desired. The expanded network may have any suitable configuration such as a linear one, a loop, a two-dimensional lattice as shown in FIG. 14, a thee-dimensional lattice, or a combination thereof. Any desired nodes 80 and the nodes 80 and terminals 82 may be connected together by links 84 which include a plurlality of channels. While the embodiment has been shown and described as including at least one input channel and at least one output channel in one link 84, it will be apparent to those skilled in the art that a plurality of channels or a single input/output channel may be accommodated.

Turning back to FIG. 2, the packets which are applicable to this embodiment will be described. As regards the packets of FIG. 2, prerequisites with a terminal and other transmit/receive stations are as follows:

(a) the first forward information (call packet) is provided with a preamble having a length (time) equal to or greater than a predetermined one, and an address of a destination (test address);

(b) Each transmit/receive terminal receives the first forward information (call packet) meant thereof and, upon completion of that information, sends the first return information (call-back packet) immediately after the first predetermined period of time ($T_1$) has expired. The period of time $T_1$ is a period of time necessary for connection control means at a node to complete a control for the entry of the first return information (call-back packet) and generally referred to as a node time constant, or simply as a node constant; and (c) When the transmit/receive terminal has received information which has not been meant therefor (only the first forward information has been received), it must not sent any information until a second predetermined period of time $T_2$ expires since the end of the information. The time period $T_2$ is a time period necessary for a packet to be propagated into a network and generally referred to as a network time constant, or simply as network constant. This ensures that even if a plurality of nodes are present in the network, a node which is closet to a call end receives the first return information (call-back packet) within the second period of time $T_2$ after the end of the first forward information (call packet).

So long as the prerequisites associated with the communication procedure as described above are met, the freedom in the other aspects is ample enough to provide the following possibilities:

(a) The packet length is limitless:

(b) Any number of forward and return information may be interchanged by, of desired, occupying the channel; and (c) The data rate may be selected as desired between the transmit/receive terminals insofar as it is less than the maximum data rate which depends upon the hardware constituting the network.

The packets shown in FIG. 2 are the most typical ones and representative of two forward informations and two return informations. The first forward information and the first return information are adapted to secure a communication path on the network while opening needless parts to the other communications and, therefore, none of them contains a message.

Figure 15:
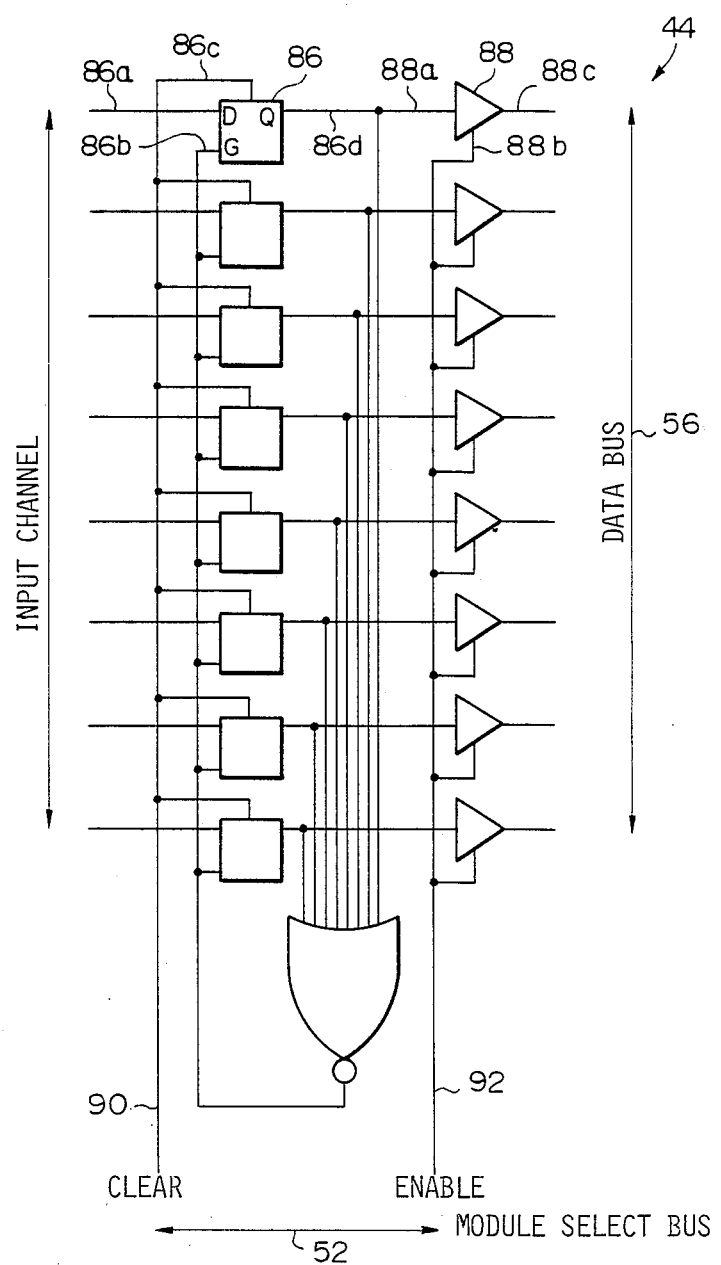
FIG. 15 is a diagram showing a first input signal detecting unit as shown in FIG. 9.

Referring to FIG. 15, a specific construction of the first input signal detecting unit 44 of FIG. 9 is shown. Again, assuming that eight input channels are provided, the unit 44 comprises eight latches 86 and eight gates 88 which follow the latches 86. When an input signal 86a is applied to any one of the latches 86, the gates 86b of all the latches 86 are disabled so that the signal 86a is delivered through an output 86d. The latches 86 are recovered by a clear signal 86c. D terminals 86a of the latches 86 are connected to the output of the control gate unit 48, and CLR terminals 86c to the module select bus 52 by a single common clear line 90. Further, Q terminals 86d are each connected to one input terminal 88a of the gate 88 which follows the latch 86. The other input terminal 88b of each gate 88 is connected to the module select bus 52 by a single common enable line 92, while an output terminal 88c is connected to the data bus (module output signal line) 56.

Figure 16:
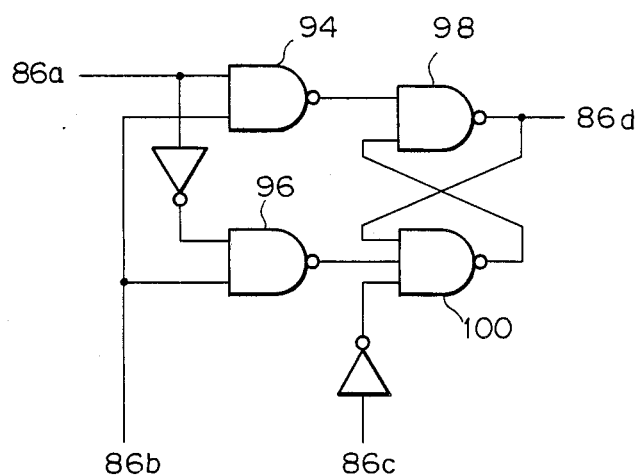
FIG. 16 is a diagram showing latches as shown in FIG. 15.

Referring to FIG. 16, a logic structure of the latch 86 of FIG. 15 is shown. In FIG. 16, two preceding NAND gates 94 and 96 have a switching function, and two following NAND gates 98 and 100 have a storing function.

Figure 17:
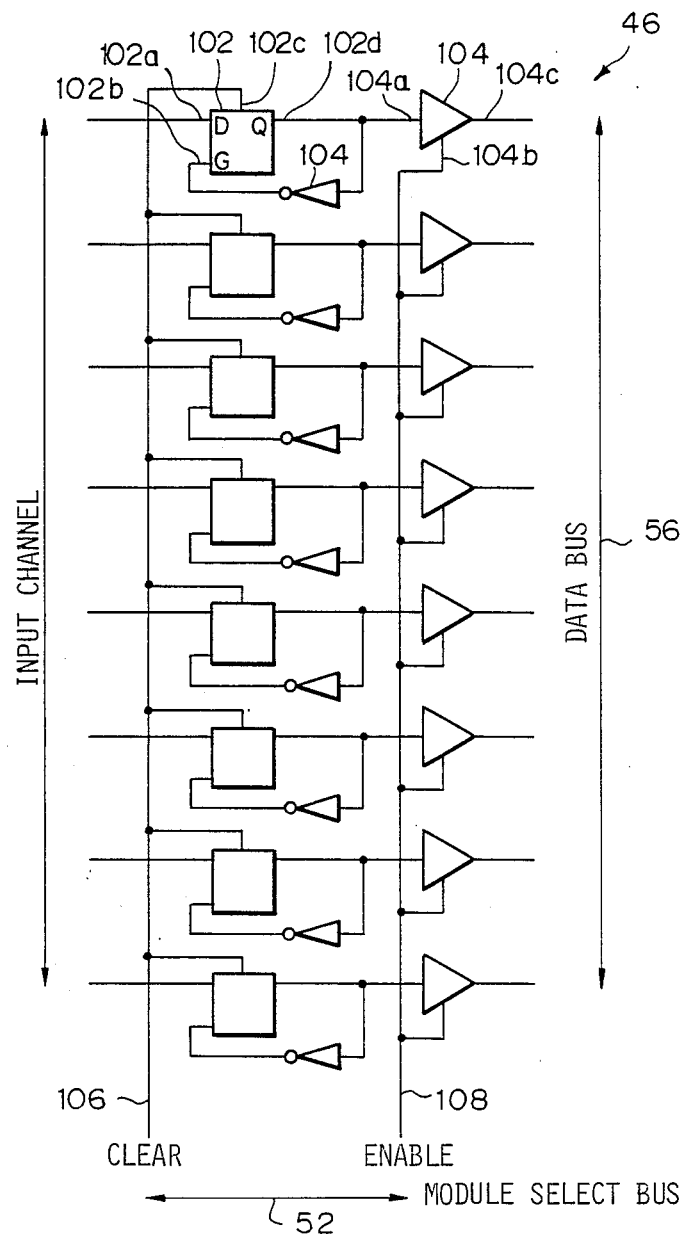
FIG. 17 is a diagram showing an input signal monitoring unit as shown in FIG. 9.

Referring to FIG. 17, a specific construction of the input signal monitoring unit 46 of FIG. 9 is shown which is assumed to have eight input channels. As shown, the unit 46 comprises eight latches 102 and eight gates 104. A D terminal 102a of each latch 102 is connected to the input port, and a Q terminal 102d a G terminal 102b via inverter 104 and to one input terminal 104a of the gate 104. An output terminal 104c of the gate 104 is connected to the data bus 56. A CLR terminal 102c of the latch 102 is connected to the module select bus 52 by a common clear line 106, and the other input terminal 104b of the gate 104 is connected to the module select bus 52 by a common enable line 108.

The switching control unit 50 selects one of the modules of the switching matrix unit 42 via the module select bus 52 while setting up connections of the gates via the gate set bus 54. Further, the unit 50 reads information out of the first input signal detecting unit 44 or the input signal monitoring unit 46 via the module select bus 52 while clearing the latches thereof. Still another role which the unit 50 plays is selectively connecting the gates of the control gate unit 48 via the module select bus 52 and gate set bus 54.

Referring of FIGS. 18A to 18K, the operation of a node which is representative of a modification to the embodiment as described above is shown. In this modification, the matrix of the unit 42 is partly modified such that the points of intersection on a diagonal are not interconnected to prevent an input channel from being connected to its associated output channel. Generally, when the unit 42 is made up of $N \times N$ switching elements, it is possible to connect an input channel to all the output channels except for its associated output channel before an input signal is applied to the node. Further, when the unit 42 is made up $N \times (N-1)$ switching elements, an input channel inherently is not connected to an output channel which is associated therewith. Hence, when the unit 42 is provided with such a structure, the operating sequence as shown in FIGS. 10A to 10H is replaced with the sequence as shown as shown in FIGS. 18A to 18K. It is to be noted that although the unit 42 of FIGS. 18A to 19K are provided with an $8 \times 8$ matrix so that only the points of intersection on a diagonal are not connected, use may be made of an $8 \times 7$ matrix.

Figure 18A:
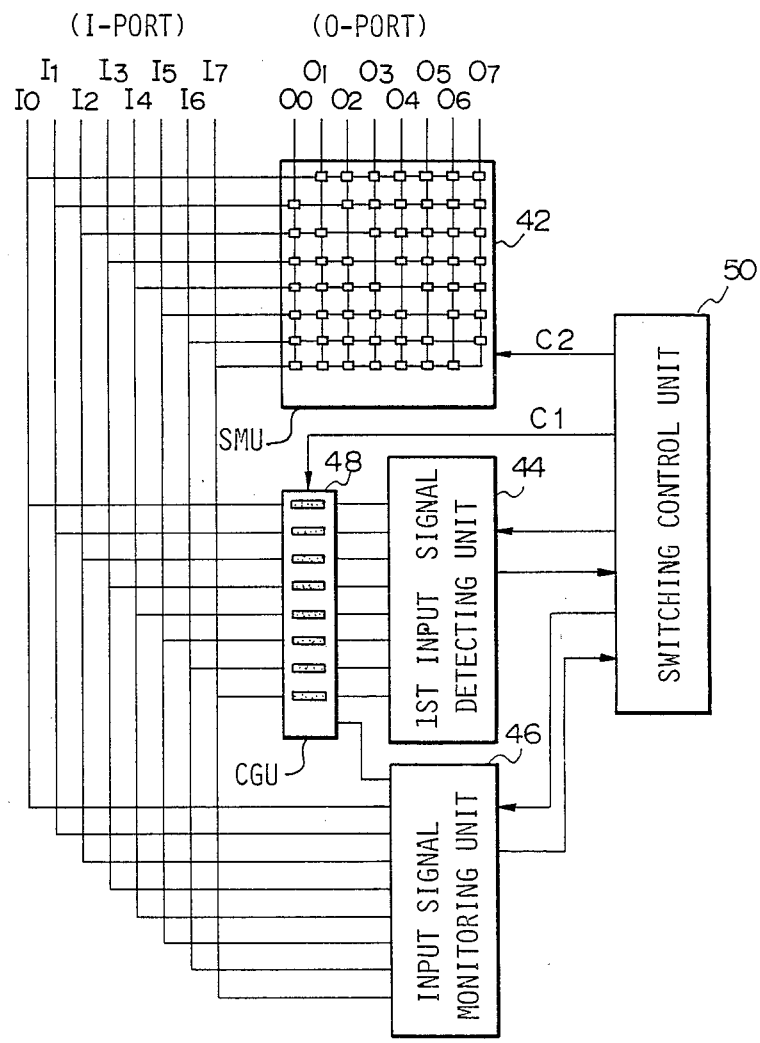
FIGS. 18A to 18K are operation sequence charts representive of a modified embodiment of the present invention.
Figure 18B:
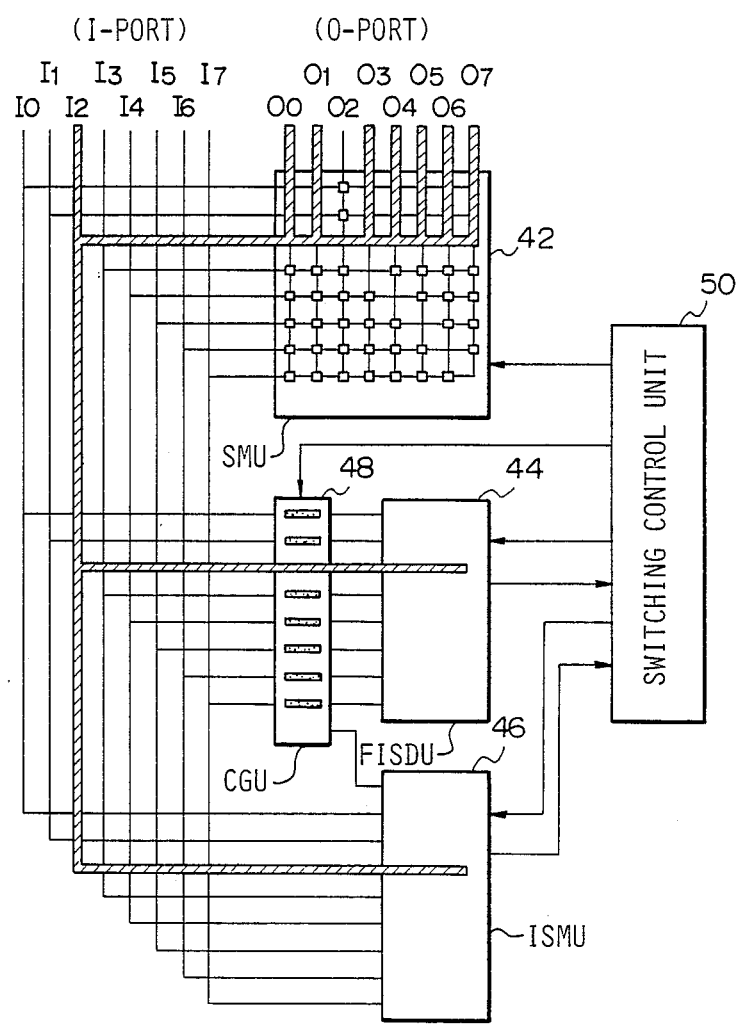
Figure 18C:
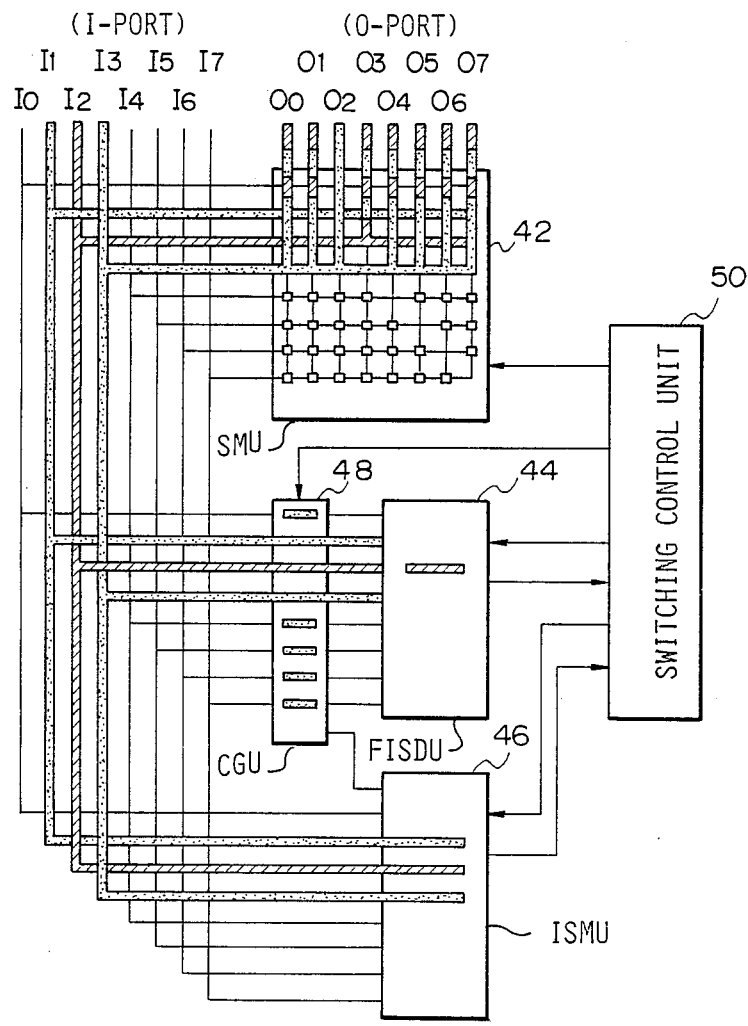

FIG. 18A is representative of an initial condition which corresponds to FIG. 10A. The switching control unit 50 controls the switching matrix unit 42 and control gate unit 48 by the control signals $C_1$ and $C_2$ so that all the input channels are connected to the first input signal detecting unit 44, and the input channels $I_0$ to $I_7$ of the unit 42 to all the output channels $O_0$ to $O_7$ except on the diagonal. FIG. 18B corresponds to FIG. 10B in which an input signal has arrived. Assuming that an input signal has appeared on the channel $I_2$, it is delivered over the output channels $O_0$, $O_1$ and $O_3$ to $O_7$. The signal is also applied to the units 44 and 46. FIG. 18C corresponds to FIG. 10C in which other input signals have arrived. When input signals have appeared on the input channels $I_1$ and $I_3$ after the input signal on the input channel $I_2$, they, too, are delivered over all the output channels except for those which correspond to the two input channels $I_1$ and $I_3$. At this instant, an interference occurs in the output signals as well as in the input signals.

Figure 18D:
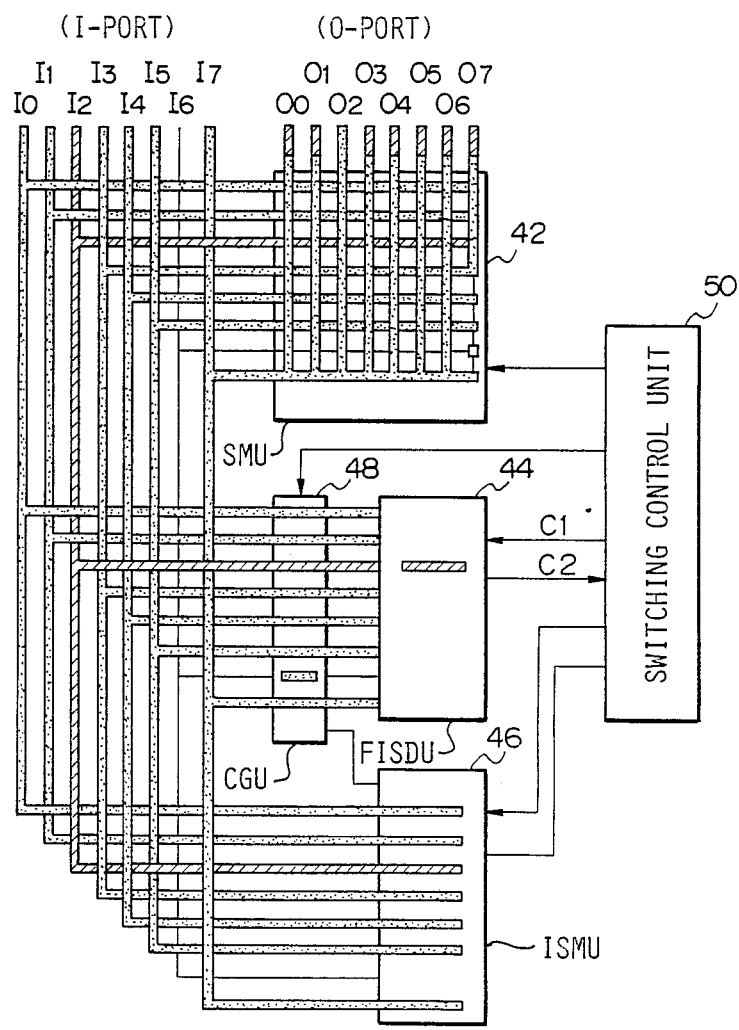
Figure 18E:
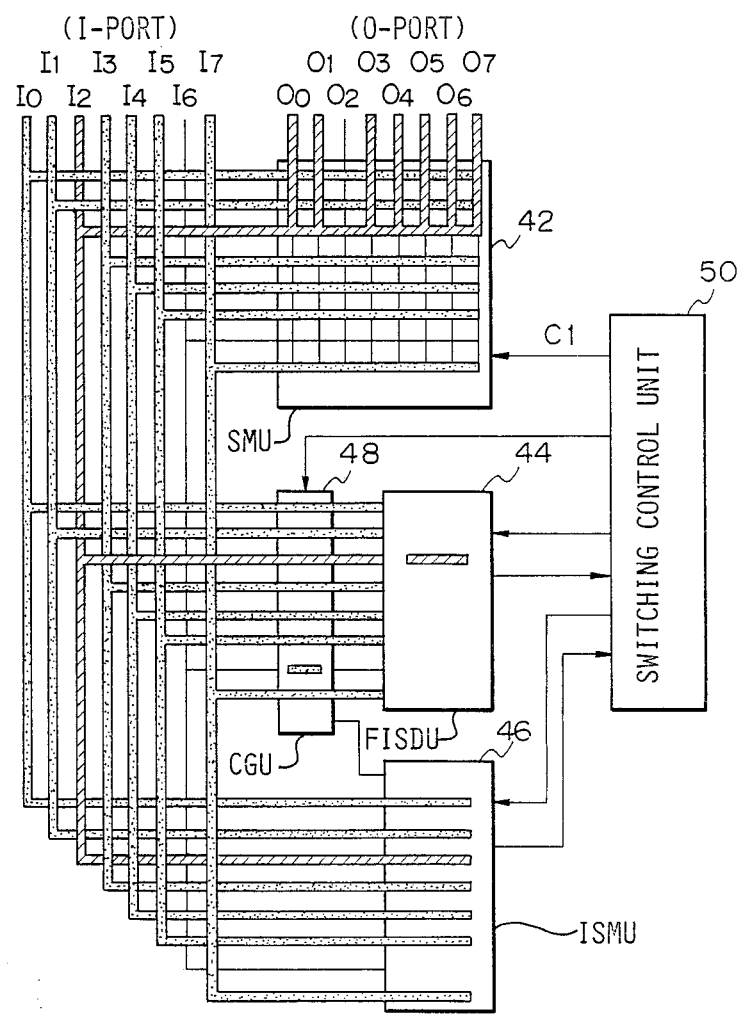
Figure 18F:
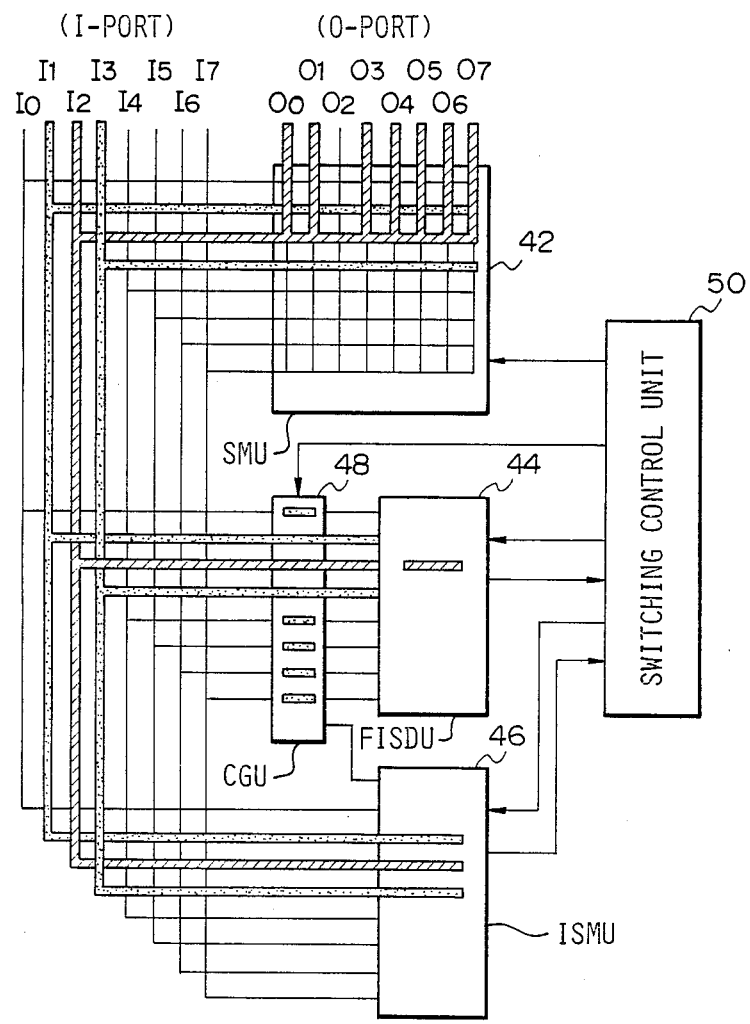
Figure 18G:
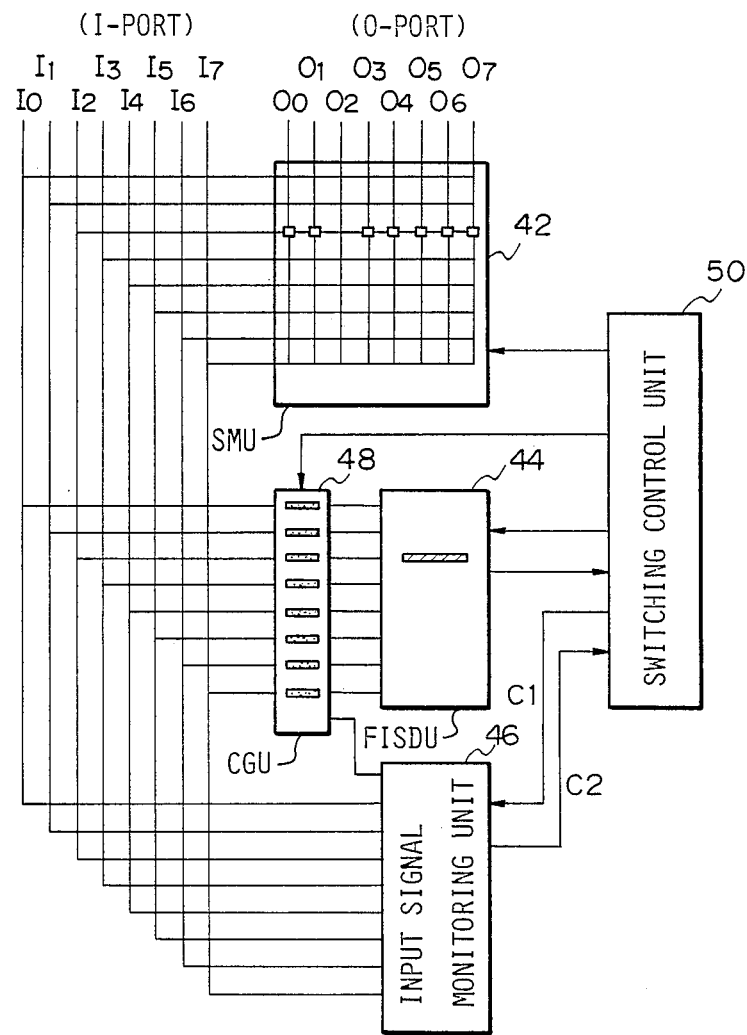
Figure 18H:
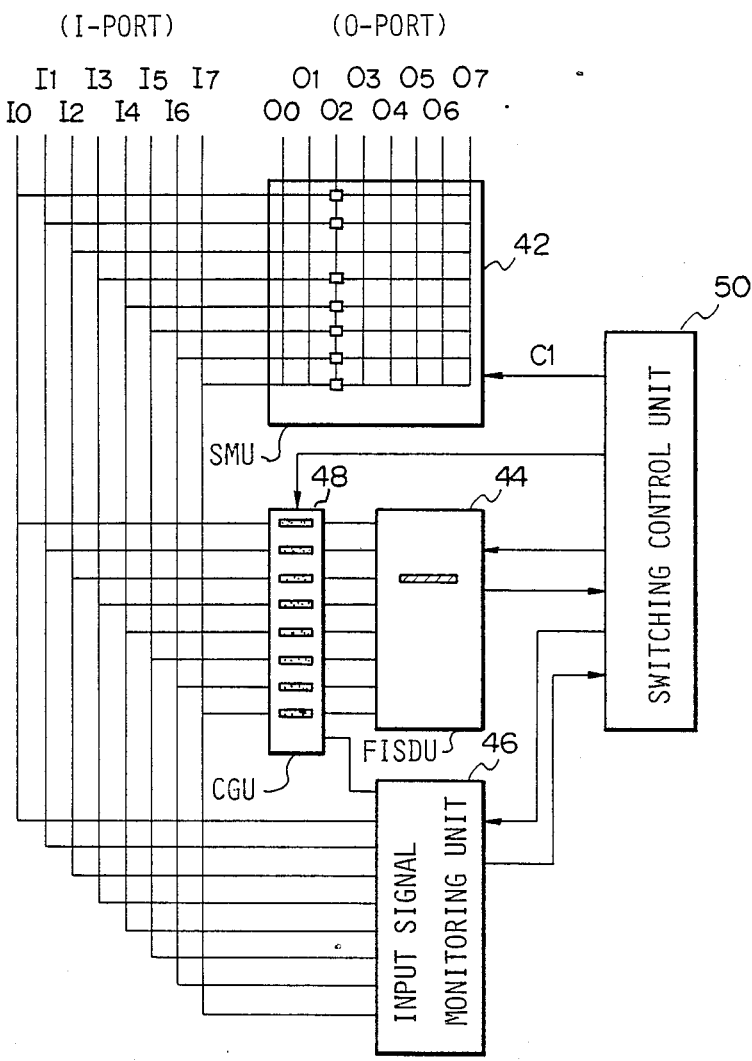

FIG. 18D shows a condition corresponding to that to FIG. 10C, i.e., a condition in which one of a plurality of signals which arrived first is detected. Specifically, assuming that an input signal has appeared on the input channel $I_2$ first and, then, input signals have appeared on input channels $I_0$, $I_4$, $I_5$ and $I_7$, the switching matrix unit 42 once connects those input chnnels to all the output channels except for those which are associated with those input channels. Because the input channels $I_0$, $I_4$, $I_5$ and $I_7$ are not connected to their associated output channels, the input signals on those channels are not outputted. The first input signal detecting unit 44 has already detected the input channel $I_2$ on which an input signal has appeared first, and the switching control unit 50 reads it out to perform the first storage. FIGS. 18E and 18F show a condition corresponding to that of FIG. 18D, i.e., a condition in which the input channels other than the one on which an input signal has appeared first are disconnected. Specifically, the unit 50 reads the first input channel $I_2$ out of the unit 44 to store it and controls the unit 42 to disconnect the input channels $I_0$, $I_1$, $I_3$ to $I_5$ and $I_7$ from the output channels $O_0$ to $O_7$. FIGS. 18G and 18H is representative of a condition corresponsding to that of FIG. 10F, i.e., a condition in which the direction of transfer is reversed upon completion of the first input signal. In FIGS. 18G and 18H, as the input signal monitoring unit 46 detects the end of the signal on the input channel $I_2$, the unit 50 reads it out and controls the unit 42 by the control signal $C_1$ to connect the input channel $I_0$, $I_1$ and $I_3$ to $I_7$ to the output channel $O_2$. That is, the input channels which served communications are switched into connection with the output channels so that return information which may appear on any of the input channels may be returned to a terminal which originated it.

Figure 18I:
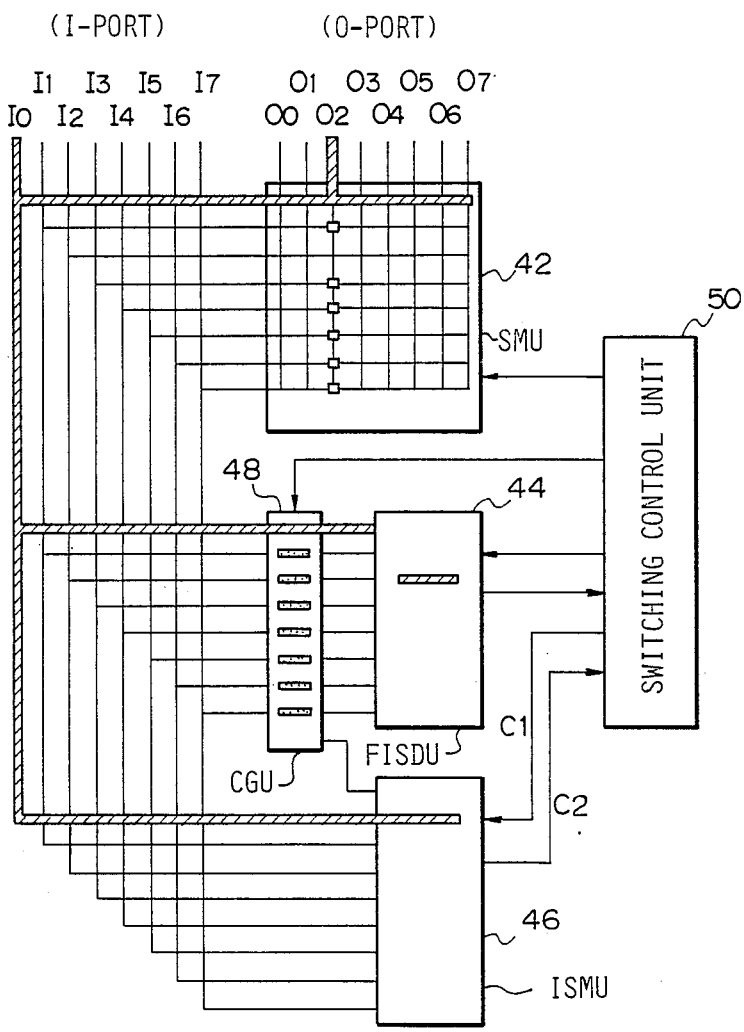
Figure 18J:
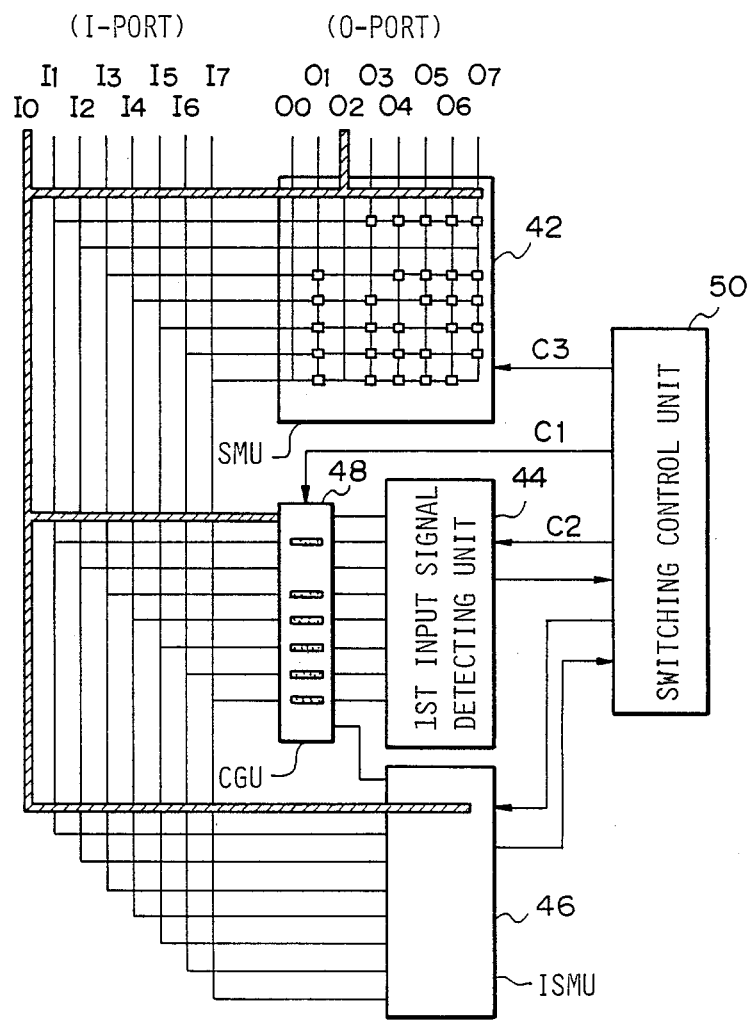
Figure 18K:
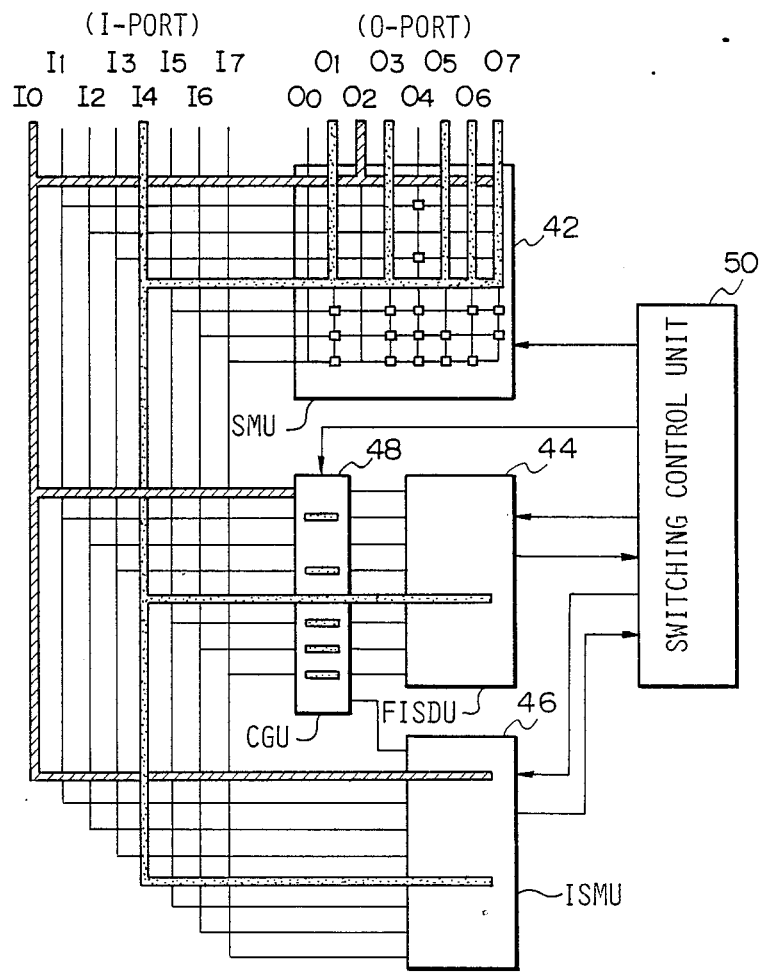

FIG. 18I and 18J show a condition corresponding to that of FIG. 10G, i.g., a condition in which return information is inputted. When the previous input signal was the forward information which forms a part of the first communication, return information of the first communication arrives at any of the input channels within the predetermined period of time $T_1$. In the example shown in FIGS. 18I and 18J, return information has appeared on the input channel $I_0$ and, therefore, it is delivered over the output channel $O_2$. While the monitoring unit 46 detects the arrival of the input signal at the input channel $I_0$, the control unit 50 reads it out to perform the second storage (control signals $C_1$ and $C_2$). Next, the control unit 50 controls the control gate unit 48 to connect the input channels $I_1$ and $I_3$ to $I_7$ of the unit 48 to the detecting unit 44 and resets the unit 44 to erase the previous first input channel. This prepares the node for the entry of the second and third communications, i.e. simultaneous handling of a plurality of communications. FIG. 18K shows a condition corresponding to that of FIG. 10H, i.e., a condition in which a plurality of communications are dealt with at the same time. As regards the second communication, signals are delivered over the output channels $O_0$ and $O_2$ which are in communication and the output channels corresponding to the channels on which inputs have appeared.

Figure 19:
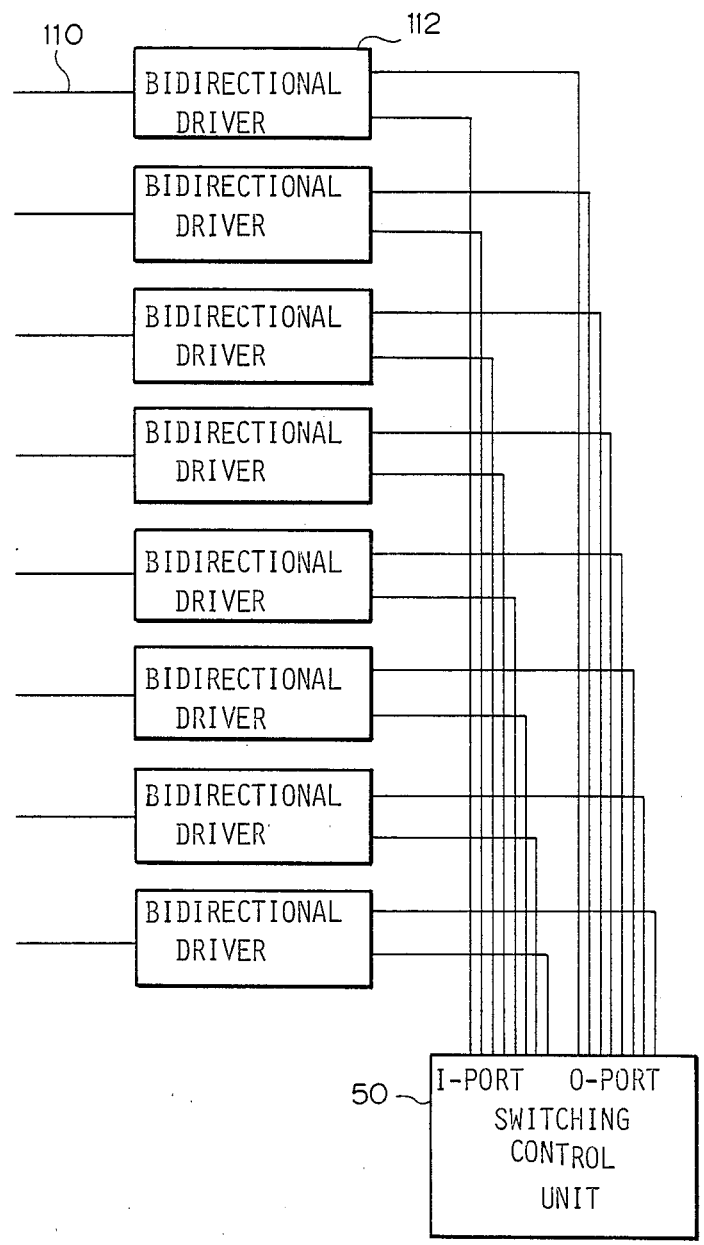
FIG. 19 is a diagram showing another specific construction of the node.

Referring to FIG. 19, a modification to the node construction of FIG. 9 is shown. The node of FIG. 9 is constructed on the assumption that each link 84 includes a plurality of channels which in turn include at least one input channel and one output channel. The alternative construction of FIG. 19 is applicable to a case wherein the link 84 includes only one input/output channel. Specifically, a bidirection driver 112 is connected to a single input/output channel 110 which is in turn connected to an input and an output ports of the switching control unit 50 of the node. Where eight links are connected to one node, eight drivers 112 will be connected.

Figure 20:
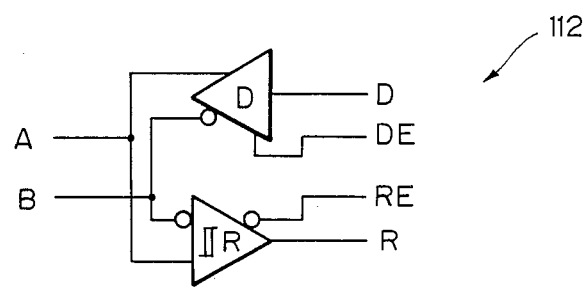
FIG. 20 is a diagram showing a specific construction of a bidrectional driver as shown in FIG. 19.

Referring to FIG. 20, a specific construction of the bidirectional driver 112 (RS 422) is shown. As shown, the driver 112 has terminals A and B which are connected to the link, and terminals D (driver), R (receiver), DE (driver enable) and RE (receiver enable) which are connected to the node. A positive signal outputted by a driver D is coupled to the terminal A, and a negative signal to the terminal B. At a terminal, a signal is picked up on the basis of a voltage differential between the two terminals A and B. On the other hand, the terminal D is connected to an output port, and the terminal R to an input port. Ther terminals DE and RE are controlled by the control unit 50 so that the transmission and the reception may be prevented from being enabled at the same time.

As described above, in accordance with the present invention, a single node is capable of handling a plurality of communications at the same time without resorting to substantial extra costs. In addition, the system is expansible from a small scale which includes a single node to a large scale without modifying the protocol.

SECOND EMBODIMENT

A second embodiment of the present invention which is directed to the second object as previously stated will be described, beginning with its principle.

All the systems (d) to (h) previously discussed have a lattice structure and fix a path every time a communication is originated. Hence, when a link is cut off or when a terminal or a node is in a fault (down of functions), they suffer from only partial trouble and allows the other parts to perform usual communications. This redundancy is of significant inportance and becomes greater as the network is scaled up. A problem with the systems (d) to (h), however, is that they cannot detect the cut-off of a link and the fault of the node or that of a terminal. When a node which is not engaged in a communication encounters a fault, all the communications are effected after paths have been fixed and, therefore, no trouble occurs. Nevertheless, when a path is fixed, a trouble occurs and, therefore, a certain period of time is needed.

Now, collisions may be classified into two different kinds, i.e., a first kind of collision which occurs when a plurality of terminals have sent their first forward information at the same time, and a second kind of collision which is such that in the event when a terminal which has received the first forward information sends the second return information, a network which has been divided is recovered and another terminal having been located at the other side of the division transmits the first forward information. The first kind of collision may occur only when the first forward information is sent. The probability of the first kind of collision is comparatively low since the transmssion of the first forward information is not performed frequently. When the first kind of collision is caused by two different first forward informations, each section of the network is filled with either one of the first informations with the result that a border is developed within the network. If a terminal to receive the information is located on this side of the border, the path is safely fixed; if each receive terminal is located on this side of the border, both of the paths are safely fixed. For this reason, the first kind of collision itself does not always entail a trouble.

Further, assume that the first kind of collision has occurred between two different first forward informations one of which is longer in packet length than the other. Then, even though the shorter forward information may reach a receive terminal, the latter half of the longer information is apt to enter the path which is assigned to the first return information associated with the shorter information. In this condition, a terminal transmitted the shorter forward information cannot see why the path could not be set up, i.e. by a collision or any other cause. This makes it impossible for the transmit terminal to take any measure except for an inadequate control which would affect the other communications to thereby lower the throughput of the network. The condition for the second kind of collision of take place is further limited and, therefore, its probability is even lower than that of the first kind of collision. Stated another way, the probability of the second kind of collision will be reduced substantially to zero if all the input and output channels of a node can be connected. The second kind of collision is not related to this embodiment and, therefore, will not be described. It is to be noted that the first kind of trouble as stated above will simply be referred to as a collision hereinafter.

In accordance with this embodiment, the reliability heretofore achieved is further enhanced by (a) allowing a node and a transmit and a receive terminals to detect a collision individually, and (b) preventing a collision from entailing a trouble in the subsequent communications. In this particular embodiment, a connection control device which is installed in each node generally comprises a detecting section for detecting a collision, and a control section for inhibiting input to an input channel which has encountered a collision, output from an output channel which corresponds to that input channel, or both of them. On the other hand, a communication control device installed in each terminal generally comprises a detecting section for detecting the first return information, and a first backoff control section adapted to prepare for a condition wherein the first return stroke is not received.

The detecting section of each node compares an input signal which is selected on the first-come-first-served basis (a sigle input signal selected which may not always be a one arrived earliest) and another input signal so as to produce a differential therebetween. Such another input signal may be a one which is generated by the same terminal as the other and routed through a different path, or a one which is generated by a different terminal. While the former involves only a minimum of delay in phase since it has been selected on the first-come-first-served basis by a node on the route, the latter allows a sufficient differential to be produced only if a fraction, or area, of a packet to be compared is selected adequately. The backoff control section, when it has decided that the first return information has not been received within a predetermined period of time, determines whether the failure is attributable to a collision or to any other cause and, then, executes a backoff function (a control for retransmission). It is to be noted that the backoff is not particular to this embodiment and may be implemented, for example, by the binary exponential backoff algorithm (Xerox).

Figure 21:
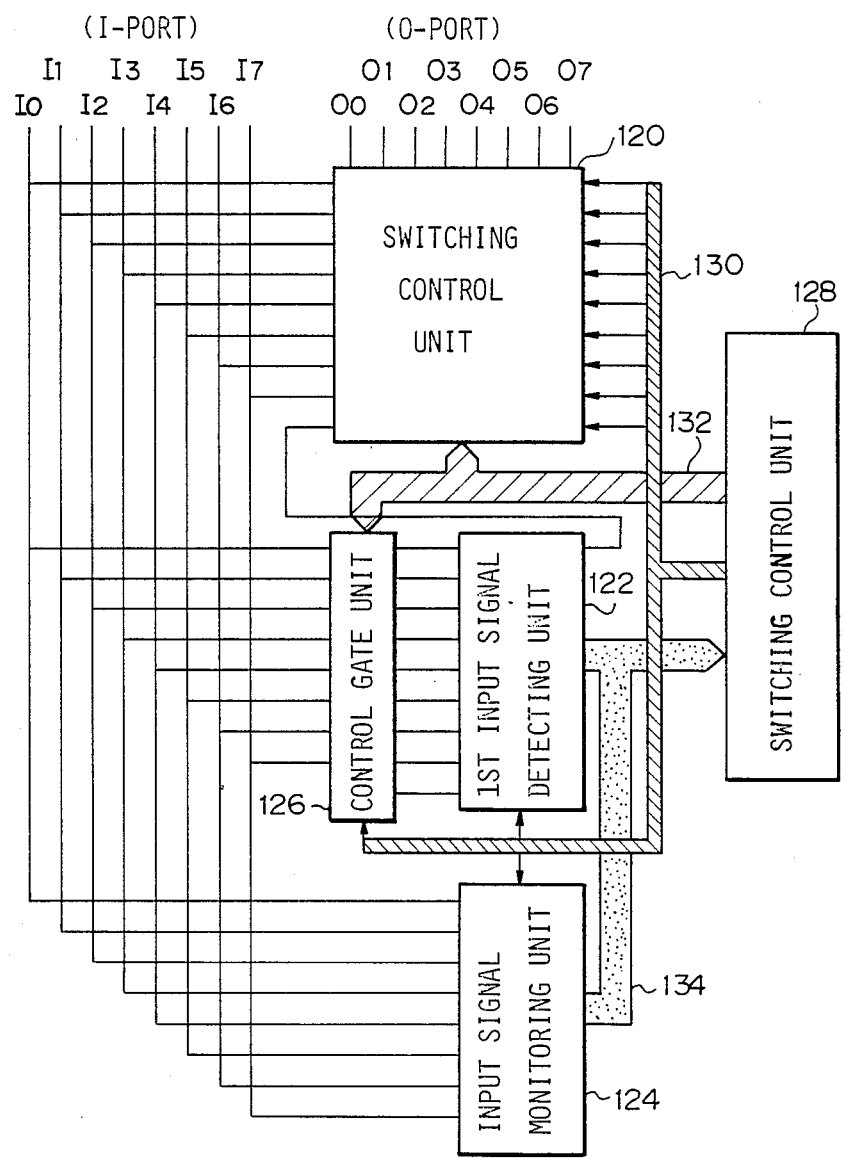
FIG. 21 is a diagram showing a node in accodance with another embodiment of the present invention.

Referring to FIG. 21, a connection control device built in each node or a communication control device built in each terminal in accordance with the present invention is shown in a block diagram. As shown, the device includes a switching matrix unit 120 whose capacity is great enough to interconnect all of input ports $I_0$ to $I_7$ and output ports $O_0$ to $O_7$ and their associated input channels $I_0$ to $I_7$ and output channels $O_0$ to $I_7$ at the same time. An input signal detecting unit 122 has a function of locating a particular one of the input channels on which an input signal appeared first, and a function of detecting a collision and informing the unit 120 of it. An input signal monitoring unit 124 is adapted to constantly monitor the presence/absence of an input signal. A control gate unit 126 serves to connect any of the input channels and the input channel on which an input signal appeared first to the unit 122. The entire node including such various units are controlled by a switching control unit 128. Assuming that eight input channels are provided, the unit 120 is made up of nine modules (greater in number than the channels by one) which are assigned one-to-one to the input channels. Each of the units 122, 124 and 126 comprises a single module. The unit 128 is connected to those modules by a module select bus 130, a gate select bus 132, and a data bus (module output signal lines) 134.

Figure 22:
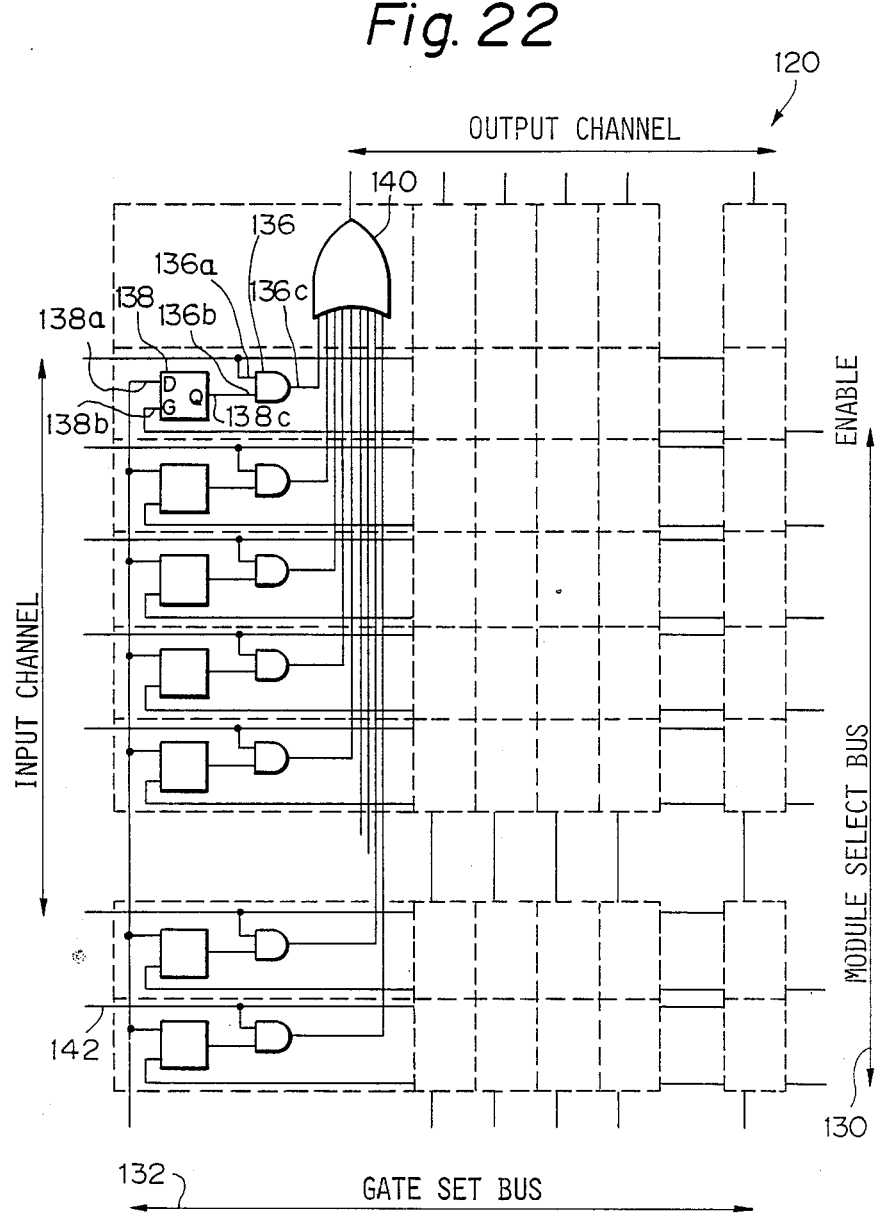
FIG. 22 is a diagram showing a specific construction of a switching matrix unit as shown in FIG. 21.

Referring to FIG. 22, a specific construction of the switching matrix unit 120 is shown. As shown, the unit 120 is made up of nine modules (one collision signal transfer channel being added) which are assigned one-to-one to the input channels. Each of the modules consists of eight switching gates 136, and eight latches 138 (each being provided with D, G and Q terminals). Outputs 136c of the switching gates 136 of each module are connected to the input of a single nine-input OR gate 140 on an output channel basis. The eight modules are connected to the input channels. The collision signal transfer channel is connected to a collision signal line 142 via the input signal detecting unit 122. The statuses of the switching gates 136 are selected via the select bus 130 and set up via the gate set bus 132 module by module.

Figure 23:
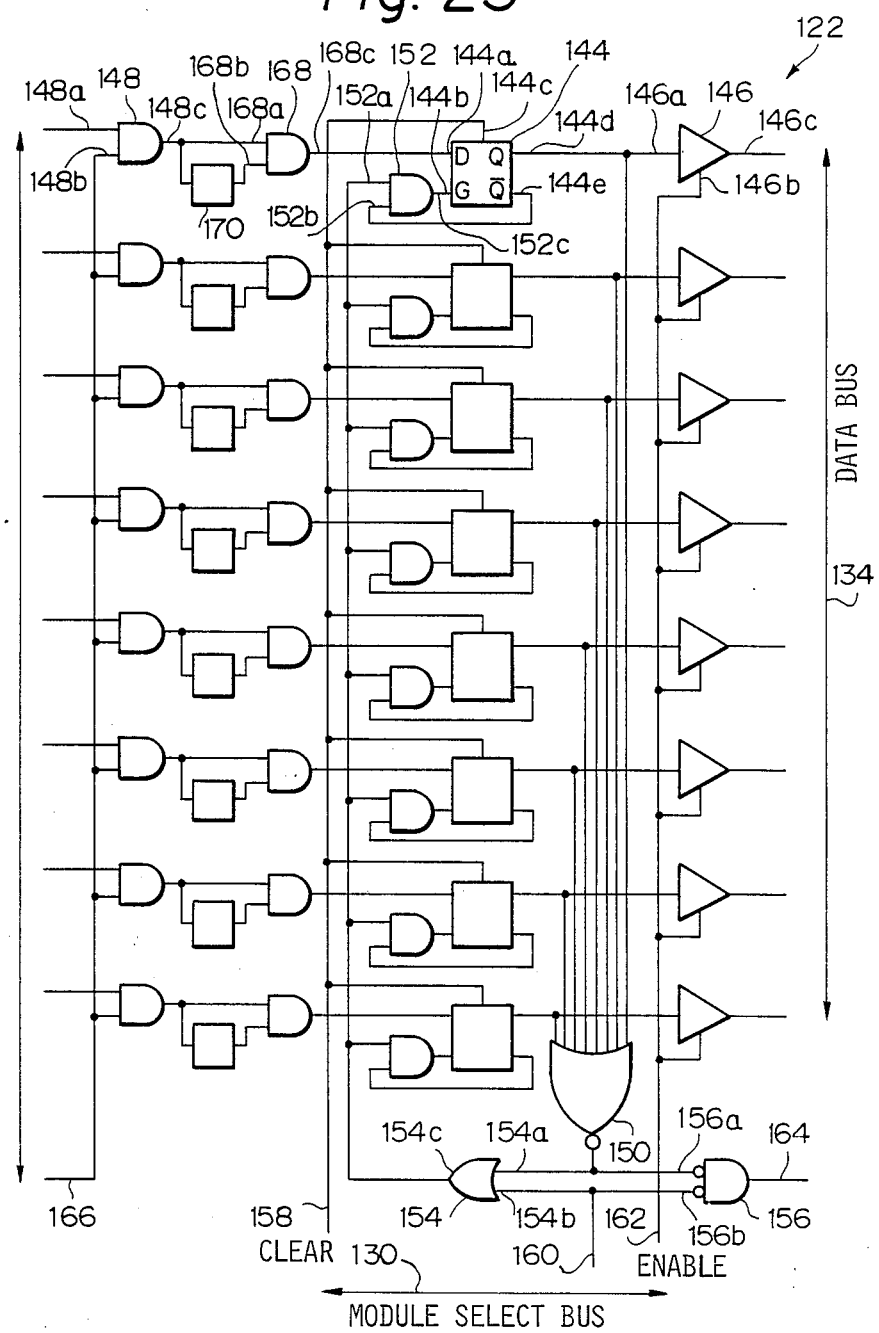
FIG. 23 is a diagram showing a specific construction an input signal detecting unit as shown in FIG. 21.

Referring to FIG. 23, a specific construction of the input signal detecting unit 122 is shown. As shown, the unit 122 is made up of eight latches 144 (each being provided with D, G, CLR and Q terminals), eight gates 146 which follow the latches 144, and eight gates 148 which precede the latches 144. The output of each latch 144 (output 144d on Q terminal) is coupled to an input 146a of the associated gate 146 and to an input of an eight-input NOR gate 150, while the output of the opposite polarity (output 144e on $\overline{Q}$ terminal) is connected to an input 152b of the associated AND gate 152. An output 152c of the AND gate 152 is connected to the gate (G terminal 144b) of the latch 144. The output of the NOR gate 150 branches off and leads to an input 154a of an OR gate 154 on one hand and to an input 156a of a gate 156 on the other hand. The output 154c of the OR gate 154 is connected to the inputs 152a of the AND gates 152. The CLR inputs of the latches 144 are connected to the module select bus 130 as a common clear signal line 158. Likewise, an input 154b of the OR gate 154 and an input 156b of the gate 156 are connected to the bus 130 as a collision control signal line 160. Inputs 146b of the gates 146 are connected to the module select bus 130 as an enable signal line 162. The output of the gate 156 is connected to the switching matrix unit 120 as a collision signal line 164. Outputs 146c of the gates 146 are connected to the data bus 134. Inputs 148a of the gates 148 are connected to the control gate unit 126, and inputs 148b to a reference input signal line 166 which extends out from the unit 126. Inputs 148c of each gates 148 branches off and leads to an input 168a of the and gate 168 on one hand and to an input 168b of the gate 168 via a single delay element 170 on the other hand. An output 168c of the AND gate 168 is connected to the input (input 144a on D terminal) of the latch 144.

In a first input signal detection mode, when the collision control signal line 160 is low level and an input signal is applied to any of the latches 144 (input 144a on D terminal), all the gates (144b on G terminal) are disabled via the NOR gate 150 and AND gate 152 so that an output signal (output 144d on Q terminal) is outputted and read out by the gate 146 at a suitable timing. At this instant, because the input 148b of the gate 148 is high level, the input signal on the input 148a is delivered as it is. In the meantime, the AND gate 168 and delay element 170 serve to prevent the latch 144 from latching up due to impulse-like noise. Hence, the delay element 170 has a time constant which is adequate for such a function and may be equal to a time constant of a collision detection mode, which will be described.

In a collision detection mode for detecting collision (first kind as previously stated), an inverted version of an input signal arrived first is fed to the input 148b of the gate 148 over the reference signal line 166, so that a signal representative of a differential between the first signal and the signal on the input 148a appears on the output 148c. That is, only a time differential between the two input signals in conflict (before or after the first input signal or both) is delivered via the AND gate 148. If the differential signal is shorter than a predetermined length, the delay element 170 and AND gate 168 erases it; if the differential signal is longer than the predetermined length, they produce it after subtracting a predetermined length from the signal. The predetermined length which is to be subtracted from the signal is determined in consideration of a phase deviation which occurs when the same packet originated by the same terminal is routed through different paths. In the above condition, because the collision control signal line 160 is high level, any of the latches 144 to which an input signal is applied (input 144a on D terminal) disables its gate (144b on G terminal). As a result, the output of the latch 144 is read out by the gate 146 at a suitable timing and, then, delivered to the switching matrix unit 120 at a suitable timing via the NOR gate 150 and gate 156. The time constant of the delay element 170 is selected accordingly. The statuses of the latches 144, gates 146, AND gate 1552 and gate 156 are selected via the clear signal line 158 of the module select bus 130, collision control signal line 160, and enable signal line 162. In this manner, in accordance with this embodiment, a signal indicative of the detection of the first kind of collision is fed to the switching matrix unit 120 via the gate 156.

Figure 24:
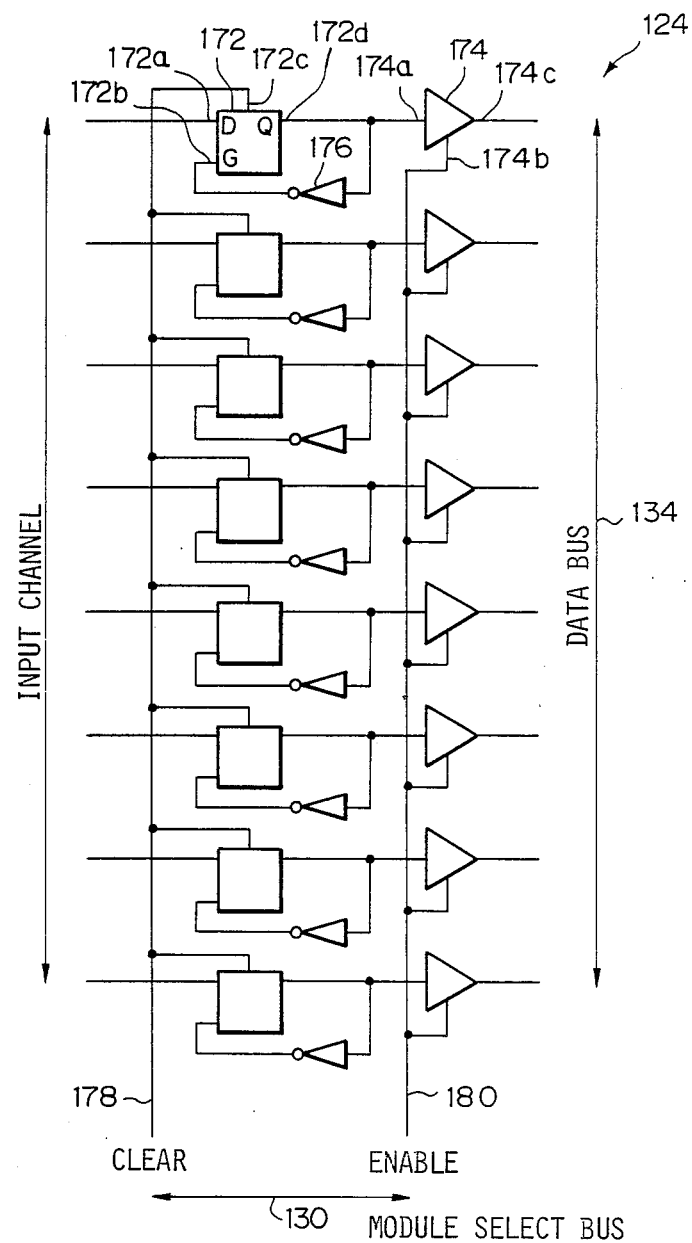
FIG. 24 is a diagram showing a specific construction of an input signal monitoring unit as shown in FIG. 21.

Referring to FIG. 24, a specific construction of the input signal monitoring unit 124 is shown. As shown, the unit 124 comprises eight latches 172 (each being provided with D, G, CLR and Q terminals), and eight gates 174 which follow the latches 172. The output of each latch 172 (output 172d on Q output) is connected to the input of an inverter 176 the output of which is connected to an input of the latch (input 172b on G terminal). The unit 124 is capable of reading out the statuses of the input channels at a suitable timing by controlling the clear signal line 178 and enable signal line 180 of the module select bus 130. Input signals on the input channels are fed to the data bus 134.

Figure 25:
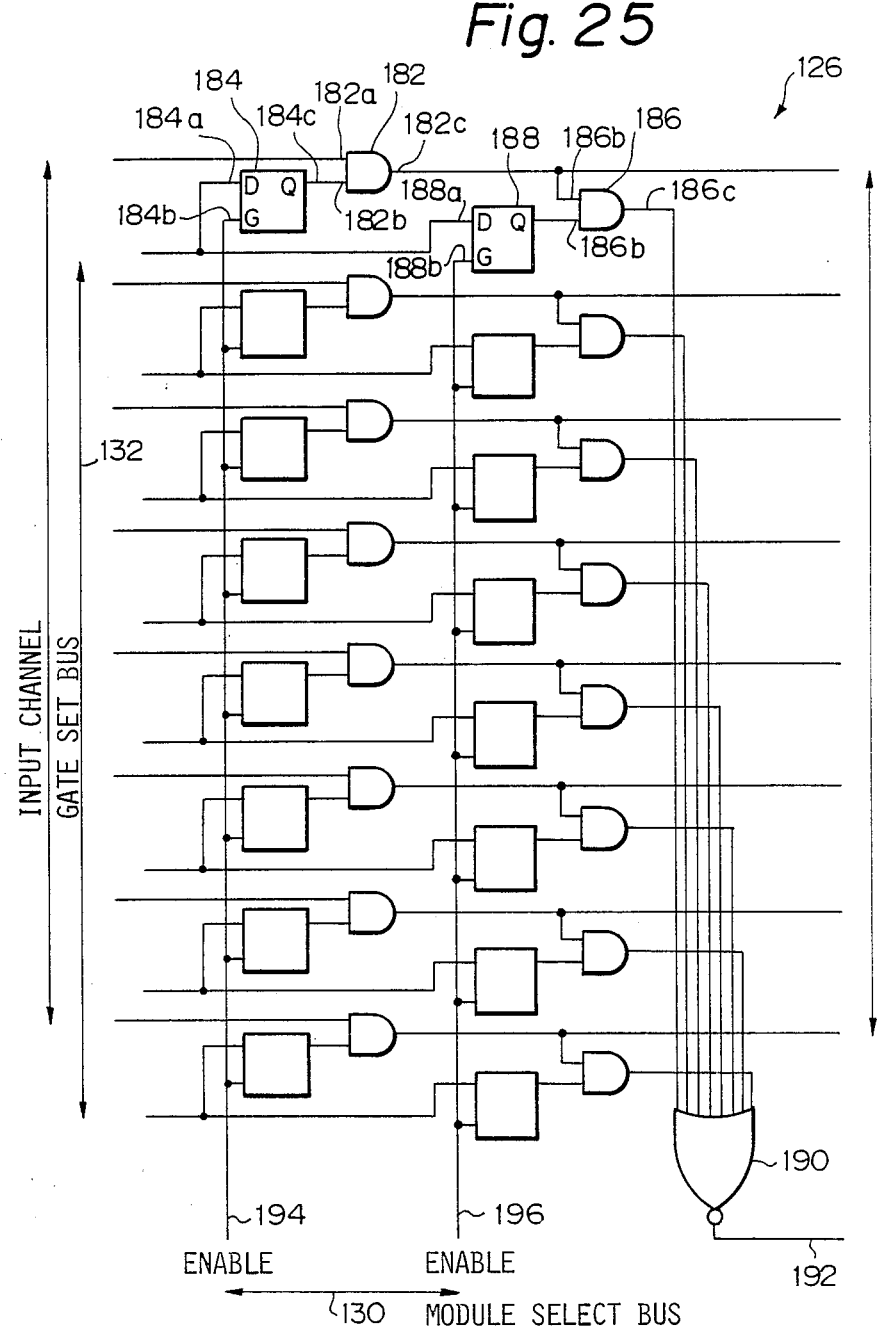
FIG. 25 is a diagram showing a specific construction of a control gate unit as shown in FIG. 21.

Referring to FIG. 25, a specific construction of the control gate unit 126 is shown. The unit 126 consists of eight gates 182, eight latches 184 (each having D, G and Q terminals) which are connected to the gates 182, eight gates 186, eight latches 188 (each having D, G and Q terminals) connected to the inputs of the gates 186, and an eight-input NOR gate 190 which is connected to the output of the gates 186. Each gate 182 controls the connection of the input channel and the input of the input signal detecting unit 122 associated with the input channel, while the gates 186 serve to select a single input channel and are connected to a reference signal line 192 of the unit 122 via the NOR gate 190. The unit 126 is controlled via the enable signal lines 194 and 196 of the module select bus 130 and the gate set bus 132 to in turn control the above-mentioned various elements.

It is to be noted that this embodiment may be modified in various manners in relation mainly to the ratio of softwares and hardwares which implement the controls as described above. The switching control unit 128 is implemented with a microprocessor and, therefore, controlled by software, so that the other units 120 and 126 are independent with respect to function. Should such controls be implemented with hardware only, the various units would be constructed inseparably with respect to the function.

Referring to FIGS. 26A to 26L, there is shown a network control method in accordance with this embodiment. Assume that a path for the first communication, e.g., channels 4 and 7 have already been fixed and occupied, and that information is being transferred from the input channel 4 to the output channel 7.

Figure 26A:
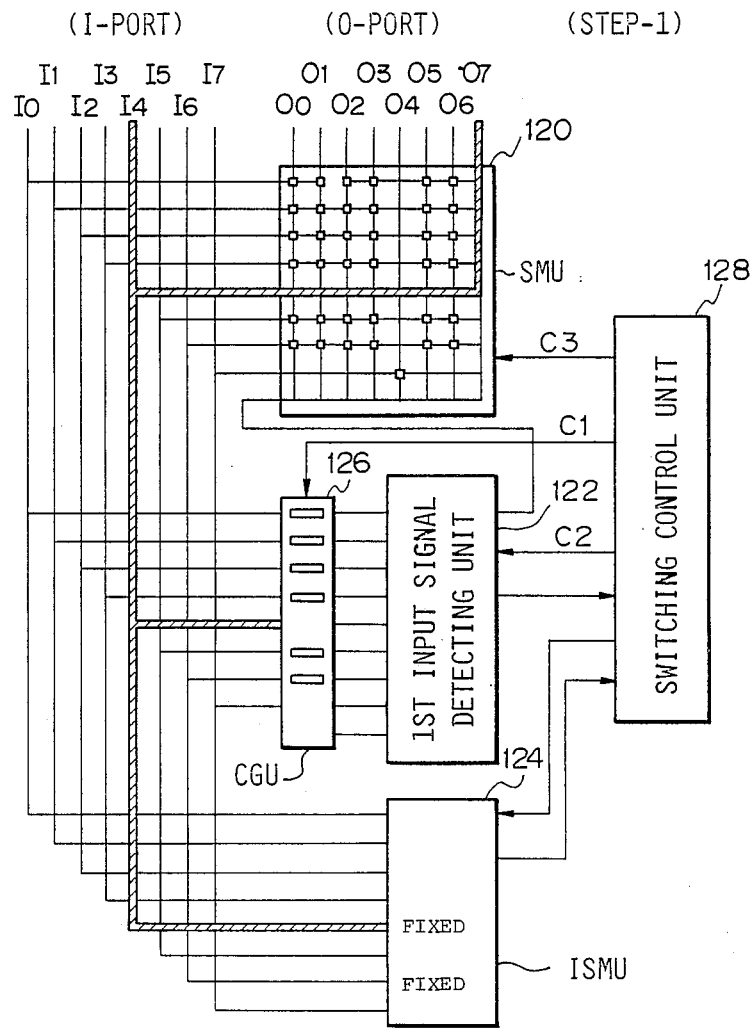
FIGS. 26A to 26L are diagrams demonstrating a control method associated with the detection of a collision.

In FIG. 26A, the switching control unit 128 conditions the input signal detecting unit 122 for a first input signal detection mode, disconnects the channels 4 and 7 of the control gate 1 unit 26 which have been occupied, and connects the other channels 0 to 3, 5 and 6). Further, the unit 128 clears the unit 122 and, to prepare for the second communication, connects the input channels $I_0$ to $I_3$, $I_5$ and $I_6$ to the output channels $O_0$ to $O_3$, $O_5$ and $O_6$. The unit 128 has already connected the input channel $I_4$ to the output channel $O_7$ and the input channel $I_7$ to the output channel $O_4$ to accommodate the first communication (Step 1).

Figure 26B:
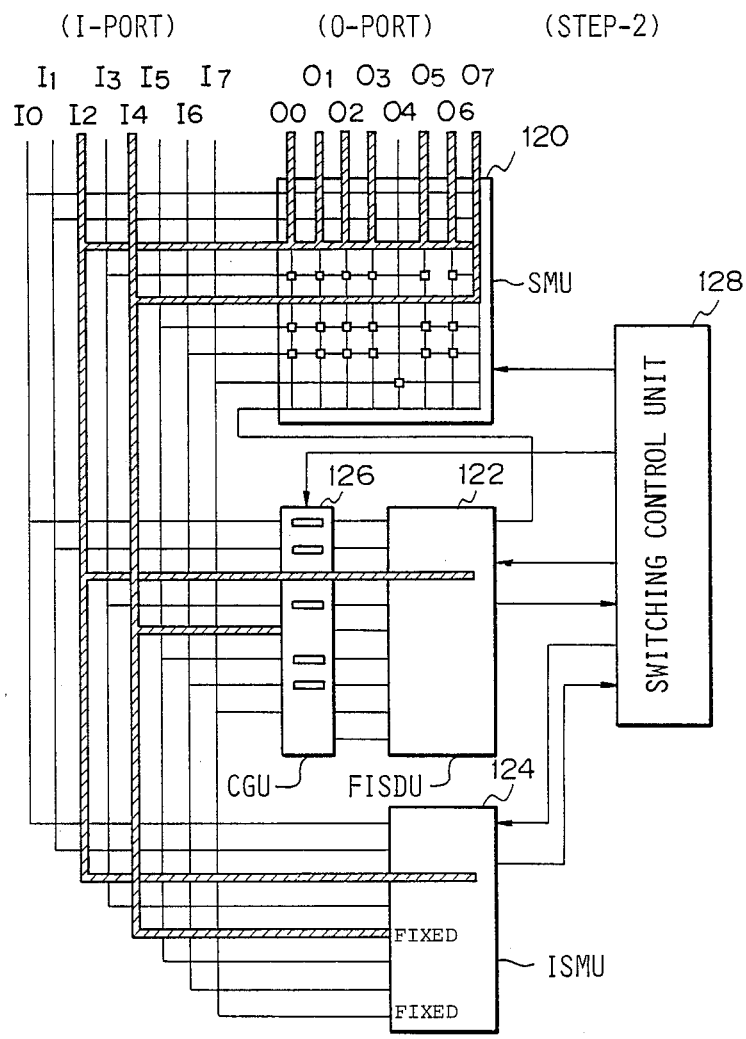

As shown in FIG. 26B, when an input signal arrived first is present on any of the input channels $I_0$ to $I_3$, $I_5$ and $I_6$ (channel $I_2$ in this example), it is outputted over the output channels $O_0$ to $O_3$, $O_5$ and $O_6$ (Step 2).

Figure 26C:
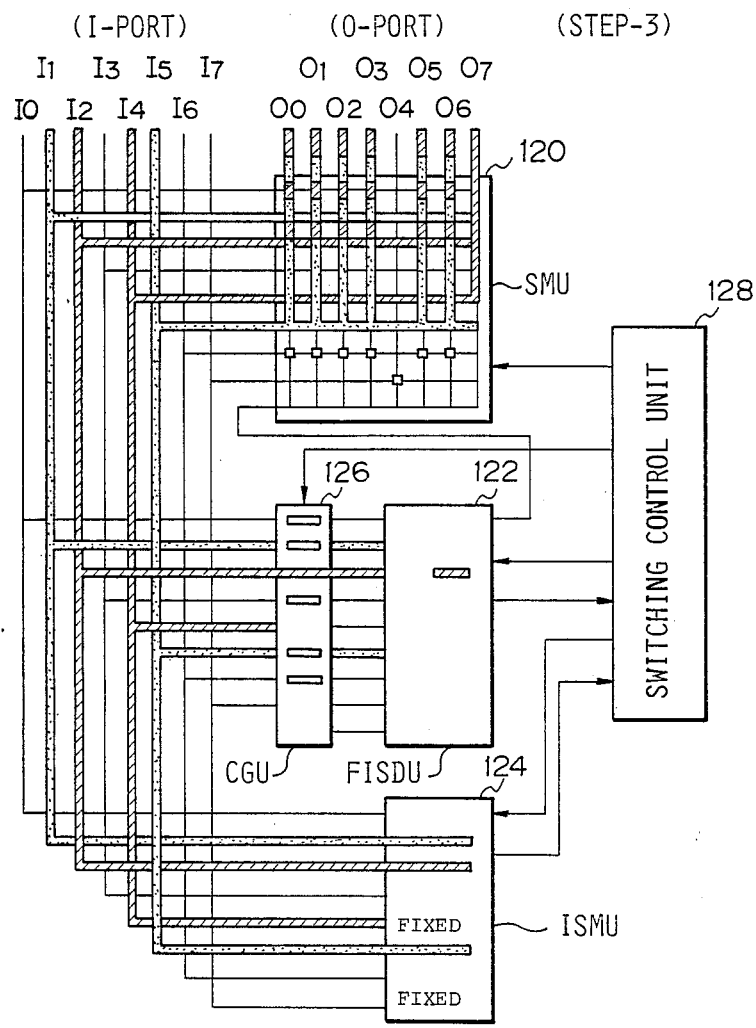

In FIG. 26C, the input signal detecting unit 122 detects the particular input channel $I_2$. If input signals are present on other channels, they are also delivered over the output channels $O_0$ to $O_3$, $O_5$ and $O_6$ as in the Step 2. At this instant, an interference occurs in the output signals (Step 3).

Figure 26D:
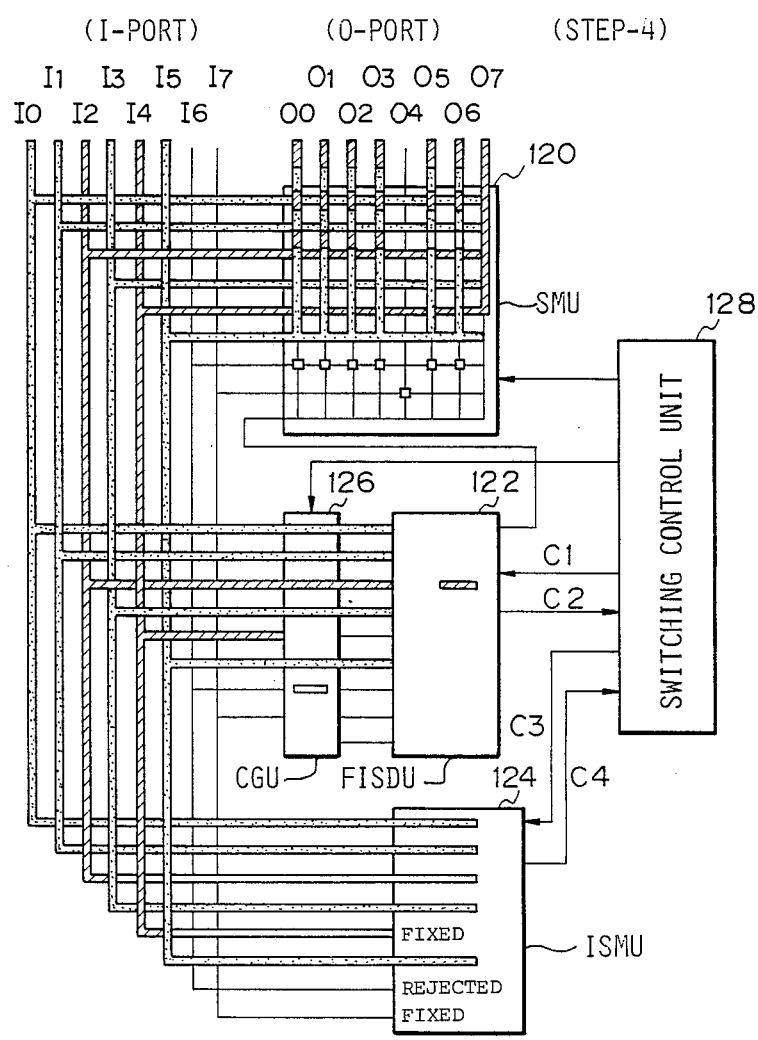

In FIG. 26D, the switching control unit 128 reads information out of the input signal detecting unit 122 to perform the first storage. If input signals appear on farther input channels, they are also delivered over the output channels as in the Step 1. That is, other nodes, too, receive the packets by performing the control as shown in the Step 3. In this instance, the input signal monitoring unit 124 may be caused to detect any of the input channels $I_0$ to $I_3$, $I_5$ and $I_6$ on which no input signal has appeared (Step 4).

Figure 26E:
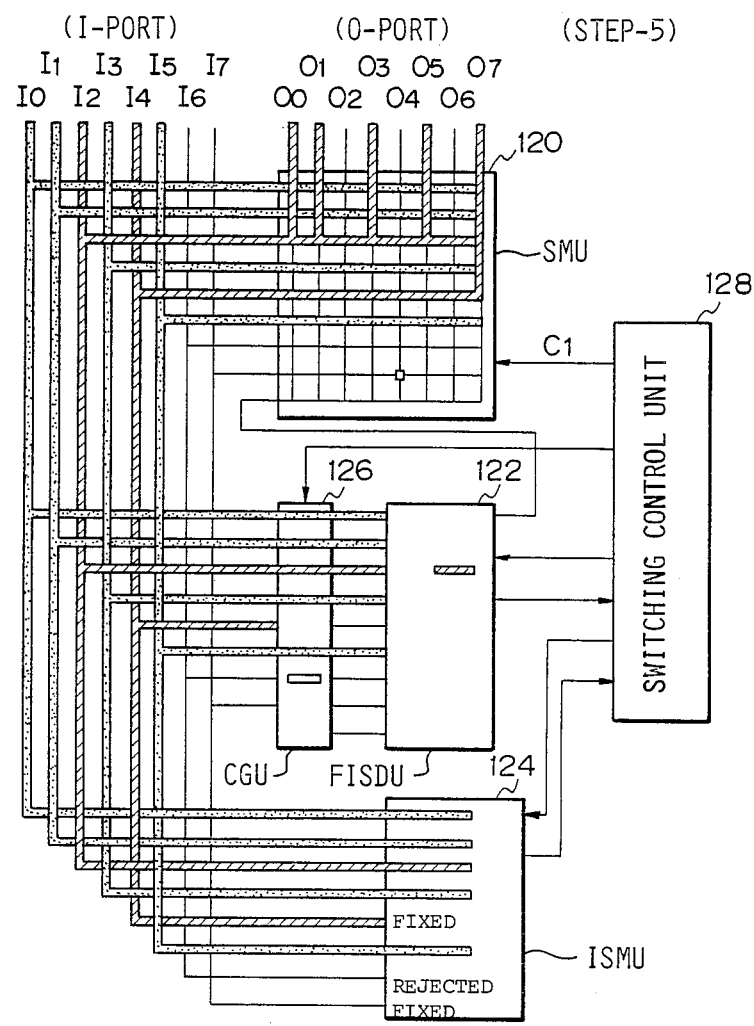

In FIG. 26E, the unit 128 disconnects the input channels of the switching matrix unit 120 except for $I_2$, i.e., input channels $I_0$, $I_1$ and $I_3$ to $I_7$ from all the output channels, while disconnecting the input channel $I_2$ from its associated output channel $O_2$. If desired, the connection to any output channel (channel 6 in this example) corresponding to an input channel on which no input signal has appeared may be cancelled (Step 5).

Figure 26F:
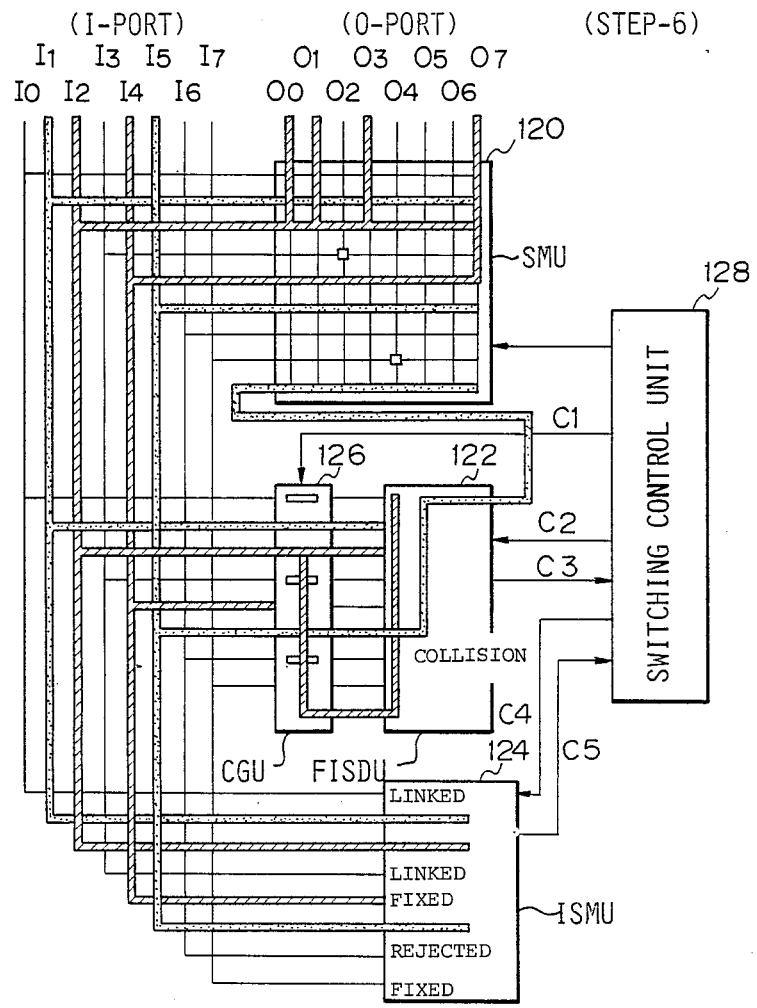

In FIG. 26F, the unit 128 connects the input channel (channel $I_2$) of the control gate unit 126 on which the first input has arrived to the reference signal line, conditions the input signal detecting unit 122 for a first collision detection mode, and detects and stores any of the input channels on which a collision has occurred. If desired, any of the input channels of the monitoring unit 124 on which an input signal has disappeared may be detected. Specifically, the input signal has disappeared since other nodes have performed the control as shown in the Step 5; a signal sent over the output channel which is associated with that input channel implies that the signal has been detected as a signal arrived first (Step 6).

Figure 26G:
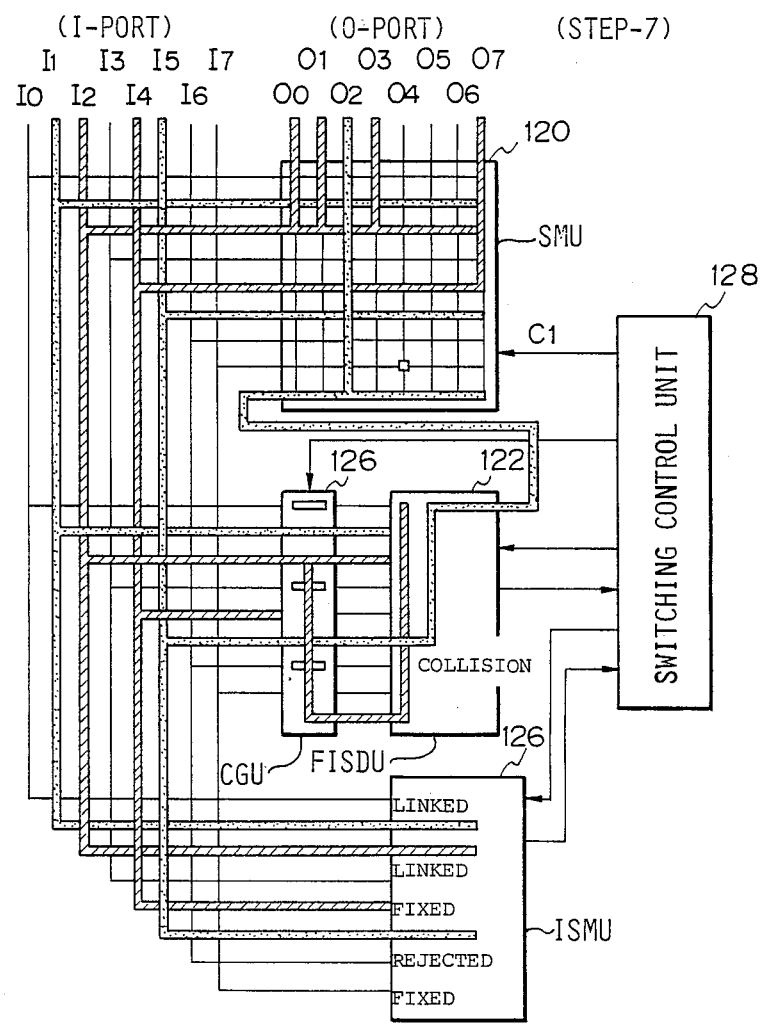

In FIG. 26G, the unit 128 connects the collision signal transfer channel of the switching matrix unit 120 to an output channel associated with the first storage (channel $O_2$) so as to deliver the collision signal over the channel $O_2$. Simultaneously, the unit 128 disconnects those input channels on which a collision has occurred from their associated output channels (Step 7).

Figure 26H:
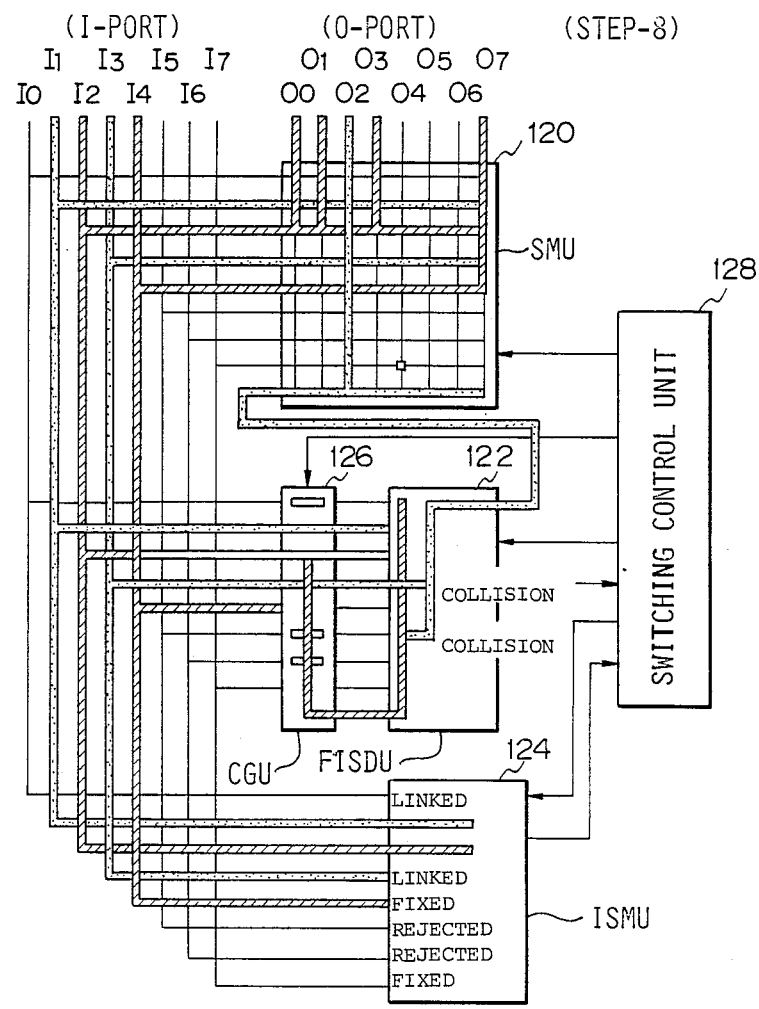
Figure 26:
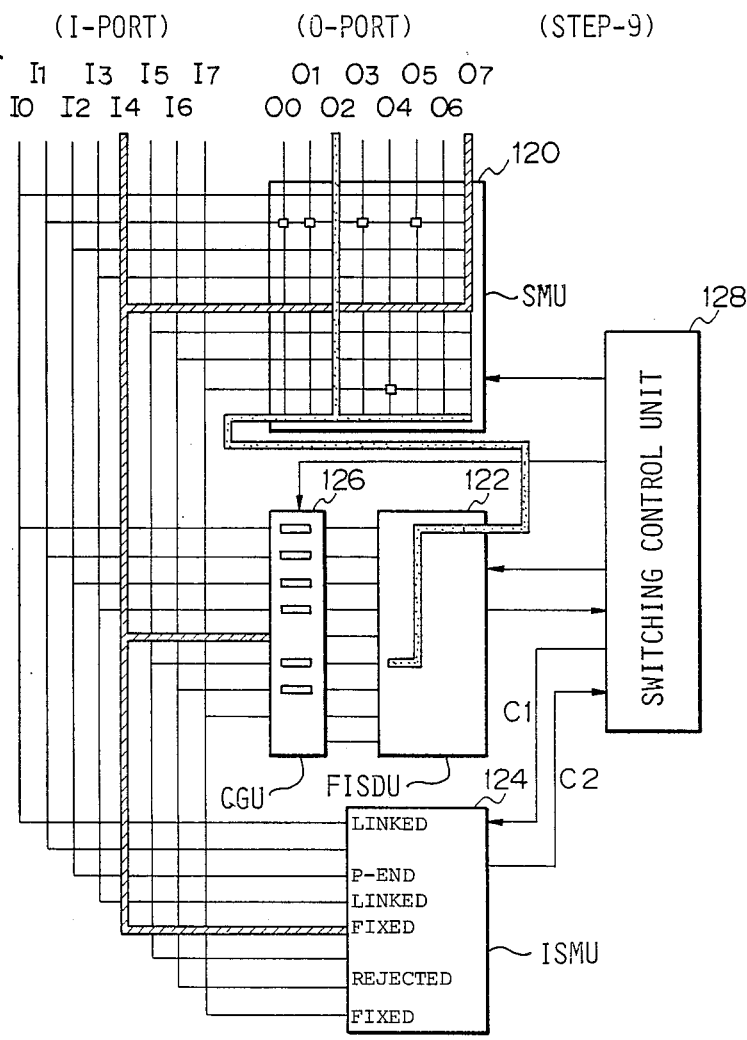

In FIG. 26H, if a collision signal appears on any of the input channels (channel $I_3$ in this example), a new collision signal is produced as in the case of the first kind of collision. However, the unit 128 does not determine it as the first kind of collision (Step 8).

In FIG. 26I, the input signal monitoring unit 124 detects the end of the input signal, while the switching control unit 128 reads it out (Step 9).

Figure 26J:
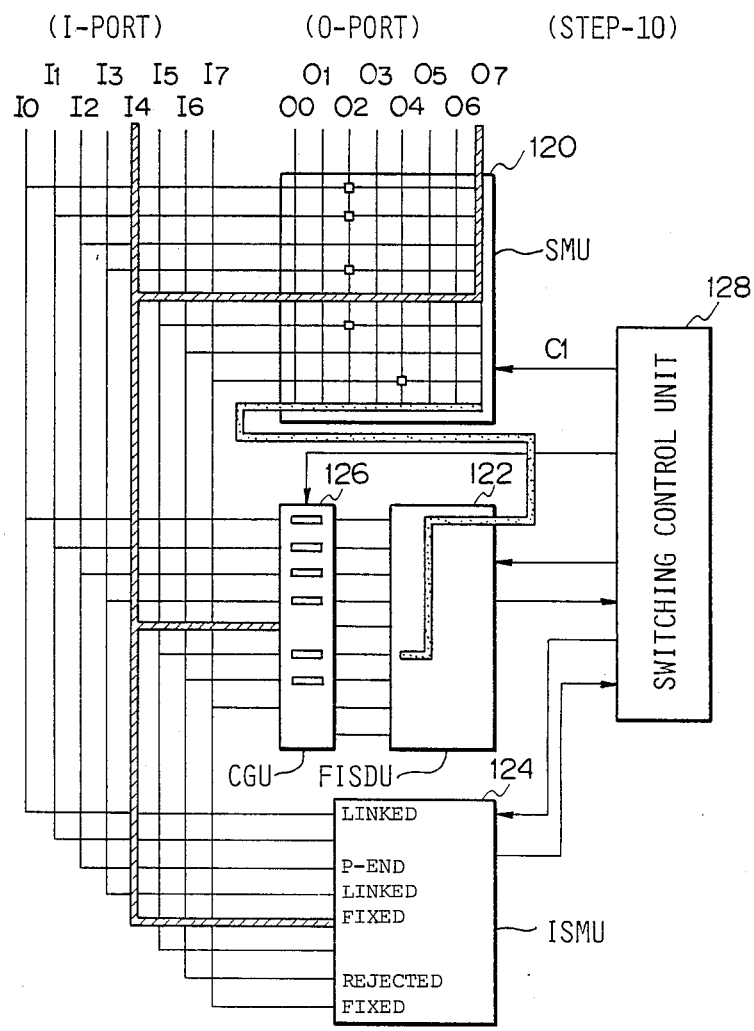

In FIG. 26J, the unit 128 disconnects the collision signal transfer channel of the switching matrix unit 120 from the output channel $O_2$ and, instead, connects the input channels $I_0$, $I_1$, $I_3$ and $I_5$ to the output channel $O_2$ (Step 10).

Figure 26K:
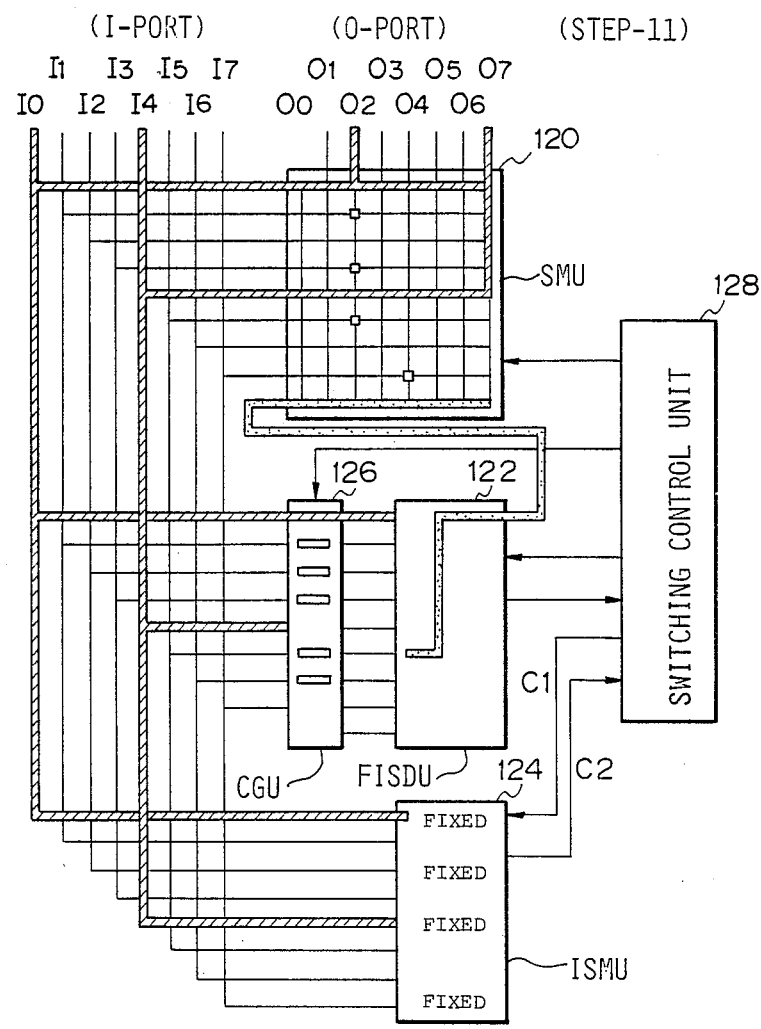
Figure 26:
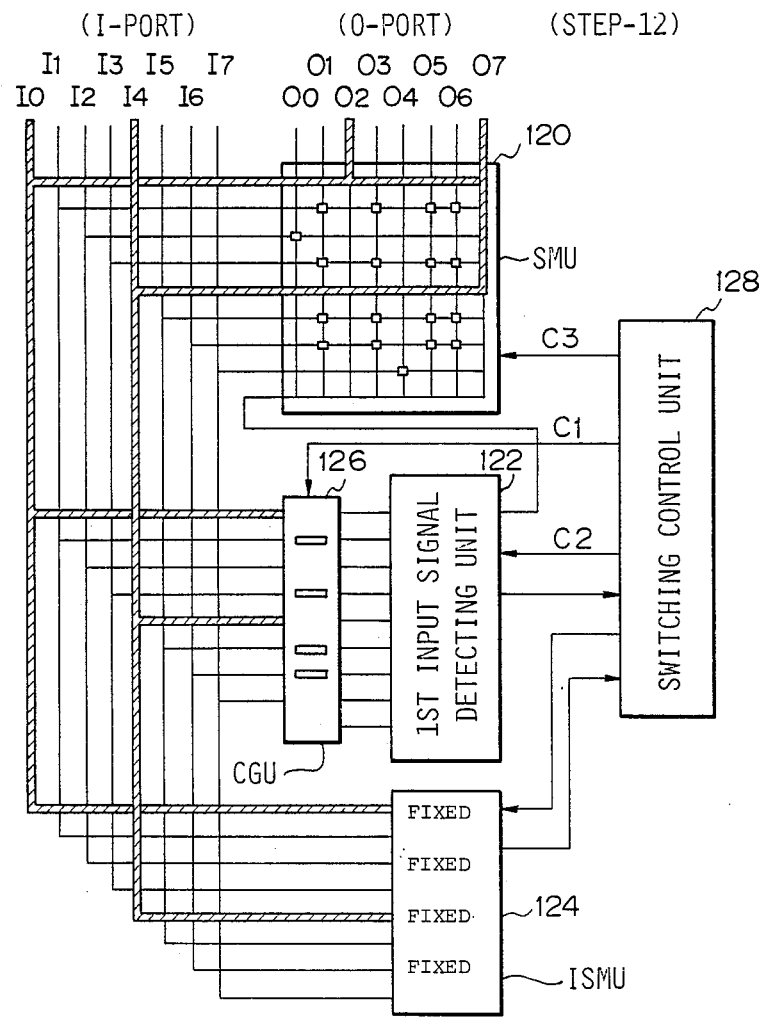
Figure 27A:
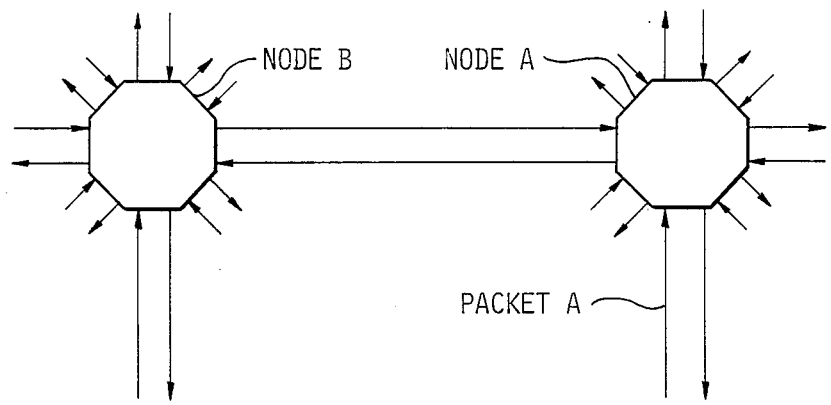
FIGS. 27A to 27E are diagrams explanatory of factors for determining a maximum phase deviation of a reference signal which is propagated through different paths.
Figure 27B:
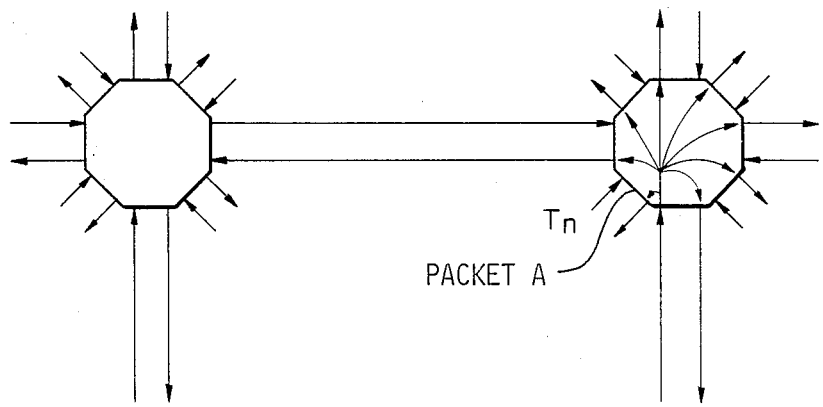
Figure 27C:
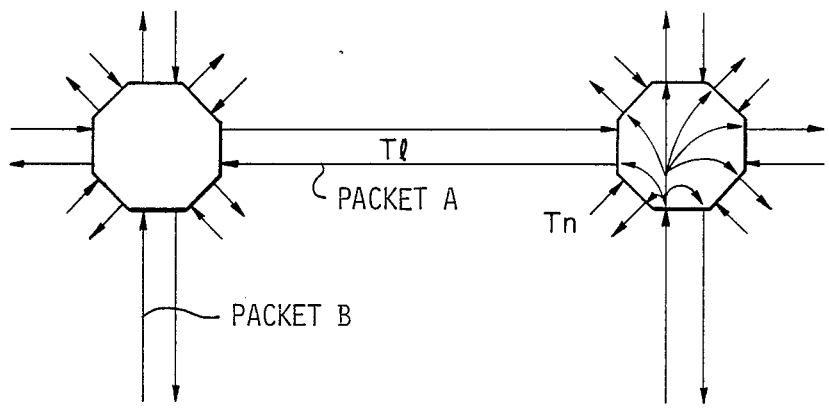
Figure 27D:
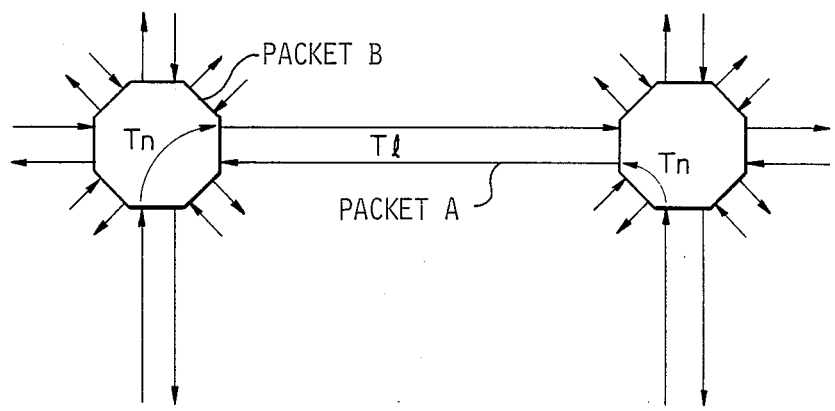
Figure 27E:
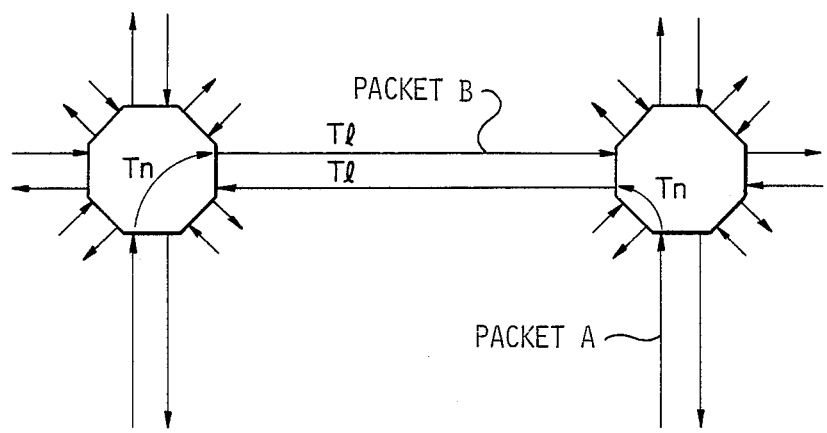

In FIG. 26K, because the previously mentioned input signal is the first forward information of the second communication, the first return information of the second communication appears within a predetermined period of time on any of the input channels (channel $I_0$ in this example) which has been connected at the Step 10, the return information being sent over the output channel $O_2$. The monitoring unit 124 detects the arrival of the first return information of the second communication on the input channel $I_0$, while the switching control unit 128 reads it out and performs the second storage (Step 11).

In FIG. 26L, the unit 128 connects the input channels $I_1$, $I_3$, $I_5$ and $I_6$ of the control gate unit 126 to the input signal detecting unit 122, conditions the unit 122 for a first input signal detection mode, connects the input channel $I_0$ of the switching matrix unit 120 to the output channel $O_2$ and the input channel $I_2$ to the output channel $O_0$ for the second communication, and connects the input channels $I_1$, $I_3$, $I_5$ and $I_6$ of the unit 120 to the output channels $O_1$, $O_3$, $O_5$ and $O_6$ in order to prepare for the third communication which may be generated next. By the first communication, the input channels $I_4$ and $I_7$ are held in connection with the output channels $O_7$ and $O_4$, respectively (Step 12).

Referring to FIGS. 27A to 27E, the principle of detection of the first kind of collision in accordance with this embodiment is schematically shown. In order that a signal arrived first may be compared with another signal with the former constituting a reference, it is a prerequisite that the same signal which is routed through a different path from the reference signal (phase difference existing therebetween) be discriminated from a different signal which was send from a different terminal. For this purpose, factors on which the maximum value of the phase difference depends will be examined. First, (a) a packet A arrives at a node A (Step 1). Subsequently, (b) the packet A is delayed by a time Tn by the node A and, then, delivered therefrom (Step 2). Thereafter, (c) the packet A is delayed by a time T1 by a link and, then, inputted to a node B while, at the same time, a packet B is inputted to the node B. At this instant, the node B detects the packet B as the first input (Step 3). Then, the packet B is delivered from the node B after being delayed by a time Tn (Step 4). Finally, the packet B is received by the node A after being delayed by a time T1 by the link (Step 5).

As a result, at the node A, a time gap Td is developed between the input of the packet A and that of the packet B by, at maximum, $$Td = 2(Tn + T1) \tag{1}$$

For example, assuming that

Tn = 50 nSec and

T1 = 500 nSec then

Td = 1.1 $\mu$Sec

That is, so long as the packets A and B are the same as each other, a deviation in phase as shown above occurs. The deviation depends solely on the delay time Tn inside of each node and the longest distance between nodes (on which the delay time T1 of the link depends) and not on the configuration and scale of the network. This also holds true with a transmit terminal except that the reference signal is constituted by its own output signal. Specifically, in the case of a transmit terminal, a phase difference occurs which is equal to a time gap $$T'd = Tn + 2T1 \tag{2}$$

Because the time gap T'd is generally shorter than the time gap Td, the latter may be used as a reference.

Figure 28A:
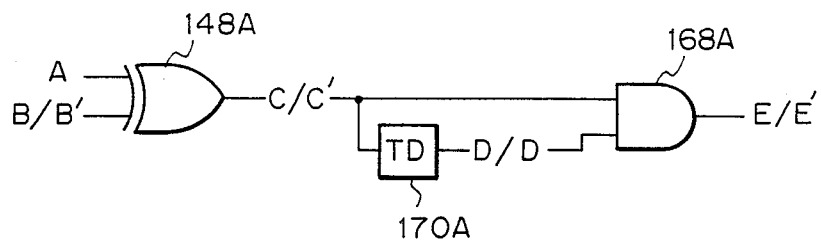
FIGS. 28A to 28C are diagrams showing a methd of comparing a reference signal and a signal to be compared.
Figure 28B:
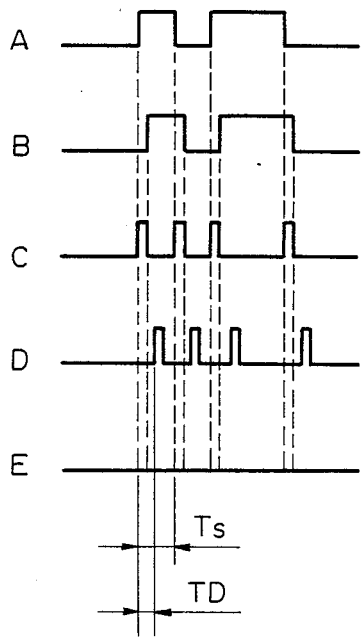
Figure 28C:
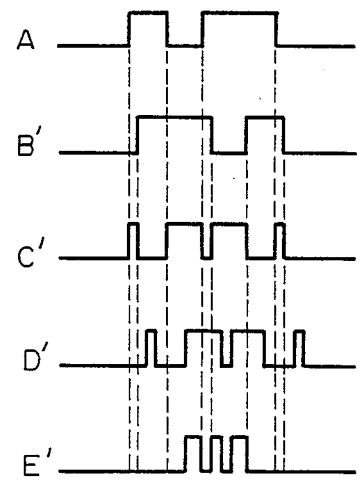

Referring to FIGS. 28A to 28C, there is shown a method of comparing a reference signal and a signal to be compared. As shown in FIG. 28A, a reference signal A and a signal B/B' to be compared are applied to an Exclusive-OR (EXOR) gate 148A which then produces an output C/C'. The signal C/C' is branched to follow two different paths one of which leads to an AND gate 268A directly and the other by way of a delay element 170A having a delay time Td. The AND gate 168A produces an output E/E' in response to the output C/C' of the EXOR 148A and an output D/D' of the delay element 170A. Assume that the delay time is expressed as $$T \geq Td \quad (3)$$

and that a minimum unit time Ts which defines the high level or the low level of a signal is $$Ts \geq (TD + Td) \quad (4)$$

Then, if the reference signal and the signal to be compared are the same as each other, there will appear waveforms C, D and E as shown in FIG. 28B; if they are different from each other, waveforms C', D' and E' will appear as shown in FIG. 28C which are clearly distinguishable from the waveforms C, D and E.

Figure 29A:
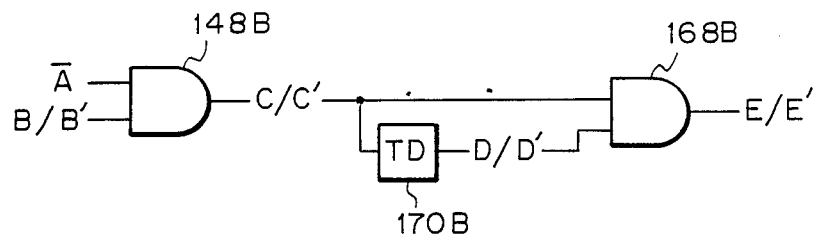
FIGS. 29A to 29C are diagrams showing a method of comparing an actual reference signal and a signal to be compared.
Figure 29B:
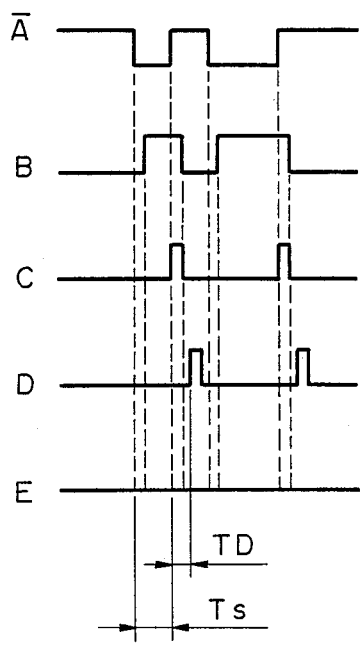
Figure 29C:
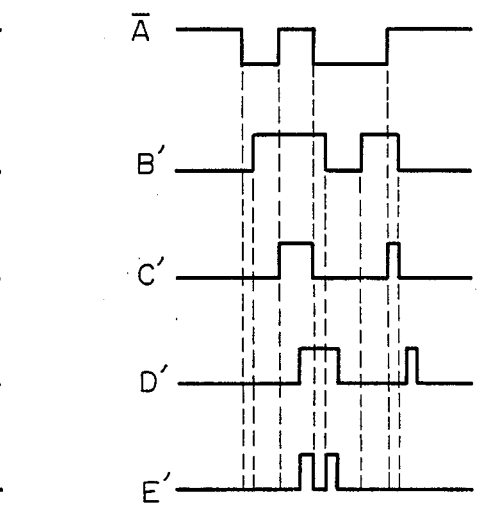

Referring to FIGS. 29A to 29C, an actual method of comparing a reference signal and another signal in accordance with this embodiment is shown. As seen from FIGS. 23 and 25, too, the actual method is implemented with an eight-input NOR gate such as shown in FIG. 29A (see 190 in FIG. 25) which replaces the EXOR 148A of FIG. 228A, and an AND gate (see 148 in FIG. 23). If the EXOR 148A is used, a decision that the first collision has occurred will be made even when a signal to be compared is absent. To prevent this, a decision has to be aided by the detection of presence/absence of a signal to be compared. Outputs C and C' of an AND gate 148B, output D and D' of a delay element 170B and outputs E and E' of an AND gate 168B are shown in FIGS. 29B and 29C, respectively. In this instance, the Eq. (4) is modified as $$Ts \geq (TD + Td)/2 \quad (5)$$

Referring to FIG. 30, there is shown another example of the method of comparing a reference signal and a signal to be compared. As shown, a compare signal line 198 and a reference signal line 166 assigned to each channel are connected to a G input terminal and a load input terminal of a presettable synchronous up-down binary counter 200 (e.g. 74LS191 available from TI), respectively. The ripple clock (RC) output terminals of the counters 200 are connected to 1CK and 2CK input terminals of dual JK flip-flops 202 (with clear terminals; e.g. 74LS107 available from TI). Each of 1Q and 2Q output terminals of each flip-flops 202 is branched to be connected to an A–H input terminal of a thirteen-input NAND gate 204 (e.g. 74LS133 available of TI) and to a 1A1-2A4 input terminal of an octal three-state bus buffer 206 (e.g. 74LS244 available from TI).

Because an A–D and a U/D input terminals of the counter 200 are constantly maintained high level, when the reference signal line 166 (load input terminal) is high level (high active), data held thereby is always "16 (four bits)". When the reference signal line 166 is low level and the compare signal line 198 (G input terminal) is low level (low active), the counter 200 is decremented by clock pulses which are applied to its CK input terminal. As the counter 200 reaches zero, it produces a signal from the RC terminal and, therefore, it is possible to locate a particular input channel on which the first kind of collision has occurred.

Hereinafter will be described the constructin of the network in accordance with this embodiment. The network in this embodiment may have subtantially any suitable configuration such as a linear configuration, a loop configuration, a two-dimensional lattice configuration made up of the nodes 80 and terminals 82 as shown in FIG. 14, a three-dimensional lattice configuration, or a combination thereof. In addition, desired ones of the nodes 80 may be interconnected by the links 84 having a plurality of channels, and so may be done the nodes 80 and the terminals 82.

The packet formats as shown in FIG. 2 are applicable to this embodiment, too.

As regards a communication procedure, prerequisites with the transmit/receive stations 82 such as terminals are as follows:

(a) a transmit station sends the first forward information (call packet) which includes a preamable which is longer than a predetermined length (time) and a destination address;

(b) the preamble generated by the transmit station includes a fraction or area which is adapted for the detection of the first kind of collision;

(c) a transmit/receive station receives the first forward information (call packet) which is meant therefor and, upon completion of the information, transmits the first return information (call-back packet). A first period of time $T_1$ is a period of time necessary for the connection control section of a node to complete a control which is performed to prepare for the entry of the next packet, i.e., the first return information (call-back packet) in this case, the time period $T_1$ being referred to as a node time constant; and (d) when a transmit/receive station has received information which has not been meant therefor (only the first forward information or call packet has been received), it must not send any information until a second predetermined period of time $T_2$ expires since the end of the information. The second period of time $T_2$ is a period of time necessary for a packet to be propagated into the network and generally referred to as a network time constant. Thus, at a node closest to a transmit station, it is ensured that the first return information (call-back packet) be received within the period of time $T_2$ after the end of the first forward information (call packet).

In this particular embodiment, the fraction of the preamble of the first forward information (call-back packet) adapted for the detection of the first kind of collision plays an important role. Further, what is important is that the phase deviation of the first forward information (call packet) which is routed through a different path as previously stated be distinguished from the first kind of collision. It is necessary, therefore, for the bit pattern of the exclusive collision detection area of the preamble to be clearly distinguishable from one first forward information (call packet to another) to another. This requirement may be met by any of the following implementations:

(a) filling the area with a bit pattern which is provided by coding the address of a transmit station (source address); and (b) filling the area with a bit pattern which is provided by coding a random number.

So long as the prerequisites as mentioned above are met, a substantial degree of freedom is guaranteed in the other aspects and gives the following possibilities:

(a) the minimum and maximum packet lengths are limitless;

(b) forward and return informations may be repeated any number of times and may even occupy the channels; and (c) any desired data rate may be selected between a transmit and a receive stations insofar as it is smaller than a maximum data rate, which is determined by hardware.

In accordance with this embodiment, the area of the packet which is assigned to the detection of the first kind of collision has a practical size. For example, because Ts is equal to or greater than 1.1 to 2.2 μS, the area for detection needs only to be about 20 μS and this corresponds to not more than 20 bits for a data rate of 1 Mbps.

While this embodiment has been described in relation to FIG. 21 which shows a node constructed to detect the first kind of collision, the node may be replaced with a transmit/receive terminal which is connected to the node. Specifically, each or a desired one of the terminals may be provided with the construction as shown in FIG. 21 so as to perform not only the transmission and reception of signals but also the detection of the first kind of collision, i.e. collision of a signal of the own station and a signal which is sent from another terminal or from a node.

As described above, in accordance with this embodiment, the first kind of collision depends solely on the distance between nodes and not on the scale of a network, so that the system is very practical. In addition, even if communications overlap each other, the system throughput is enhanced.

THIRD EMBODIMENT

This embodiment is directed to the third object of the present invention as previously stated and is essentially similar to the second embodiment. The following description will concentrate on the differences between this embodiment and the second embodiment.

In accordance with this embodiment, to further enhance the reliability attainable with the prior art systems (a) a node is capable of detecting the first kind of collision, (b) a first collision is prevented from entailing a trouble in the subsequent communications, and (c) a terminal is informed of the occurrence of a collision to perform adequate backoff processing. In this embodiment, a connection control device installed in a node generally comprises a detecting section for detecting the first kind of collision, a control section for inhibiting one or both of input and output to and from an input channel on which the first kind of collision has occurred and an output channel associated therewith, and a control section for producing a collision signal indicative of the occurrence of the first kind of collision and informing a transmit terminal of it. A communication control device installed in a transmit/receive terminal generally comprises a detecting section for detecting the first return information and the collision signal, and a back-off control section for, when the first return information has not been received, performing retransmission depending upon the presence/absence of a collision signal.

The collision detecting section compares an input signal selected on the first-come-first-served basis (not limited to a signal arrived earliliest) and another input signal so as to produce a differential therebetween. The another signal mentioned above may be a one which is originated by the same terminal and routed through a different path, or a one which is originated by a different terminal. The former involves a minimum of delay (in phase) because it has been selected by the same logic by a node on the route. As regards the latter, a sufficient differential is attainable by adequately selecting an area of a packet which is assigned to the comparison. The backoff control section, when the first return information has not been received within a predetermined period of time after the detection of a collision signal, determines that the first kind of collision has occurred to prevent the first forward information from reaching a receive terminal and performs a backoff procedure. When the first return information has been received within the predetermined period of time after the detection of a collision signal, the backoff control section does not perform the backoff procedure and neglects the collision signal. It may occur that the first return information is not received within the predetermined period of time despite that a collision signal is absent, such as when the traffic is excessively high and when a receive terminal is unable to receive. In such a condition, the backoff control section may perform transmission upon the lapse of a longer period of time than in the case of the backoff against the first collision, or it may interrupt the communication and alert an operator at the transmit terminal. Again, the backoff itself is not particular to this embodiment and may be implemented by, for example, the binary exponential backoff algorithm which is applied to Ether net (Xerox).

The packet formats as shown in FIG. 2 are applicable to this embodiment, too.

As regards the communication procedure, conditions required of the transmit/receive stations 82 such as terminals are as follows:

(a) a transmit station sends the first forward information (call packet) which includes a preamble which is longer than a predetermined length (time) and a destination address;

(b) a transmit station defines an area for the detection of the first kind of collision in the preamble;

(c) when a transmit station has received the first return information (call-back packet), it transmits the second forward information (message packet) with no regard to the presence/absence of a collision signal and immediately after the lapse of a first predetermined period of time $T_1$. This period of time $T_1$ is necessary for a connection control device at a node to perform a control for the entry of the next packet and is generally referred to a node time constant or node constant. What kind of communication should be performed thereafter is free to choose at a transmit/receive station or on a system basis and not limited by the network at all. Upon completion of the communication, it is only necessary for the transmission to be interrupted for a longer period of time than a second predetermined period of time, which allows a packet to be propagated into a network and is generally referred to as a network time constant or network constant;

(d) When a transmit station has not received the first return information after the reception of a collision signal, it performs a predetermined backoff control. The system of this control is open to choice on a station basis or on a system basis;

(e) The processing which a transmit station is to effect when neither a collision signal nor the first return information (call-back has been detected is also open to choice on a station basis or on a system basis;

(f) When a receive station has received the first forward information (call packet), it transmits the first return information (call-back packet) as soon as the period of time $T_1$ expires since the end of the forward information; and (g) When a transmit/receive station has received information which is not meant for this station (only the first forward information (call packet) has been received), it must not transmit information until the period of time T₂ expires since the end of the received information. It is guaranteed that the first return information (call-back packet) be entered within the period of time T₂.

As described above, in accordance with this embodiment, the detection of the first kind of collision depends solely on the distance between nodes and not on the scale of a network, whereby the practicality is enhanced. Because collision information is delivered to a transmit station even when the transmit station is transmitting the first forward information (call packet), the transmit station is capable of retransmitting and, yet, the communication efficiency remains substantially the same as in the case without a collision.

Various modifications will become possible for those skilled in the art after receiving the teachings of the present disclosure

What is claimed is:

1. A communication network control system having:
    a plurality of nodes which are interconnected by links;
    a plurality of transmit/receive terminals connected to said nodes; and
    connection control means installed in each of said nodes for controlling connection of a plurality of input channels and output channels which correspond to said input channels;
    said connection control means connecting any one of the input channels, on which first forward information has arrived earliest, to all of the output channels which have not been used for other communications, or to any of said output channels except for an output channel corresponding to the input channel on which first forward information has arrived earliest, and disconnecting any input channels except for any of said input channels which have not been used for other communications from said output channels;
    the improvement wherein each of said nodes compares a phase of an input signal arrived first on any of said input channels and a phase of an input signal arrived on another of said input channels later than said signal arrived first so as to detect any said input channels on which a differential resulting from the comparison is greater than a predetermined value, thereby detecting that a collision has occurred between said node and another node or any of said terminals to which said input channel detected is connected.

2. The communication system as claimed in claim 1, wherein, when an input arrived first is present on any of said input channels except for said input channels which have been used for other communications and an input arrived later is present on another of said input channels, said node compares an input signal on said input channel on which the input arrived first is present and an input signal on said another input signal on which the input arrived later is present and, if a differential resulting from the comparison is greater than a predetermined value on any of said input channels, detects that a collision has occurred between said node and another node or any of said terminals to which said input channel is connected, thereby storing all of channels on which the collision has occurred.

3. The communication network as claimed in claim 1, wherein said node stops output over any of said output channels which corresponds to said input channel stored.

4. The communication network as claimed in claim 2, wherein said node stops output over any of said output channels which corresponds to said input channel stored.

5. The communication network as claimed in claim 1, wherein said node stops input on said input channel stored.

6. The communication network as claimed in claim 2, wherein wherein said node stops input on said input channel stored.

7. The communication network as claimed in claim 3, wherein said node stops input on said input channel stored.

8. In a communication network control system having:
    a plurality of nodes which are interconnected by links;
    a plurality of transmit/receive terminals connected to said nodes; and
    connection control means installed in each of said nodes for controlling connection of a plurality of input channels and output channels which correspond to said input channels;
    said connection control means connecting any of said input channels, on which first forward information has arrived earliest, to all of the output channels which have not been used for other communications, connecting only said input channel on which the first forward information has arrived earliest to an output channel selected from the group of all of said output channels which have not been used for other communications or to all of said output channels except for any of said output channels which corresponds to said input channel, and disconnecting from said output channels said input channels except for said input channels which have not been used for other communications;
    the improvement wherein each of said nodes compares an input signal appeared first on any of said input channels and an input signal appeared on another of said input channels later than said input signal and, assuming that a maximum delay time between input and output of a signal to and from said node is Tn and a maximum link propagation delay time at a maximum node-to-node distance is Tl, determines that a collision has occurred between said node and another node or any of said terminals to which said input channel, on which the input signal has appeared later, is connected when a signal representative of a differential between the first signal and the later signal remains at a high level more than a predetermined period of time Td of 2(Tn+Tl).

9. The communication network as claimed in claim 8, wherein the means for detecting the collision comprises:
    the differential signal which is an AND of an input signal arriving at the node first and an input signal which has arrived later than the signal which has arrived first.

10. The communication network as claimed in claim 8, wherein the means for detecting the collision comprises the differential signal which is an Exclusive-OR of the first signal and the later signals on said input channels except for any of said input channels on which no input has appeared.

11. The communication network as claimed in claim 8, wherein the means for detecting that the differential signal has remained at a high level more than the period of time Td comprises branching the differential signal into two signal components, passing one of said two signal components through a delay element having a delay time of TD, and then providing an AND of the two signal components, the delay time TD being equal to or greater than Td.

12. The communication network as claimed in claim 9, wherein the means for detecting that the differential signal has remained at a high level more than the period of time Td comprises branching the differential signal into two signal components, passing one of said two signal components through a delay element having a delay time of TD, and then providing an AND of the two signal components, the delay time TD being equal to or greater than Td.

13. The communication network as claimed in claim 8, wherein the means for detecting that the differential signal has remained at a high level more than the period of time Td comprises a clock generator for outputting a predetermined clock, a counter for counting the clock, and detecting device for detecting the first input signal, said counter counting the clock only when the differential signal is high level and cleared or returned to an initial value upon one or both of a change of the first signal from a high level to a low level and a change from a low level to a high level, an instant when a count of said counter reaches a predetermined count or zero being detected.

14. The communication network as claimed in claim 10, wherein the means for detecting that the differential signal has remained at a high level more than the period of time Td comprises a clock generator for outputting a predetermined clock, a counter for counting the clock, and detecting device for detecting the first input signal, said counter counting the clock only when the differential signal is high level and cleared or returned to an initial value upon one or both of a change of the first signal from a high level to a low level and a change from a low level to a high level, an instant when a count of said counter reaches a predetermined count or zero being detected.

15. The communication network as claimed in claim 8, wherein the first forward information applied to said node includes an area for the detection of a collision, a signal in said area being constituted by a combination of a high level and a low level, a minimum duration Ts of each of the high and low levels being equal to or greater than TD.

16. The communication network as claimed in claim 9, wherein the first forward information applied to said node includes an area for the detection of a collision, a signal in said area being constituted by a combination of a high level and a low level, a minimum duration Ts of each of the high and low levels being equal to or greater than TD.

17. The communication network as claimed in claim 11, wherein the first forward information applied to said node includes an area for the detection of a collision, a signal in said area being constituted by a combination of a high level and a low level, a minimum duration Ts of each of the high and low levels being equal to or greater than TD.

18. The communication network as claimed in claim 8, wherein the signal in the area for the detection of a collision has a high level or a low level whose minimum duration Ts is equal to or greater than 2 TD.

19. The communication network as claimed in claim 10, wherein the signal in the area for the detection of a collision has a high level or a low level whose minimum duration Ts is equal to or greater than 2 TD.

20. The communication network as claimed in claim 13, wherein the signal in the area for the detection of a collision has a high level or a low level whose minimum duration Ts is equal to or greater than 2 TD.

21. In a communication network control system having:
a plurality of nodes which are interconnected by links;
a plurality of transmit/receive terminals connected to said nodes; and
connection control means installed in each of said nodes for controlling connection of a plurality of input channels and output channels which correspond to said input channels;
said connection control means connecting only one of said input channels, on which first forward information has arrived earliest, to the group of output channels selected from all of said output channels which have not been used for other communications, or to all of said output channels except for any of the output channels corresponding to said input channel, and disconnecting all of said input channels, except for any of said input channels which have not been used for other communications from said output channels;
the improvement wherein each of at least a part of said terminals compares an output signal which said terminal has sent and an input signal which has been sent by any of said nodes to which said terminal is connected and, when detected that a differential resulting from the comparison is greater than a predetermined value, decides that a collision has occurred between said terminal and said node.

22. The communication network as claimed in claim 21, wherein said terminal interrupts output therefrom when detected a collision between said terminal and said node.

23. In a communication network control system having:
a plurality of nodes which are interconnected by links;
a plurality of transmit/receive terminals connected to said nodes; and
connection control means installed in each of said nodes for controlling connection of a plurality of input channels and output channels which correspond to said input channels;
said connection control means connecting only one of said input channels, on which first forward information has arrived earliest to the group of output channels selected from the group of output channels which have not been used for other communications or to all of said output channels except for any of said output channels corresponding to the input channel, and disconnecting all of said input channels except for any of said input channels which have not been used for other communications from said output channels;
the improvement wherein each of said terminals compares an output signal thereof and an input signal thereto and, when a signal has been outputted over any of said output channels of said terminal, compares the output signal on said output channel and an input signal on any of said input channels which corresponds to said output channel and, if a differential signal resulting from the comparison remains at a high level more than a predetermined period of time T'd which is equal to Tn+2 T'1, where Tn is a maximum delay time between input and output of a signal to and from a node and T'1 is a maximum link propagation delay time at a maximum node-to-terminal distance, decides that a collision has occurred between said terminal and any of said nodes to which said terminal is connected.

24. The communication network as claimed in claim 23 wherein the means for detecting a collision comprises the differential signal which is an AND of a signal produced by inverting an output signal of said terminal and an input signal.

25. The communication network as claimed in claim 23, wherein the means for detecting a collision comprises the differential signal which is an Exclusive-OR of an output signal of said terminal and an input signal.

26. The communication network as claimed in claim 23, wherein the means for detecting whether or not the differential signal has remained at a high level more than the period of time T'd comprises branching the differential signal into two signal components and determining that one of the signal components has a delay time T'D which is equal to or greater than Td and that the delay time TD is equal to or greater than T'D.

27. The communication network as claimed in claim 24, wherein the means for detecting whether or not the differential signal has remained at a high level more than the period of time T'd comprises branching the differential signal into two signal components and determining that one of the signal components has a delay time T'D which is equal to or greater than Td and that the delay time TD is equal to or greater than T'D.

28. The communication network as claimed in claim 23, wherein the means for detecting that the differential signal has remained at a high level more than the period of time T'd comprises a clock generator for outputting a predetermined clock, a counter for counting the clock, and detecting device for detecting the first input signal, said counter counting the clock only when the differential signal is high level and cleared or returned to an initial value upon one or both of a change of the first signal from a high level to a low level and a change from a low level to a high level, an instant when a count of said counter reaches a predetermined count or zero being detected.

29. The communication as claimed in claim 24, wherein the means for detecting that the differential signal has remained at a high level more than the period of time T'd comprises a clock generator for outputting a predetermined clock, a counter for counting the clock, and detecting device for detecting the first input signal, said counter counting the clock only when the differential signal is high level and cleared or returned to an initial value upon one or both of a change of the first signal from a high level to a low level and a change from a low level to a high level, an instant when a count of said counter reaches a predetermined count or zero being detected.

30. In a communication network control system having:
a plurality of nodes interconnected by links;
a plurality of transmit/receive terminals connected to said nodes; and
connection control means installed in each of said nodes for controlling connection of a plurality of input channels and output channels which correspond to said input channels;
said connection control means connecting any of the input channels on which first forward information has arrived earliest to all of the output channels selected from the group of output channels which have not been used for other communications or to any of said output channels corresponding to said input channels, and disconnecting from said output channels all of the input channels except for the input channels which have not been used for other communications and said output channel on which first forward information has arrived earliest;
the improvement wherein each of said nodes compares in phase an input signal which has arrived on any of said input channels first and an input signal which has arrived on another of said input channels later than said input signal and, if a differential resulting from the comparison is greater than a predetermined value, produces the difference as a differential signal and sends the differential signal as a collision detection signal over any of said output channels corresponding to said input channel on which the input signal arrived first.

31. The communication network as claimed in claim 30, wherein when an input signal arrives first at any of said input channels except for said input channels which have been used for other communications and, then, an input signal arrives on any of said input channels except for said input channels which have been used for other communications later than said input signal which arrives first, said nodes compares said two input signals with each other.

32. The communication network as claimed in claim 30, wherein said node performs production of the differential signal in a first step and output of the collision signal in a second step, thereby preventing the production of the differential signal and the output of the collision signal from overlapping each other with respect to time.

33. The improvement as claimed in claim 31, wherein said node performs production of the differential signal in a first step and output of the collision signal in a second step, thereby preventing the production of the differential signal and the output of the collision signal from overlapping each other with respect to time.

34. The communication network as claimed in claim 30, wherein the collision signal comprises a differential signal which has been converted such that a differential thereof from a signal stored in an area which is assigned to the detection of a signal contained in the first forward information is greater than a predetermined value at any of said nodes which receives the collision signal.

35. The communication network as claimed in claim 31, wherein the collision signal comprises a differential signal which has been converted such that a differential thereof from a signal stored in an area which is assigned to the detection of a signal contained in the first forward information is greater than a predetermined value at any of said nodes which receives the collision signal.

36. The communication network as claimed in claim 32, wherein the collision signal comprises a differential signal which has been converted such that a differential thereof from a signal stored in an area which is assigned to the detection of a signal contained in the first forward information is greater than a predetermined value at any of said nodes which receives the collision signal.

37. The communication network as claimed in claim 34, wherein when received the collision signal, any of said transmit/receive terminals which transmitted the first forward information neglects said differential signal if received the first return information within a predetermined period of time, and retransmits the first forward information by a predetermined backoff procedure if not received.

38. The communication network as claimed in claim 34, wherein when any of said transmit/receive terminals transmitted the first forward information has not received the first return information within a predetermined period of time in the absence of the collision signal, said terminal retransmits the first forward information by a backoff procedure which has a longer time interval than the predetermined backoff procedure.

39. The communication network as claimed in claim 37, wherein when any of said transmit/receive terminals transmitted the first forward information has not received the first return information within a predetermined period of time in the absence of the collision signal, said terminal retransmits the first forward information by a backoff procedure which has a longer time interval than the predetermined backoff procedure.

40. The communication network as claimed in claim 34, wherein when any of said transmit/receive terminals transmitted forward information has not received the first return information within a predetermined period of time in the absence of the collision signal, said terminal does not retransmit the first forward information or interrupts transmission of the first forward information.

41. The communication network as claimed in claim 37, wherein when any of said transmit/receive terminals transmitted forward information has not received the first return information within a predetermined period of time in the absence of the collision signal, said terminal does not retransmit the first forward information or interrupts transmission of the first forward information.

42. The communication network as claimed in claim 38, wherein when any of said transmit/receive terminals transmitted forward information has not received the first return information within a predetermined period of time in the absence of the collision signal, said terminal does not retransmit the first forward information or interrupts transmission of the first forward information.

* * * * *